(12) United States Patent
Uyehara et al.

(10) Patent No.: US 8,693,342 B2
(45) Date of Patent: Apr. 8, 2014

(54) DISTRIBUTED ANTENNA SYSTEM USING TIME DIVISION DUPLEXING SCHEME

(75) Inventors: Lance K. Uyehara, San Jose, CA (US); Larry G. Fischer, Waseca, MN (US); Scott Stratford, Campbell, CA (US)

(73) Assignee: ADC Telecommunications, Inc., Shakopee, MN (US)

( * ) Notice: Subject to any disclaimer, the term of this patent is extended or adjusted under 35 U.S.C. 154(b) by 166 days.

(21) Appl. No.: 13/283,912

(22) Filed: Oct. 28, 2011

(65) Prior Publication Data

US 2013/0107763 A1    May 2, 2013

(51) Int. Cl.
G01R 31/08    (2006.01)

(52) U.S. Cl.
USPC .......................... 370/238; 370/236; 370/345

(58) Field of Classification Search
None
See application file for complete search history.

(56) References Cited

U.S. PATENT DOCUMENTS

| | | |
|---|---|---|
| 4,183,054 A | 1/1980 | Patisaul et al. |
| 4,451,916 A | 5/1984 | Casper et al. |
| 4,611,323 A | 9/1986 | Hessenmuller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Chien-Yeh Lee |
| 5,243,598 A | 9/1993 | Lee |
| 5,303,287 A | 4/1994 | Laborde |
| 5,321,736 A | 6/1994 | Beasley |
| 5,321,849 A | 6/1994 | Lemson |
| 5,339,184 A | 8/1994 | Tang |
| 5,377,255 A | 12/1994 | Beasley |
| 5,381,459 A | 1/1995 | Lappington |
| 5,400,391 A | 3/1995 | Emura et al. |
| 5,461,627 A | 10/1995 | Rypinski |
| 5,519,691 A | 5/1996 | Darcie et al. |
| 5,545,397 A | 8/1996 | Spielvogel |
| 5,566,168 A | 10/1996 | Dent |

(Continued)

FOREIGN PATENT DOCUMENTS

| | | |
|---|---|---|
| CA | 2058736 | 7/1993 |
| CA | 2058737 | 7/1993 |

(Continued)

OTHER PUBLICATIONS

Uyehara, "Distributed Digital Reference Clock", "U.S. Appl. No. 12/845,060, filed Jul. 28, 2010", , pp. 1-37, Published in: US.

(Continued)

*Primary Examiner* — Robert Wilson
(74) *Attorney, Agent, or Firm* — Fogg & Powers LLC

(57) ABSTRACT

A communication system includes a master host unit that communicates wireless spectrum with a service provider interface using analog spectrum. Master host unit communicates digitized spectrum in N-bit words over a digital communication link. Master host unit converts between analog spectrum and N-bit words of digitized spectrum. Communication system includes hybrid expansion unit coupled to master host unit by digital communication link. Hybrid expansion unit communicates N-bit words of digitized spectrum with master host unit across digital communication link. Hybrid expansion unit converts between N-bit words of digitized spectrum and analog spectrum. Hybrid expansion unit communicates analog spectrum across analog communication link to analog remote antenna unit. Analog remote antenna unit communicates wireless signals using first antenna. Communication system further includes a switch in a data path between service provider interface and antenna. The switch selects between transmit path and receive path in response to switching control signal.

72 Claims, 30 Drawing Sheets

(56) References Cited

U.S. PATENT DOCUMENTS

| | | |
|---|---|---|
| 5,621,786 A | 4/1997 | Fischer et al. |
| 5,627,879 A | 5/1997 | Russell et al. |
| 5,634,191 A | 5/1997 | Beasley |
| 5,642,405 A | 6/1997 | Fischer et al. |
| 5,644,622 A | 7/1997 | Russell et al. |
| 5,657,374 A | 8/1997 | Russell et al. |
| 5,678,177 A | 10/1997 | Beasley |
| 5,682,256 A | 10/1997 | Motley et al. |
| 5,687,195 A | 11/1997 | Hwang et al. |
| 5,732,076 A | 3/1998 | Ketseoglou et al. |
| 5,761,619 A | 6/1998 | Danne et al. |
| 5,765,099 A | 6/1998 | Georges et al. |
| 5,781,541 A | 7/1998 | Schneider |
| 5,781,859 A | 7/1998 | Beasley |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,822,324 A | 10/1998 | Kostresti et al. |
| 5,845,199 A | 12/1998 | Longshore |
| 5,852,651 A | 12/1998 | Fischer et al. |
| 5,867,292 A | 2/1999 | Crimmins et al. |
| 5,867,485 A | 2/1999 | Chambers et al. |
| 5,870,392 A | 2/1999 | Ann |
| 5,890,055 A | 3/1999 | Chu et al. |
| 5,907,544 A | 5/1999 | Rypinski |
| 5,924,022 A | 7/1999 | Beasley et al. |
| 5,987,014 A | 11/1999 | Magill et al. |
| 6,023,628 A | 2/2000 | Beasley |
| 6,034,950 A | 3/2000 | Sauer et al. |
| 6,108,113 A | 8/2000 | Fee |
| 6,108,550 A | 8/2000 | Wiorek et al. |
| 6,108,626 A | 8/2000 | Cellario et al. |
| 6,157,659 A | 12/2000 | Bird |
| 6,157,810 A | 12/2000 | Georges et al. |
| 6,188,693 B1 | 2/2001 | Murakami |
| 6,205,133 B1 | 3/2001 | Bexten |
| 6,222,660 B1 | 4/2001 | Traa |
| 6,226,274 B1 | 5/2001 | Reese et al. |
| 6,246,675 B1 | 6/2001 | Beasley et al. |
| 6,373,887 B1 | 4/2002 | Aiyagari et al. |
| 6,377,640 B2 | 4/2002 | Trans |
| 6,463,035 B1 * | 10/2002 | Moore ................ 370/236 |
| 6,498,936 B1 | 12/2002 | Raith |
| 6,567,473 B1 | 5/2003 | Tzannes |
| 6,667,973 B1 | 12/2003 | Gorshe et al. |
| 6,674,966 B1 | 1/2004 | Koonen |
| 6,704,545 B1 | 3/2004 | Wala |
| 6,729,929 B1 | 5/2004 | Sayers et al. |
| 6,768,745 B1 | 7/2004 | Gorshe et al. |
| 6,785,558 B1 | 8/2004 | Stratford et al. |
| 6,801,767 B1 | 10/2004 | Schwartz |
| 6,826,163 B2 | 11/2004 | Mani et al. |
| 6,826,164 B2 | 11/2004 | Mani et al. |
| 6,831,901 B2 | 12/2004 | Millar |
| 6,865,390 B2 | 3/2005 | Goss et al. |
| 6,917,614 B1 | 7/2005 | Laubach et al. |
| 6,963,552 B2 | 11/2005 | Sabat, Jr. et al. |
| 7,127,175 B2 | 10/2006 | Mani et al. |
| 7,205,864 B2 | 4/2007 | Schultz, Jr. et al. |
| 7,215,651 B2 | 5/2007 | Millar |
| 7,250,830 B2 | 7/2007 | Layne et al. |
| 7,289,972 B2 | 10/2007 | Rieser et al. |
| 7,313,415 B2 | 12/2007 | Wake et al. |
| 7,733,901 B2 | 6/2010 | Salkini et al. |
| 7,761,093 B2 | 7/2010 | Sabat, Jr. et al. |
| 7,920,858 B2 | 4/2011 | Sabat, Jr. et al. |
| 8,310,963 B2 | 11/2012 | Singh |
| 8,462,683 B2 * | 6/2013 | Uyehara et al. ........ 370/310 |
| 8,532,242 B2 * | 9/2013 | Fischer et al. ........ 375/356 |
| 2001/0036163 A1 | 11/2001 | Sabat, Jr. et al. |
| 2001/0044292 A1 | 11/2001 | Jeon et al. |
| 2002/0167954 A1 | 11/2002 | Highsmith et al. |
| 2002/0191565 A1 | 12/2002 | Mani et al. |
| 2003/0015943 A1 | 1/2003 | Kim et al. |
| 2003/0043928 A1 | 3/2003 | Ling et al. |
| 2003/0053493 A1 | 3/2003 | Graham Mobley et al. |
| 2004/0010609 A1 | 1/2004 | Vilander et al. |
| 2004/0037565 A1 | 2/2004 | Young et al. |
| 2004/0106387 A1 | 6/2004 | Bauman et al. |
| 2004/0106435 A1 | 6/2004 | Bauman et al. |
| 2004/0132474 A1 | 7/2004 | Wala |
| 2004/0198453 A1 | 10/2004 | Cutrer et al. |
| 2004/0203339 A1 | 10/2004 | Bauman |
| 2004/0203703 A1 | 10/2004 | Fischer |
| 2004/0219950 A1 | 11/2004 | Pallonen et al. |
| 2005/0147067 A1 | 7/2005 | Mani et al. |
| 2005/0201323 A1 | 9/2005 | Mani et al. |
| 2005/0250503 A1 | 11/2005 | Cutrer |
| 2006/0066484 A1 | 3/2006 | Sayers |
| 2006/0087980 A1 | 4/2006 | Ikeda |
| 2006/0094478 A1 * | 5/2006 | Wake et al. ............... 455/562.1 |
| 2006/0121944 A1 | 6/2006 | Buscaglia et al. |
| 2006/0153070 A1 | 7/2006 | DelRegno et al. |
| 2006/0172775 A1 | 8/2006 | Conyers et al. |
| 2006/0178162 A1 | 8/2006 | Utakouji et al. |
| 2006/0193295 A1 | 8/2006 | White et al. |
| 2007/0008939 A1 | 1/2007 | Fischer |
| 2007/0201402 A1 | 8/2007 | Cho |
| 2007/0230590 A1 | 10/2007 | Choi |
| 2007/0230592 A1 | 10/2007 | Choi |
| 2007/0254692 A1 | 11/2007 | McCoy |
| 2008/0062935 A1 | 3/2008 | Nakagawa |
| 2008/0181282 A1 * | 7/2008 | Wala et al. ............... 375/130 |
| 2008/0212658 A1 | 9/2008 | Rofougaran |
| 2009/0122731 A1 | 5/2009 | Montojo |
| 2009/0185632 A1 | 7/2009 | Cai |
| 2009/0224983 A1 * | 9/2009 | Laroia et al. .......... 343/702 |
| 2009/0296609 A1 | 12/2009 | Choi |
| 2009/0316608 A1 | 12/2009 | Singh et al. |
| 2009/0316609 A1 | 12/2009 | Singh |
| 2009/0316611 A1 | 12/2009 | Stratford et al. |
| 2009/0318089 A1 | 12/2009 | Stratford et al. |
| 2010/0041341 A1 | 2/2010 | Stratford |
| 2010/0165528 A1 | 7/2010 | Chan |
| 2010/0215028 A1 | 8/2010 | Fischer |
| 2011/0143649 A1 | 6/2011 | Sabat, Jr. et al. |
| 2012/0027145 A1 | 2/2012 | Uyehara et al. |
| 2012/0106657 A1 * | 5/2012 | Fischer et al. ......... 375/259 |
| 2012/0177026 A1 * | 7/2012 | Uyehara et al. ........ 370/345 |
| 2013/0107763 A1 * | 5/2013 | Uyehara et al. ........ 370/278 |

FOREIGN PATENT DOCUMENTS

| | | |
|---|---|---|
| CA | 2069462 | 7/1993 |
| CA | 2087285 | 1/1994 |
| CA | 2138763 | 1/1994 |
| CA | 2156046 | 1/1995 |
| CA | 2125411 | 5/1995 |
| CA | 2128842 | 1/1996 |
| CA | 2134365 | 4/1996 |
| CA | 2158386 | 3/1997 |
| CA | 2168681 | 8/1997 |
| CA | 2215079 | 3/1999 |
| EP | 0391597 | 10/1990 |
| EP | 0876073 | 11/1998 |
| GB | 2253770 | 9/1992 |
| GB | 2289198 | 11/1995 |
| GB | 2315959 | 2/1998 |
| GB | 2320653 | 6/1998 |
| JP | 2005198077 | 7/2005 |
| KR | 1020050123504 | 12/2005 |
| KR | 1020060057132 | 5/2006 |
| KR | 1020060061013 | 6/2006 |
| WO | 9115927 | 10/1991 |
| WO | 9413067 | 6/1994 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 0174013 | 10/2001 |
| WO | 0174100 | 10/2001 |

(56) References Cited

FOREIGN PATENT DOCUMENTS

| WO | 0182642 | 11/2001 |
|---|---|---|
| WO | 03079645 | 9/2003 |
| WO | 2007074949 | 7/2007 |

OTHER PUBLICATIONS

Fischer et al., "Distributed Antenna System With Combination of Both All Digital Transport and Hybrid Digital/Analog Transport", "U.S. Appl. No. 12/913,179, filed Oct. 27, 2010", , pp. 1-71, Published in: US.

"DigivanceTM, Indoor Coverage Solution", "www.adc.com", 2001, pp. 1-8, Publisher: ADC.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

"Tektronix Synchronous Optical Network (SONET)", "http://www.iec.org/online/tutorials/sonet/topic03.html", Aug. 28, 2002, Publisher: International Engineering Consortium.

Uyehara et al., "Distinct Transport Path for MIMO Transmissions in Distributed Antenna Systems", "U.S. Appl. No. 13/004,998, filed Jan. 12, 2011".

International Searching Authority, "International Search Report and Written Opinion of the International Searching Authority", "from Foreign Counterpart of U.S. Appl. No. 13/283,912", Feb. 21, 2013, pp. 1-11.

International Preliminary Examining Authority, "International Preliminary Report on Patentability", "from Foreign Counterpart of U.S. Appl. No. 12/144,939", Jan. 13, 2011, pp. 1-7.

U.S. Patent and Trademark Office, "Advisory Action", "U.S. Appl. No. 12/144,939", Mar. 16, 2011.

U.S. Patent and Trademark Office, "Final Office Action", "U.S. Appl. No. 12/144,939", Apr. 18, 2012.

U.S. Patent and Trademark Office, "Final Office Action", "U.S. Appl. No. 12/144,939", Jan. 14, 2011.

International Searching Authority, "International Search Report" from foreign counterpart of U.S. Appl. No. 12/144,939, Mailed Jan. 29, 2010, Published in: WO.

U.S. Patent and Trademark Office, "Notice of Allowance", "U.S. Appl. No. 12/144,939", Jul. 12, 2012.

U.S. Patent and Trademark Office, "Office Action", "U.S. Appl. No. 12/144,939", Jul. 26, 2010.

U.S. Patent and Trademark Office, "Office Action", "U.S. Appl. No. 12/144,939", Sep. 7, 2011.

State Intellectual Property Office, P.R. China, "First Office Action", "from Foreign Counterpart of U.S. Appl. No. 12/144,939", Apr. 27, 2013, pp. 1-11, Published in: CN.

Japanese Patent Office, "Office Action", "from Foreign Counterpart of U.S. Appl. No. 12/144,939", Aug. 20, 2013, pp. 1-5, Published in: JP.

* cited by examiner

US 8,693,342 B2

DISTRIBUTED ANTENNA SYSTEM USING TIME DIVISION DUPLEXING SCHEME

CROSS-REFERENCE TO RELATED APPLICATIONS

The present application is related to commonly assigned and co-pending U.S. patent application Ser. No. 11/150,820 (hereafter "the '820 Application") entitled "PROVIDING WIRELESS COVERAGE INTO SUBSTANTIALLY CLOSED ENVIRONMENTS", filed on Jun. 10, 2005 (currently pending). The present application is also related to commonly assigned and co-pending U.S. patent application Ser. No. 12/775,897 (hereafter "the '897 Application") entitled "PROVIDING WIRELESS COVERAGE INTO SUBSTANTIALLY CLOSED ENVIRONMENTS", filed on May 7, 2010 (currently pending). The present application is also related to commonly assigned and co-pending U.S. patent application Ser. No. 12/845,060 (hereafter "the '060 Application") entitled "DISTRIBUTED DIGITAL REFERENCE CLOCK", filed Jul. 28, 2010 (which issued as U.S. Pat. No. 8,472,579). The present application is also related to commonly assigned and co-pending U.S. patent application Ser. No. 12/913,179 (hereafter "the '179 Application") entitled "DISTRIBUTED ANTENNA SYSTEM WITH COMBINATION OF BOTH ALL DIGITAL TRANSPORT AND HYBRID DIGITAL/ANALOG TRANSPORT", filed Oct. 27, 2010 (which issued as U.S. Pat. No. 8,532,242). The present application is also related to commonly assigned and co-pending U.S. patent application Ser. No. 13/004,998 (hereafter "the '998 Application") entitled "DISTINCT TRANSPORT PATH FOR MIMO TRANSMISSIONS IN DISTRIBUTED ANTENNA SYSTEMS", filed Jan. 12, 2011 (which issued as U.S. Pat. No. 8,462,683). The present application is also related to commonly assigned and co-pending U.S. patent application Ser. No. 12/144,977 (hereafter "the '977 Application") entitled "METHOD AND APPARATUS FOR SWITCHING IN A TDD SYSTEM", filed Jun. 24, 2008 (currently pending). The present application is also related to commonly assigned and co-pending U.S. patent application Ser. No. 12/144,961 (hereafter "the '961 Application") entitled "METHOD AND APPARATUS FOR FRAME DETECTION IN A COMMUNICATIONS SYSTEM", filed Jun. 24, 2008 (which issued as U.S. Pat. No. 8,385,373). The present application is also related to commonly assigned and co-pending U.S. patent application Ser. No. 12/144,939 (hereafter "the '939 Application") entitled "SYSTEM AND METHOD FOR SYNCHRONIZED TIME-DIVISION DUPLEX SIGNAL SWITCHING", filed Jun. 24, 2008 (which issued as U.S. Pat. No. 8,310,963). The present application is also related to commonly assigned and co-pending U.S. patent application Ser. No. 12/144,913 (hereafter "the '913 Application") entitled "SYSTEM AND METHOD FOR CONFIGURABLE TIME-DIVISION DUPLEX INTERFACE", filed Jun. 24, 2008 (which issued as U.S. Pat. No. 8,208,414). The present application is also related to commonly assigned and co-pending U.S. patent application Ser. No. 11/627,251 (hereafter "the '251 Application") entitled "MODULAR WIRELESS COMMUNICATIONS PLATFORM", filed Jan. 25, 2007 (currently pending). The '820 Application, the '897 Application, the '060 Application, the '179 Application, the '998 Application, the '977 Application, the 1961 Application, the 1939 Application, the '913 Application, and the '251 Application are all incorporated herein by reference in their entirety.

BACKGROUND

Distributed Antenna Systems (DAS) are used to distribute wireless signal coverage into buildings or other substantially closed environments. For example, a DAS may distribute antennas within a building. The antennas are typically connected to a radio frequency (RF) signal source, such as a service provider. Various methods of transporting the RF signal from the RF signal source to the antennas have been implemented in the art.

SUMMARY

A communication system includes a first master host unit adapted to communicate first wireless spectrum with a first service provider interface using a first set of bands of analog spectrum. The communication system further includes a plurality of digital communication links coupled to the first master host unit, wherein the first master host unit is further adapted to communicate a first digitized spectrum in first N-bit words over a first digital communication link of the plurality of digital communication links. The first master host unit is further adapted to convert between the first set of bands of analog spectrum and the first N-bit words of digitized spectrum. The communication system further includes a first hybrid expansion unit communicatively coupled to the first master host unit by the first digital communication link of the plurality of digital communication links and adapted to communicate the first N-bit words of digitized spectrum with the first master host unit across the first digital communication link, the first hybrid expansion unit further adapted to convert between the first N-bit words of digitized spectrum and a second set of bands of analog spectrum. The communication system further includes a first analog communication link coupled to the first hybrid expansion unit, wherein the first hybrid expansion unit is further adapted to communicate the second set of bands of analog spectrum across the first analog communication link. The communication system further includes a first analog remote antenna unit communicatively coupled to the first hybrid expansion unit by the first analog communication link and adapted to communicate the second set of bands of analog spectrum across the first analog communication link, the first analog remote antenna unit further adapted to communicate first wireless signals over a first air interface using a first antenna. The communication system further includes a first switch in a first data path between the first service provider interface and the first antenna, wherein the first switch is selected between a transmit path and a receive path in response to a first switching control signal.

DRAWINGS

In accordance with common practice, the various described features are not drawn to scale but are drawn to emphasize specific features relevant to the exemplary embodiments.

DETAILED DESCRIPTION

Figure 1:
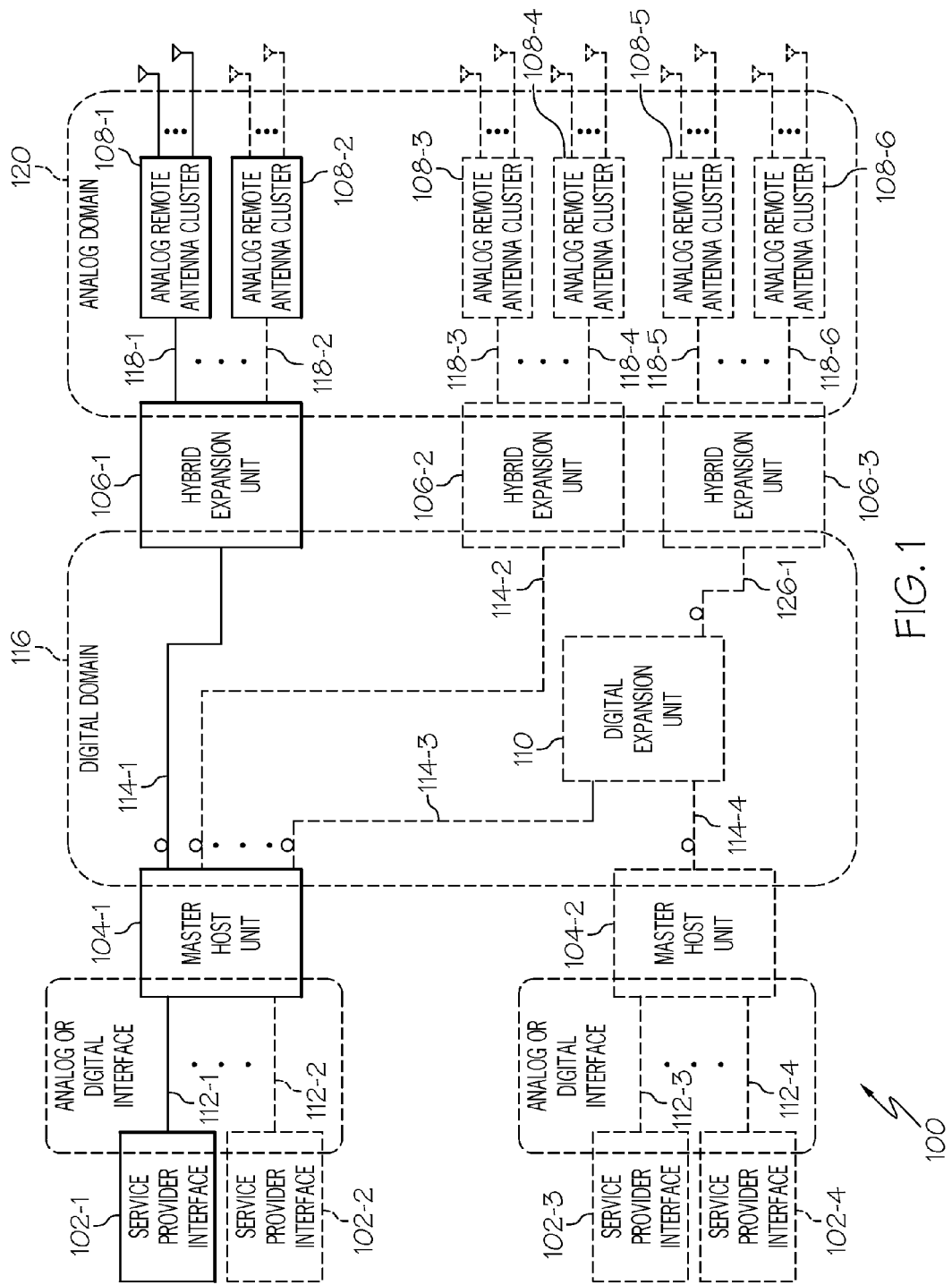
FIG. 1 is a block diagram of one embodiment of a system for providing wireless coverage into a substantially enclosed environment.

FIG. 1 is a block diagram of one embodiment of a system 100 for providing wireless coverage into a substantially enclosed environment. The system 100 includes at least one master host unit (MHU) 104, at least one hybrid expansion unit (HEU) 106, and at least one analog remote antenna cluster (ARAC) 108. The system communicates with at least a first service provider interface 102-1, though greater quantities of service provider interfaces 102 are used in other embodiments as shown by optional service provider interfaces 102-2 through 102-4. Example system 100 includes at least one hybrid expansion unit 106-1 and at least one analog remote antenna cluster 108-1. The hybrid expansion unit 106-1 is connected to the master host unit 104-1 using at least one digital communication link 114-1. The analog remote antenna cluster 108-1 is connected to the hybrid expansion unit 106-1 using at least one analog communication link 118.

Some embodiments of example system 100 include various combinations of additional optional components, such as a digital expansion unit 110 and greater quantities of master host units 104 (such as optional master host unit 104-2), hybrid expansion units 106 (such as optional hybrid expansion units 106-2 and 106-3), and/or analog remote antenna clusters 108 (such as optional analog remote antenna clusters 108-2 through 108-6). The optional hybrid expansion units 106 and digital expansion units 110 are connected to master host units 104 using digital communication links 114 (such as optional digital communication links 114-2 through 114-3) and the optional analog remote antenna clusters are connected to hybrid expansion units 106 using analog communication links (such as optional analog communication links 118-2 through 118-6). Each optional service provider interface 102 operates according to the description below. In addition, each optional master host unit 104 operates according to the description below. Similarly, each optional hybrid expansion unit 106 operates according to the description below. In addition, each analog remote antenna cluster 108 operates according to the description below. In addition, each optional digital expansion unit 110 operates according to the description below.

In some embodiments of system 100, optional analog remote antenna cluster 108-2 is connected to the hybrid expansion unit 106-1 using at least one analog communication link 118-2. Further, some embodiments of system 100 include optional hybrid expansion unit 106-2 connected to the master host unit 104-1 using at least one digital communication link 114-2. In some embodiments, optional analog remote antenna cluster 108-3 is connected to hybrid expansion unit 106-2 through at least one analog communication link 118-3 and optional analog remote antenna cluster 108-4 is connected to hybrid expansion unit 106-2 through at least one analog communication link 118-4.

In some embodiments of system 100, optional digital expansion unit 110 is connected to master host unit 104-1 using at least one digital communication link 114-3. Further, some embodiments of system 100 include optional hybrid expansion unit 106-3 connected to the optional digital expansion unit 110 using at least one digital expansion communication link 126-1. In some embodiments, optional analog remote antenna cluster 108-5 is connected to hybrid expansion unit 106-2 through at least one analog communication link 118-5 and optional analog remote antenna cluster 108-6 is connected to hybrid expansion unit 106-3 through at least one analog communication link 118-6.

Each service provider interface 102, such as service provider interface 102-1 and optional service provider interfaces 102-2 through 102-4, may include an interface to one or more of a base transceiver station (BTS), a repeater, a bi-directional amplifier, a base station hotel or other appropriate interface for one or more service provider networks.

The services may operate using various wireless protocols and in various bands of frequency spectrum. For example, the services may include, but are not limited to, 800 MHz cellular service, 1.9 GHz Personal Communication Services (PCS), Specialized Mobile Radio (SMR) services, Enhanced Special Mobile Radio (ESMR) services at both 800 MHz and 900 MHz, 1800 MHz and 2100 MHz Advanced Wireless Services (AWS), 700 MHz uC/ABC services, two way paging services, video services, Public Safety (PS) services at 450 MHz, 900 MHz and 1800 MHz Global System for Mobile Communications (GSM), 2100 MHz Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), or other appropriate communication services. The system 100 is capable of transporting both Single Input Single Output (SISO) and Multiple Input Multiple Output (MIMO) services at any of the frequencies described above. The system 100 can support any combination of SISO and MIMO signals across various bands of frequency spectrum. In some example embodiments, the system 100 may provide MIMO streams for WiMAX, LTE, and HSPA services while only providing SISO streams for other services. Other combinations of MIMO and SISO services are used in other embodiments.

In system 100, service provider interface 102-1 is connected to master host unit 104-1 over an analog communication link 112-1 and an optional service provider interface 102-2 is connected to master host unit 104-1 over an optional analog communication link 112-2. Each of analog communication link 112-1 and analog communication link 112-2 includes two analog communication media, such as coaxial cables or fiber optic cables. One analog communication media is for downstream communication and the other is for upstream communication. The downstream and upstream analog communication media have been shown as a single analog communication link 112-1 and a single optional analog communication link 112-2 for simplicity. In other embodiments, analog communication link 112-1 only includes a single physical media, which is used to carry both the downlink and uplink streams between the service provider interface 102-1 and the master host unit 104-1. Similarly, optional analog communication link 112-2 only includes a single physical media, which is used to carry both the downlink and uplink streams between the service provider interface 102-2 and the master host unit 104-1.

The master host unit 104-1 receives first downstream bands of radio frequency (RF) spectrum from service provider interface 102-1 over the analog communication link 112-1. In some embodiments, the master host unit 104-1 receives second optional downstream bands of RF spectrum from optional service provider interface 102-2 over the optional analog communication link 112-2. In addition, the master host unit 104-1 sends first upstream bands of radio frequency (RF) spectrum to the service provider interface 102-1 over the analog communication link 112-1. In some embodiments, the master host unit 104-1 sends optional second upstream bands of radio frequency (RF) spectrum to the optional service provider interface 102-2 over the optional analog communication link 112-2.

In other embodiments, the service provider interface 102-1 and the optional service provider interface 102-2 are connected to the master host unit 104-1 using respective digital communication links each using at least one digital communication media. Thus, while this disclosure describes analog communication link 112-1 and optional analog communication link 112-2, the format of these interfaces is not essential to operation of system 100. If an analog interface is used, the master host unit 104-1 converts the analog signal to a digital format as described below. If a digital interface is used, the master host unit 104-1 will either communicate the digital data as is or reformat the data into a representation that can be used for transport within the digital domain 116 described below. In example embodiments using a single physical medium for each analog communication link 112, frequency division multiplexing (FDM), time division multiplexing (TDM), and optical wavelength division multiplexing (WDM) are used to achieve a duplex connection over the single medium.

System 100 uses both digital and analog transport to extend the coverage of the wireless services into the substantially enclosed environment. First, system 100 uses digital transport over at least one digital communication link 114 to transport digitized RF spectrum between the master host unit 104-1 and the at least one hybrid expansion unit 106. In some embodiments including optional digital expansion unit 110, the system 100 uses digital transport over an optional digital communication link 114-3 to transport digitized RF spectrum between the master host unit 104-1 and the optional digital expansion unit 110. Each digital communication link 114 includes two digital communication media, such as fiber optic cables. One digital communication medium is for downstream communication and the other is for upstream communication. The downstream and upstream digital communication media have been shown as a single digital communication link 114 for simplicity.

The areas of digital transport are called the digital domain 116. In other implementations, digital transport can be used to transport between other components as well and the digital domain 116 is more expansive. In other embodiments, each digital communication link 114 only includes a single physical media, which is used to carry both the downlink and uplink streams between the master host unit 104-1 and the at least one digital expansion unit 110. In example embodiments using a single physical media for each digital communication link 114, optical multiplexing techniques (i.e., wavelength division multiplexing (WDM), coarse wavelength division multiplexing (CWDM), or dense wavelength division multiplexing (DWDM)) are used to achieve a duplex connection over the single medium.

While an optical fiber is used in the example system 100, other appropriate communication media can also be used for the digital transport. For example, other embodiments use free space optics, high speed copper or other wired, wireless, or optical communication media for digital transport instead of the optical fibers used in each of the at least one digital communication link 114. By using digital transport over the at least one digital communication link 114, the bands of RF spectrum provided by the service provider interface 102 can be transported over long distances with minimal errors and more resiliency and robustness to signal loss and distortion of the physical medium. Thus, system 100 may extend coverage for wireless services to buildings located significant distances from the service provider interface 102.

Second, system 100 uses analog transport over at least one analog communication link 118 between the at least one hybrid expansion unit 106 and the at least one analog remote antenna cluster 108 to extend the reach of the digital transport into the substantially enclosed environment. Each analog communication link 118 includes two analog communication media, such as coaxial cables. One analog communication media is for downstream communication and the other is for upstream communication. The downstream and upstream analog communication media have been shown as a single analog communication link 118 for simplicity. While coaxial cable is used in the example system 100, other appropriate communication media can also be used for the analog transport. The areas of analog transport are called the analog domain 120. In some embodiments, the signals are transported in the analog domain using intermediate frequencies (IF).

In other implementations, analog transport can be used to transport between other components as well and the analog domain 120 is more expansive. In other embodiments, each analog communication link 118 only includes a single physical medium, which is used to carry both the downlink and uplink streams between each hybrid expansion unit 106 and each analog remote antenna cluster 108. In example embodiments using a single physical medium for each analog communication link 118, frequency division multiplexing (FDM), time division multiplexing (TDM), and optical wavelength division multiplexing (WDM) are used to achieve a duplex connection over the single medium.

As discussed in further detail below, the various components of system 100 convert the wireless RF spectrum between radio frequencies (RF), various intermediate frequencies (IF), digitized bands of RF spectrum, and digitized IF. As baseband representations of the signals can also be used, the invention can be generalized to convert between analog and digital signals. These various conversions require that the digital domain 116 and the analog domain 120 be synchronized in time and frequency. Time synchronization is important to the sampling and reconstruction of the signals. Time synchronization is also important when time alignment of signals in the various parallel branches of the system is necessary. Frequency synchronization is important to maintaining the absolute frequency of the signals at the external interfaces of the system. In order to synchronize the digital domain 116 and the analog domain 120, a common reference clock is distributed throughout both the digital domain 116 and the analog domain 120 as described in detail below. This common clock allows for accurate conversion and recovery between RF, IF, digitized bands of RF spectrum, and digitized IF, or more broadly between analog spectrum and digital spectrum.

A time division duplexing (TDD) communication link is a wireless channel between a service provider interface and one or more mobile units that uses time division duplexing (TDD) to share the same frequency spectrum for downlink and uplink transmissions. To implement time division duplexing (TDD) at the antennas, the system includes at least one switch that is selected between a transmitter and a receiver in response to a TDD switching control signal generated by the system. The switch lies in the data path between a service provider interface and an antenna. Wireless signals are transmitted over air interfaces using the antenna when the switch is selected to a transmit mode. In contrast, wireless signals are received over air interfaces using the same antenna when the switch is selected to a receive mode. The switch can be positioned at various positions throughout the system as described below. In addition, to implement time division duplexing at the antennas, the system includes at least one switch signal controller that generates the TDD switching control signal used by the switch. The switch signal controller also lies in the data path between the service provider interface and the antenna. The switch signal controller can be positioned at various positions throughout the system as described below. In embodiments having multiple TDD data paths, each switch signal controller and its associated switch are in the data path between the respective service provider interface and antenna at each end of the DAS.

In some embodiments, the TDD switching control signal is sent in the digital domain 116 within the frames of digital data. In some embodiments, the TDD switching control signal is sent in the analog domain 120 as a separate IF channel. Transmission of the TDD switching control signal in both the digital domain 116 and the analog domain 120 is described in detail below.

Figure 2:
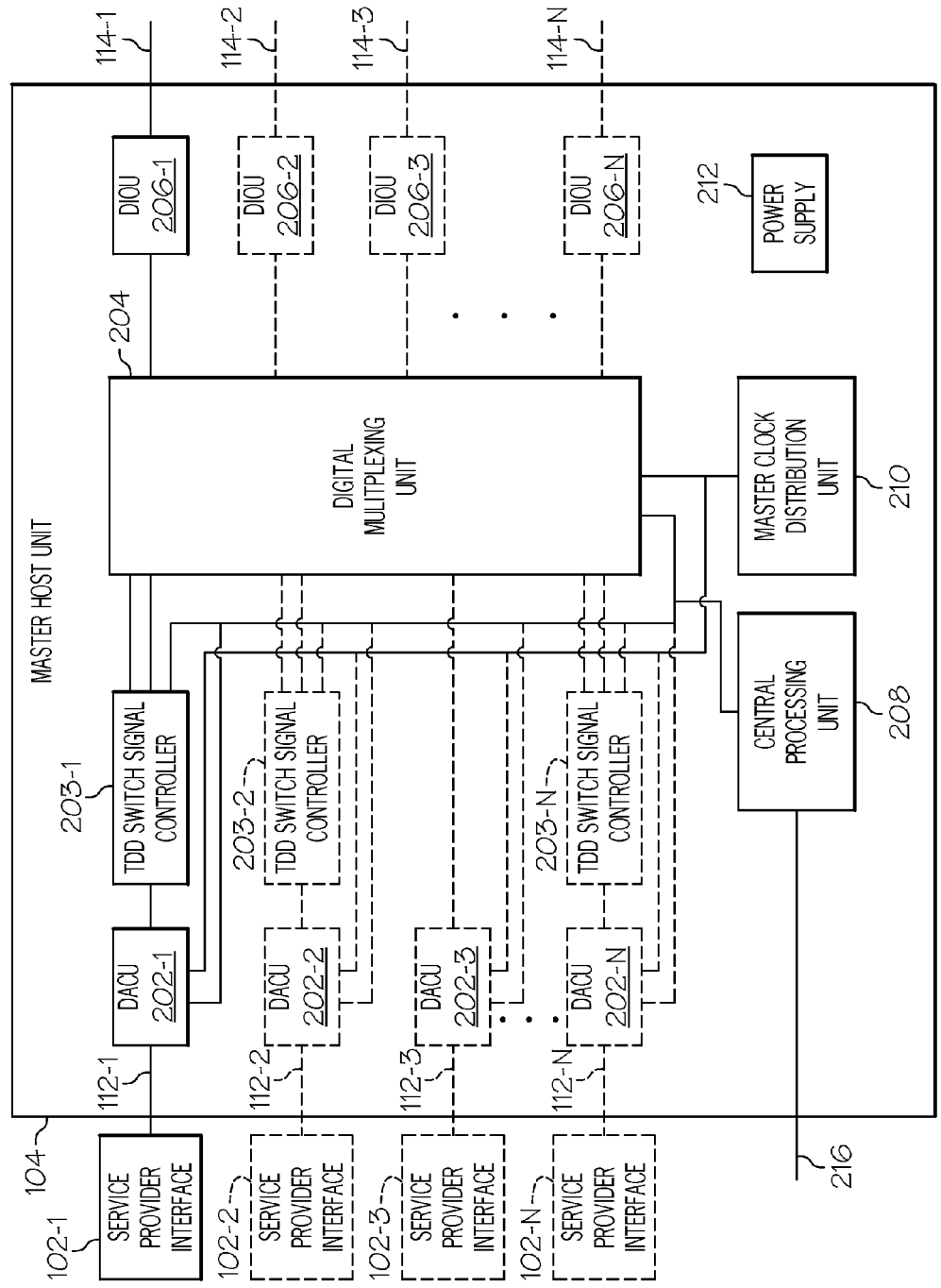
FIG. 2 is a block diagram of one embodiment of a master host unit for the system of FIG. 1.

FIG. 2 is a block diagram of one embodiment of the master host unit 104 of system 100. Master host unit 104 includes at least one digital-analog conversion unit (DACU) 202 (such as DACU 202-1 and optional DACU 202-2 through 202-N), at least one TDD switch signal controller 203 (such as TDD switch signal controller 203-1 and optional TDD switch signal controllers 203-2 through 203-N), at least one digital multiplexing unit (DMU) 204, at least one digital input-output unit (DIOU) 206 (such as DIOU 206-1 and optional DIOUs 206-2 through 206-N), at least one central processing unit (CPU) 208, at least one master clock distribution unit (MCDU) 210, and at least one power supply 212. In some embodiments, only some of the optional service provider interfaces 102 are providing TDD encoded signals and thus, TDD switch signal controllers 203 are only required for service provider interfaces 102 providing TDD signals. This is the case of example service provider interface 102-3 which does not provide a TDD encoded signal, such that no TDD switch signal controller 203 is required for example service provider interface 102-3.

The master host unit 104 communicates a first band of analog wireless spectrum with service provider interface 102-1. In addition, master host unit 104 includes a DACU 202-1 coupled with service provider interface 102-1 and associated with the first band of wireless spectrum. In some embodiments, the master host unit 104 communicates optional bands of analog wireless spectrum with optional service provider interfaces 102-2 through 102-N. In these embodiments, the master host unit 104 also includes optional DACUs 202-2 through 202-N coupled with corresponding optional service provider interfaces 102-2 through 102-N and associated with corresponding bands of analog wireless spectrum. These couplings may be accomplished in various ways. For example, service provider interface 102-1 is directly coupled to DACU 202-1 through analog communication link 112-1. In some embodiments, single service provider interfaces are coupled to multiple DACU through splitters/combiners (not shown for clarity). Similarly, in some embodiments, multiple service provider interfaces are coupled to single DACUs through splitter/combiners (not shown for clarity).

As noted above, each analog communication link 112 of system 100 represents two analog media, one for downstream communication and one for upstream communication. In other embodiments, each link includes greater or fewer analog media. In other embodiments, the master host unit communicates at least one band of digital spectrum with at least one service provider interface across at least one digital communication link using digital data or digitized spectrum. In example embodiments where a digital communication link is used between the service provider interface and the master host unit, the service provider interface communicates digital data directly with the master host unit and no analog to digital conversion, as described below, is necessary at the master host unit.

In these embodiments, the signals from service provider interface 102-1 and optional service provider interface 102-2 are first converted from analog to digital before being transmitted across the at least one digital communication link to the master host unit 104. Some example embodiments of master host unit 104 also include additional DACUs, such as optional DACU 202-3 and optional DACU 202-N, associated with additional optional service provider interfaces, such as optional service provider interface 102-3 and optional service provider interface 102-N.

Each DACU 202 operates to convert between at least one band of analog spectrum and N-bit words of digitized spectrum. Specifically, DACU 202-1 converts the first wireless spectrum between a first band of analog spectrum and a first set of N-bit words of digitized spectrum. Similarly, optional DACUs 202-2 through 202-N convert additional wireless spectrum between bands of analog spectrum and sets of N-bit words of digitized spectrum. In some embodiments, each DACU 202 is implemented with a Digital/Analog Radio Transceiver (DART board) commercially available from ADC Telecommunications, Inc. of Eden Prairie, Minn. as part of the FlexWave™ Prism line of products. The DART board is also described in U.S. patent application Ser. No. 11/627,251, assigned to ADC Telecommunications, Inc., published in U.S. Patent Application Publication No. 2008/0181282, and incorporated herein by reference. In some implementations, this occurs in stages, such that the analog spectrum is first converted to an IF frequency and subsequently converted to N-bit words of digitized spectrum. The bands of analog spectrum include signals in the frequency spectrum used to transport a wireless service, such as any of the wireless services described above. In some embodiments, master host unit 104 enables the aggregation and transmission of a plurality of services to a plurality of buildings or other structures so as to extend the wireless coverage of multiple services into the structures with a single platform.

Each TDD switch signal controller 203 (such as TDD switch signal controller 203-1 and optional TDD switch signal controllers 203-2 through 203-N) generates a TDD switching control signal for the respective wireless spectrum received from the respective DACU 202 (such as DACU 202-1 and optional DACU 202-2 through 202-N). The TDD switching control signals can be generated in a number of ways, including through external processing, internal processing, and by receiving an external signal. Various methods for generation are described below.

Generally, embodiments of the system 100 use time division duplexing (TDD) communications schemes. These schemes dictate that communication is divided into frames in time. Each frame includes a downlink subframe followed by an uplink subframe. Each start or end of a transmission is referred to as a transmission boundary. In some example embodiments, each TDD frame is substantially similar in structure, so that the downlink subframe and the uplink subframe include the same ratio of time used for the downlink subframe compared to time used for the uplink subframe. Thus, in some embodiments, each frame has the same duty cycle, such that the duration of downlink subframe and uplink subframe is fixed. In other embodiments, the duty cycle is variable, such that the duration of the downlink subframe to the uplink subframe is variable on a frame-by-frame basis. In some embodiments, a portion of the TDD frame is allocated for control data. In other embodiments, the TDD frame may have a variable duration, and/or multiple uplink or downlink subframes may be included within each frame.

In example system 100, the framing structure and timing for the TDD communication scheme is not related to the framing and/or timing used to transmit the signals through the digital domain 116 and analog domain 120 of the system 100.

In example system 100, the system 100 itself does not operate in a TDD manner, it just facilitates transmission of the TDD signals at the remote antennas by including a TDD switching control signal in the transmission through the DAS. Thus, the system 100 operates in a full-duplex manner in both the digital domain 116 and the analog domain 120. While this requires separate communication links for the upstream and downstream communication, it also enables system 100 to be a blended system, having both TDD and FDD signals.

In other example embodiments, the system 100 operates in a TDD manner in both the digital domain 116 and the analog domain 120. Thus, the system 100 operates in a half-duplex manner in both the digital domain 116 and the analog domain 120. While these TDD systems can use a single communication link for upstream and downstream communication, the timing requirements are more complex and do not facilitate easy transmission of both TDD and FDD signals. In other example embodiments, the system 100 operates in a TDD manner in one of the digital domain 116 and the analog domain 120.

In some example embodiments, the beginning portion of the TDD frame is allocated to the downlink subframe. At the end of the downlink subframe, a time gap occurs before the start of the uplink subfame. Then, the uplink subframe begins, followed by another time gap at the end of the uplink subframe and before the downlink subframe of the next TDD frame. During the downlink subframe, the base station is transmitting to one or more wireless terminals through the DAS. During the uplink subframe one or more wireless terminals are transmitting to the base station through the DAS. The time gaps between transmitting and receiving allows time for the base station, the wireless terminals, and the components in the DAS to switch between transmit and receive modes. In some embodiments, the time gaps also allow time margins for such things as base station/mobile synchronization and propagation delay determination/adjustment. In other embodiments, the uplink subframe comes first and is followed by the downlink subframe. In other embodiments, there may be variations across frames as to whether the downlink or uplink subframe comes first.

Generally, embodiments of system 100 include radio frequency (RF) circuitry that switches between processing downlink transmissions and uplink transmissions. Similar to the base station and wireless terminals, the switching in the RF circuitry within the system 100 occurs during the time gaps. Thus, it is important that the RF circuitry within the system 100 switch between transmit and receive mode at the appropriate time so that it can be properly synched with the transmitting and receiving of the base station and the wireless terminals.

In some embodiments, external processing is used to generate the TDD switching control signal in each TDD switch signal controller 203. External processing analyzes the signal in its modulated form. In embodiments of the TDD switch signal controllers 203 implementing external processing, each TDD switch signal controller 203 generates a TDD switching control signal by comparing power levels of signals in the wireless spectrum being analyzed by the respective TDD switch signal controller 203 with a threshold power level to determine whether the system should be transmitting or receiving at any particular period of time. In some embodiments the power level of wireless signals is analyzed in the downlink communication path. In other embodiments, the power level of wireless signals is analyzed in the uplink communication path. In some embodiments, the power level is monitored in a dynamic mode. In some embodiments, a periodic signal is generated in the digital domain. In exemplary embodiments, the TDD switching control signal is generated by correlating the detected signal power in the downlink against a reference to determine the downlink transmission start time and duration. In exemplary embodiments, the TDD switching control signal is generated by correlating the detected signal power in the uplink against a reference to determine the uplink transmission start time and duration.

In embodiments analyzing the power level of the signals in the downlink portion of the wireless spectrum, a power level of signals in a downlink communication path of the wireless spectrum is first measured. Next, the measured power level of the signals in the downlink communication path of the wireless spectrum is compared with a threshold downlink power level. Next, the TDD switching control signal is generated to indicate that the system should be transmitting when the power level of signals in the downlink communication path meets or exceeds the threshold downlink power level. In some embodiments, the TDD switching control signal is further generated to indicate that the system should be receiving when the power level of signals in the downlink communication path is below the threshold downlink power level. In some embodiments, both the power level of the signals in the uplink and the downlink communication path of the wireless spectrum are measured and compared against thresholds. In some example embodiments, the power level is measured over time or continuously measured and compared to the threshold. In some embodiments, the rate of measurement is adjusted to accurately identify when the system should be transmitting or receiving while minimizing overhead associated with continuous measurement. Thus, it is desirable that the rate of measurement be quick enough so that determination of a switching event is not missed. In exemplary embodiments, the TDD switching control signal is generated by correlating the detected signal power in the downlink against a reference to determine the downlink transmission start time and duration. In exemplary embodiments, the TDD switching control signal is generated by correlating the detected signal power in the uplink against a reference to determine the uplink transmission start time and duration.

In embodiments analyzing the power level of the signals in the uplink portion of the wireless spectrum, a power level of signals in an uplink communication path of the wireless spectrum is first measured. In example embodiments where measurements on the uplink are made, the measurements on the uplink are performed and the TDD switching control signal is generated between the TDD duplexing switch in the remote units and the antennas coupled to the remote units. Next, the measured power level of the signals in the uplink communication path of the wireless spectrum is compared with a threshold uplink power level. Next the TDD switching control signal is generated to indicate that the system should be receiving when the power level of signals in the uplink communication path meets or exceeds the threshold uplink power level. In some embodiments, the TDD switching control signal is further generated to indicate that the system should be transmitting when the power level of signals in the uplink communication path is below the threshold uplink power level.

In some embodiments, internal processing is used to generate the TDD switching control signal in each TDD switch signal controller 203. Internal processing demodulates the signal and analyzes the demodulated signal. In some embodiments implementing internal processing, the TDD switch signal controller 203 demodulates the signal. In other embodiments implementing internal processing, other hardware demodulates the signal before it is received at the TDD switch signal controller 203. Once each respective signal is demodulated, each TDD switch signal controller 203 implementing internal processing analyzes the frame structure in the demodulated signal to determine when the system should be in a transmit mode and when it should be in a receive mode. The TDD switching control signal is generated according to the analysis of the frame structure.

In some embodiments, an external signal is received at each TDD switch signal controller 203 from a respective service provider interface 102. In some embodiments, this external signal explicitly indicates information about when the signal coming from the service provider interface is in a transmit mode and when it is in a receive mode. In some embodiments, this external signal indicates when frames begin and includes additional information about the timing of the frame and/or the duty cycle of the frame. Each TDD switch signal controller 203 then generates the TDD switching control signal based on the external signal received from its respective service provider interface 102.

In some embodiments, the TDD switching control signals generated by each TDD switch signal controller 203 are sent to the DMU 204 to be embedded with each respective data stream of N-bit words of digitized spectrum as described below. In some embodiments, the TDD switching control signal is synchronized in time with the N-bit words of digitized spectrum it is associated with so that the downlink subframe is matched with the TDD switching control signal indicating the system should be in transmit mode and the uplink subframe is matched with the switching controls signal indicating the system should be in receive mode. Thus, it is clear when the spectrum should be transmitted and when the spectrum should be received at the remote units to properly align with the downlink subframe and the uplink subframe as described below. In other embodiments, each TDD switch signal controller 203 embeds the TDD switching control signal into its respective data stream of N-bit words of digitized spectrum before the stream is passed to the DMU 204.

Figure 23:
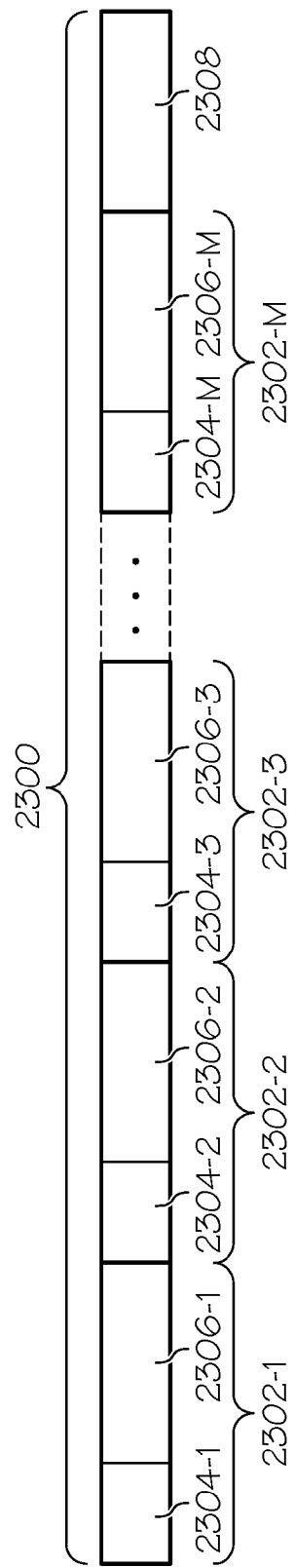
FIG. 23 is a block diagram of one embodiment of a frame in a framing structure for a digital link between digital components in the digital domain of a system for providing wireless coverage into a substantially enclosed environment.

FIG. 23 is a block diagram of one embodiment of a frame 2300 in a framing structure for digital communication links between digital components (such as master host units 104, hybrid expansion units 106, digital expansion units 110, and digital remote antenna units 122) in the digital domain 116 of the system 100. TDD switching control signals can be embedded into the framing structure in various ways. In example embodiments where the TDD switching control signals are generated at the master host units 104, these TDD switching control signals are embedded into the framing structure at the digital multiplexing unit 204 (see FIG. 2 and accompanying description). In example embodiments where the TDD switching control signals are generated at the hybrid expansion units 106, the TDD switching control signals are embedded into the framing structure at the analog multiplexing unit 208 (see FIG. 18 and accompanying description) in the analog domain.

The frame 2300 includes a plurality of sampled data words 2302 (such as sampled data words 2302-1 through 2302-M) and at least one control word 2308. In some embodiments, there are twelve sampled data words 2302 in each frame (sampled data words 2302-1 through 2302-12) and one control word 2308. In some embodiments, the control word 2308 is used for generic control relating to the system as a whole. For example, the control word may include an auxiliary communication channel, such as an Ethernet link. In other embodiments, there are greater or fewer sampled data words 2302 and control words 2308.

Each sampled data word 2302 (such as sampled data words 2302-1 through 2302-M) is divided into embedded control bits 2304 (such as embedded control bits 2304-1 through 2304-M) and a sampled data portion 2306 (such as sampled data portions 2306-1 through 2304-M). The embedded control bits 2304 may be used for control signals, such as signaling bits, Ethernet control (which is higher rate than an Ethernet link contained only in the control word 2308), and synchronization. In some embodiments, the embedded control bits 2304 correspond to the sampled data in the same data word. In other embodiments, the embedded control bits 2304 do not correspond to the sampled data in the same data word. The sampled data portion 2306 contains the actual sampled data that is being communicated across the digital communication links 114 and digital expansion communication link 126 in the digital domain 116.

Figure 24:
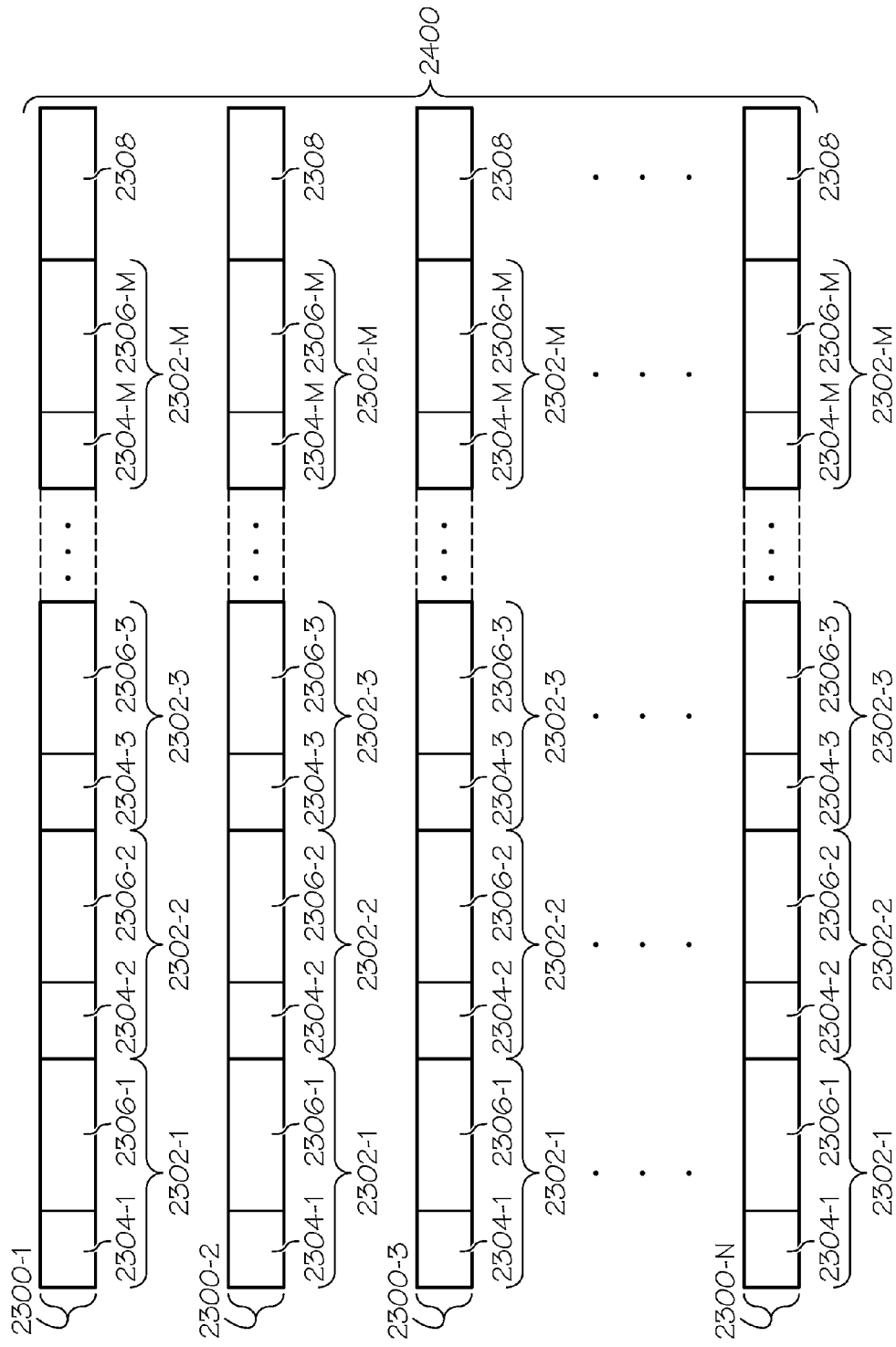
FIG. 24 is a block diagram of one embodiment of a superframe in a framing structure comprising multiple frames of FIG. 23.

FIG. 24 is a block diagram of one embodiment of a super-frame 2400 in the framing structure for digital communication links described above. A single super-frame 2400 includes multiple frames 2300 (such as frames 2300-1 through 2300-N). In some example embodiments, multiple sub-streams are transmitted using the framing structure shown in FIG. 24. Each sub-stream contains data pertaining to a service provider interface 102, such as WIMAX, LTE TDD, etc. Each sub-stream may utilize multiple sampled data words 2302 in a super-frame. In some embodiments, different sub-streams use different amounts of sampled data words 2302 in each frame 2300 and/or super-frame 2400 to attain a desired rate. In some example embodiments, a few sampled data words 2302 in each frame 2300 and/or super-frame 2400 are used for a first sub-stream, a few sampled data words 2302 in each frame 2300 and/or super-frame 2400 are used for a second sub-stream, etc. In some embodiments, some of the sub-streams require TDD switching while others do not.

Figure 25A:
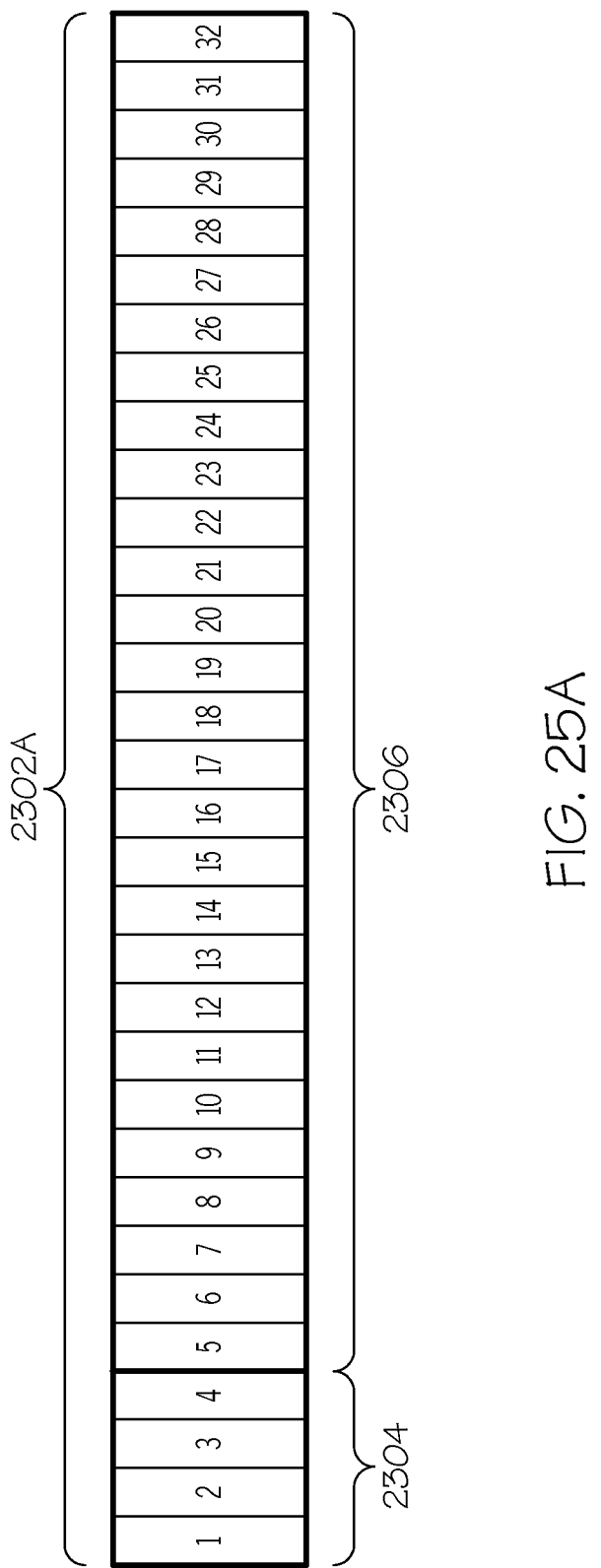
FIG. 25A is a block diagram of one embodiment of a sampled data word of the frame of FIG. 23.

FIG. 25A is a block diagram of one embodiment of a sampled data word 2302 (such as sampled data words 2302-1 through 2302-M) of a frame 2300 (such as frames 2300-1 through 2300-M), labeled sampled data word 2302A. Example sampled data word 2302A includes four embedded control bits 2304 at the beginning of the word and 28 bits in the sampled data portion 2306 following the four embedded control bits 2304, totaling to 32 bits. In some example embodiments, a single bit from the four embedded control bits 2304 represents the TDD switching control signal for a particular TDD encoded signal having data in the sampled data portion 2306 of the sampled data word 2302A. Thus, the TDD switching control signal is a binary value indicating whether the TDD encoded signal present in the sampled data portion 2306 is in a transmitting or receiving mode.

In other example embodiments of sampled data word 2302A, a plurality of the four embedded control bits 2304 represent the TDD switching control signal used to signal whether the TDD encoded signal present in the sampled data portion 2306 is in a transmitting or receiving mode. Specifically, in some example embodiments, three of the four embedded control bits 2304 are used in a majority rule scheme for robustness. In embodiments implementing the majority rule logic, the same TDD signal status (either transmit mode or receive mode) is sent on each of three of the four embedded control bits 2304. Thus, if there is no corruption of any of the three bits, the same TDD status will be indicated on all three bits. But if there is corruption of any of the bits, the system components receiving the TDD switching control signal (such as a hybrid expansion unit 106, a digital expansion unit 110, or a digital remote antenna unit 122) will implement the majority rule logic by determining the TDD signal status of the TDD switching control signal based on what the majority of the bits indicate. Thus, if two of three of the bits indicate the TDD status is in transmitting mode, then transmitting mode will be selected at the switch. Similarly, if two of three of the bits indicate the TDD status is in receiving mode, then receiving mode will be selected at the switch. In other example embodiments, the TDD switching control signal is encoded by embedding a code, such as but not limited to an error detection and/or an error correction code (such as but not limited to a convolution code or a block code) into a plurality of the control bits 2304. The embedded code is used to indicate the TDD status (transmitting mode or receiving mode) of the sampled data in the sampled data portion 2306. Thus, a single bit error might not cause the TDD status to be incorrectly received at a switch in the downstream direction.

In some example embodiments of sampled data word 2302A, the sampled data in the sampled data portion 2306 is a complex data sample where a portion of the sampled data portion 2306 is used for real samples (such as in-phase (I) samples in a quadrature amplitude modulation sampled signal) and another portion of the sampled data portion 2306 is used for imaginary samples (such as quadrature (Q) samples in a quadrature amplitude modulation sampled signal). In some example embodiments, greater or fewer bits are in the embedded control bits 2304 or the sampled data portion 2306. In some example embodiments, the embedded control bits 2304 are placed at a different position within the sampled data word 2302, such as at the end, in the middle, or interspersed throughout the sampled data portion 2306.

Figure 25B:
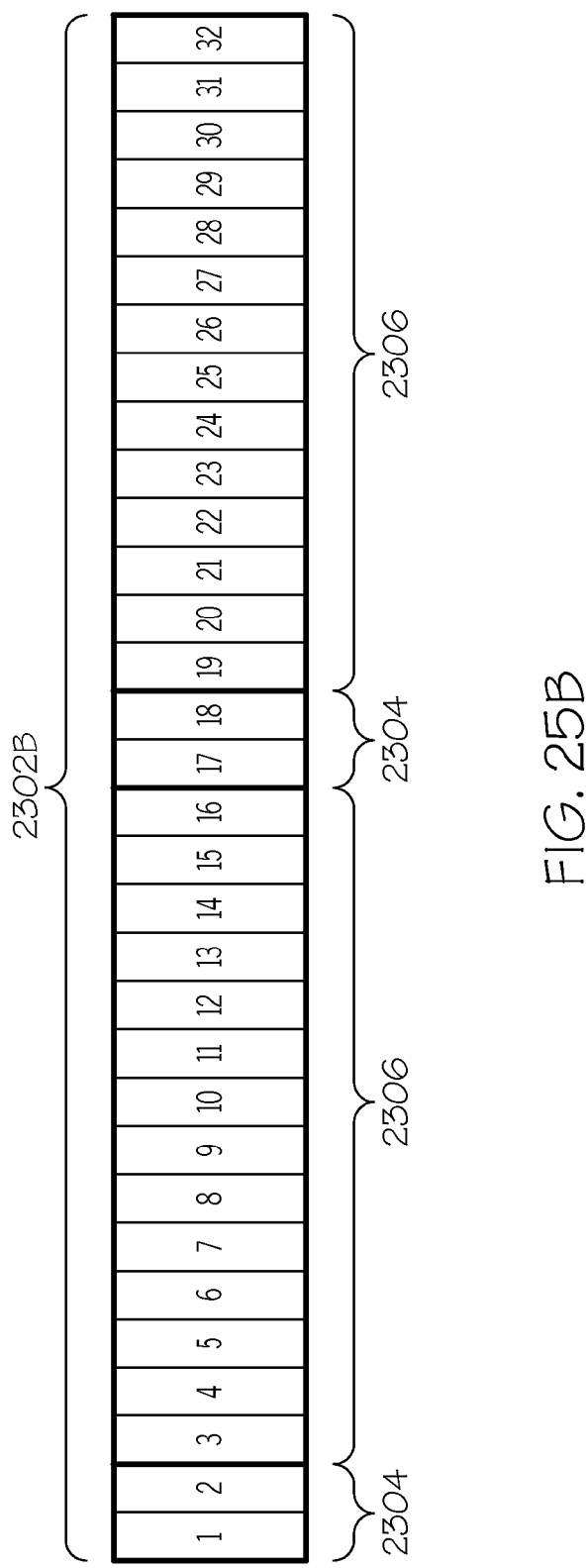
FIG. 25B is a block diagram of another embodiment of a sampled data word of the frame of FIG. 23.

FIG. 25B is a block diagram of one embodiment of a sampled data word 2302 (such as sampled data words 2302-1 through 2302-M) of a frame 2300 (such as frames 2300-1 through 2300-M), labeled sampled data word 2302B. Example sample data words 2302B includes two of the four embedded control bits 2304 at the beginning of the word followed by 14 bits of the sampled data portion 2306 followed by the other two embedded control bits 2304 and the remaining 14 bits of the sampled data portion 2306, totaling to 32 bits. Similar to embodiments described above, in some example embodiments, the TDD switching control signal for the TDD signal present in the sampled data portion of the sampled data word 2302 is transmitted using a single bit from the four embedded control bits 2304. This single bit is used to signal whether the TDD signal present in the sampled data portion 2306 is in a transmitting or receiving mode.

Similar to example embodiments described above, in other example embodiments of sampled data word 2302B, the TDD switching control signal is encoded using a plurality of the four embedded control bits 2304 in a majority rule scheme as described above. Similar to example embodiment described above, in other example embodiments of sampled data word 2302B, the TDD switching control signal is encoded using a code, such as but not limited to an error detection and/or error correction code (such as but not limited to a convolution code or a block code) embedded into a plurality of control bits 2304 and used to indicate the TDD status (transmitting mode or receiving mode) of the sampled data in the sampled data portion 2306.

Similar to example embodiments described above, in some example embodiments of sampled data word 2302B, the sampled data in the sampled data portion 2306 is a complex data sample where a portion of the sampled data portion 2306 is used for real samples (such as in-phase (I) samples in a quadrature amplitude modulation sampled signal) and another portion of the sampled data portion 2306 is used for imaginary samples (such as quadrature (Q) samples in a quadrature amplitude modulation sampled signal). In one specific example, the first half of the sampled data portion 2306 before the second two embedded control bits 2304 is used for the real samples and the second half of the sampled data portion 2306 after the second two embedded control bits 2304 is used for the imaginary samples.

In some example embodiments of sampled data word 2302B, greater or fewer bits are in the embedded control bits 2304 or the sampled data portion 2306. In some example embodiments, the embedded control bits 2304 are placed at different positions within the sampled data word 2302, such as at the end, in the middle, or interspersed throughout the sampled data portion 2306 in other ways.

In some example embodiments, TDD switching control signals are not transmitted using the embedded control bits 2304 of the sampled data word 2012. Instead, TDD switching control signals are transmitted using one or more bits from the control word 2308. In some example embodiments, these bits are used to signal the TDD mode for one or more of the sampled data words 2302 in a particular frame 2300. In some example embodiments where the TDD mode is signaled in the control word 2308, one bit is used to signal the mode for each sampled data word 2302 in the frame 2300. Thus, in an embodiment having twelve sampled data words 2302, twelve bits in the control word 2308 would be used to signal the TDD mode for all the sampled data words 2302, one bit corresponding to each sampled data word 2302. In other embodiments where TDD switching control signals are transmitted in the control word 2308, a plurality of bits are used to signal the TDD mode of each sampled data word 2302 in the frame 2300 using a majority rule scheme or code for robustness as described above.

In some example embodiments where the TDD switching control signals are transmitted in the control word 2308, the TDD mode is signaled for the frame as a whole or for a subset of the frame. In other example embodiments, the TDD switching control signals indicating the TDD mode are transmitted in embedded control bits 2304, but they are not transmitted in every sampled data word 2302. In these embodiments, the TDD switching control signal may only be transmitted once every other sampled data word 2302, every fourth sampled data word 2302, or any other acceptable rate. The rate of transmission of the TDD switching control signal for TDD mode signaling may be selected by considering how accurate the TDD switch point is in light of how much bandwidth they want to give up in their channel to the TDD switching control signals. In some embodiments and depending on the protocol used, it might be acceptable to transmit the TDD switching control signals once per frame in the control word 2308 or even at a slower rate.

In some embodiments, some of the embedded control bits 2304 and/or bits in the control word 2308 are used for other purposes and are not available for the TDD switching control signal. Thus, in some embodiments, the amount of embedded control bits 2304 and/or bits in the control word 2308 is increased to accommodate the TDD switching control signals. In some embodiments, the data words 2302 are compressed so that they require fewer bits in the sampled data portion 2306. In these embodiments, the extra bits in the data words 2302 are used for TDD switching control signals. In some of these embodiments, these extra bits are considered part of the embedded control bits 2304.

While switch signal controller 203 is described above as being in the master host unit 104, it can be implemented at other positions along the data path for a particular TDD wireless spectrum between the respective service provider interface 102 and antenna at the other end of the DAS. Alternative positions for the TDD switch signal controller are described in detail below.

The DMU 204 multiplexes the first wireless spectrum received as N-bit words of digitized spectrum received from at least one DACU 202 (such as DACU 202-1) through at least one TDD switch signal controller 203 (such as TDD switch signal controller 203-1) with at least one TDD switching control signal generated by the at least one TDD switch signal controller 203 (such as TDD switch signal controller 203) and associated with the first wireless spectrum N-bit words of digitized spectrum and outputs a time-multiplexed digital data stream containing both the first wireless spectrum and other optional wireless spectrum (such as other TDD signals or FDD signals in the same stream), if present, to at least one DIOU 206 (such as DIOU 206-1). In some embodiments, this multiplexing is performed by placing the TDD switching control signal into the embedded control bits 2304 of sampled data words 2302 or the control words 2308 of frames 2300 as described above.

The at least one TDD switching control signal indicates when the first wireless spectrum represented by the N-bit words of digitized spectrum should be in a receive mode and when it should be in a transmit mode. In some embodiments supporting multiple wireless spectrums from multiple service provider interfaces, the DMU 204 multiplexes additional wireless spectrum received as N-bit words of digitized spectrum with the first wireless spectrum. In these embodiments, additional DACUs 202 (such as optional DACUs 202-2 through DACU 202-N), additional TDD switch signal controllers 203 (such as optional TDD switch signal controllers 203-2 through 203-N), and additional TDD switch signal controllers 203 (such as optional TDD switch signal controllers 203-2 through 203-N) are also included in the master host unit 104.

In other embodiments, the first and other optional wireless spectrums are multiplexed in other ways. The DMU 204 also demultiplexes an upstream time-multiplexed digital data stream containing both the first wireless spectrum and other optional wireless spectrums, if present, received from at least one DIOU 206. The DMU 204 outputs a first stream of N-bit words of digitized spectrum containing the upstream first wireless spectrum to the DACU 202-1. The DMU 204 also outputs a second stream of N-bit words of digitized spectrum containing the upstream second wireless spectrum to the DACU 202-2. In some embodiments, each DMU 204 is implemented with a Serialized RF (SeRF board) commercially available from ADC Telecommunications, Inc. of Eden Prairie, Minn. as part of the FlexWave™ Prism line of products. The SeRF board is also described in U.S. patent application Ser. No. 11/627,251, assigned to ADC Telecommunications, Inc., published in U.S. Patent Application Publication No. 2008/01101482, and incorporated herein by reference.

Each DIOU 206 communicates a time-multiplexed digital data stream containing wireless spectrums across at least one digital communication link 114 (digital communication link 114-1 and optional digital communication links 114-2 through 114-N) using digital transport. The time-multiplexed digital data stream communicated across the digital communication link 114 includes N-bit words of digitized spectrum for both the first wireless spectrum and the second wireless spectrum, if present. Each DIOU 206 also receives at least one digitized multiplexed signal from the at least one digital communication link 114 using digital transport and sends the at least one digitized multiplexed signal to the DMU 204 for processing. In some embodiments of system 100 shown in FIG. 1, the digital communication link 114-1 is connected to hybrid expansion unit 106-1 and digital communication link 114-3 is connected to optional digital expansion unit 110.

DIOU 206-1 communicates using digital transport with hybrid expansion unit 106-1 and DIOU 206-2 communicates using digital transport with optional digital expansion unit 110. As noted above, each digital communication link 114 represents two digital media, one for downstream communication and one for upstream communication. In addition to carrying the digitized multiplexed signals, each digital communication link 114 may also be used to communicate other types of information such as the TDD switching control signal, system management information, control information, configuration information and telemetry information. The hybrid expansion unit 106 and digital remote antenna unit 122 are described in detail below.

Each DACU 202, each TDD switch signal controller 203, and each DMU 204 is synchronized with the other components of master host unit 104 and system 100 generally. Master clock distribution unit 210 generates a digital master reference clock signal. This signal is generated using any stable oscillator, such as a temperature compensated crystal oscillator (TCXO), an oven controlled crystal oscillator (OCXO), or a voltage controlled crystal oscillator (VCXO). In the embodiment shown in FIG. 2, the stable oscillator is included in the master clock distribution unit 210. In other embodiments, a reference clock external to the master host unit is used, such as a clock from a base station, a GPS unit, or a cesium atomic clock. In embodiments where digital data is communicated between service provider interface 102 and master host unit 104, the master clock distribution unit 210 may derive the reference clock signal from the digital data stream itself or an external clock signal may be used.

The digital master reference clock signal is supplied to each DACU 202, each TDD switch signal controller 203, and each DMU 204 in the master host unit 104. Each DACU 202 uses the clock to convert between at least one band of analog spectrum and N-bit words of digitized spectrum. The DMU 204 uses the clock to multiplex the various streams of N-bit words of digitized spectrum together and outputs the multiplexed signal to each DIOU 206. Thus, the downstream digital data streams output by each DIOU 206 are synchronized to the digital master reference clock signal. Thus, through the clocking of the downstream digital data streams, the digital master reference clock signal is distributed to each hybrid expansion unit 106 and each digital expansion unit 110 through each corresponding digital communication link 114.

CPU 208 is used to control each DACU 202, each TDD switch signal controller 203, and each DMU 204. An input/output (I/O) line 216 coupled to CPU 208 is used for network monitoring and maintenance. Typically, I/O line 216 is an Ethernet port used for external communication with the system. Other communication protocols such as Universal Serial Bus (USB), IEEE 1394 (FireWire), and serial may also be used. Power supply 212 is used to power various components within master host unit 104.

Figure 3:
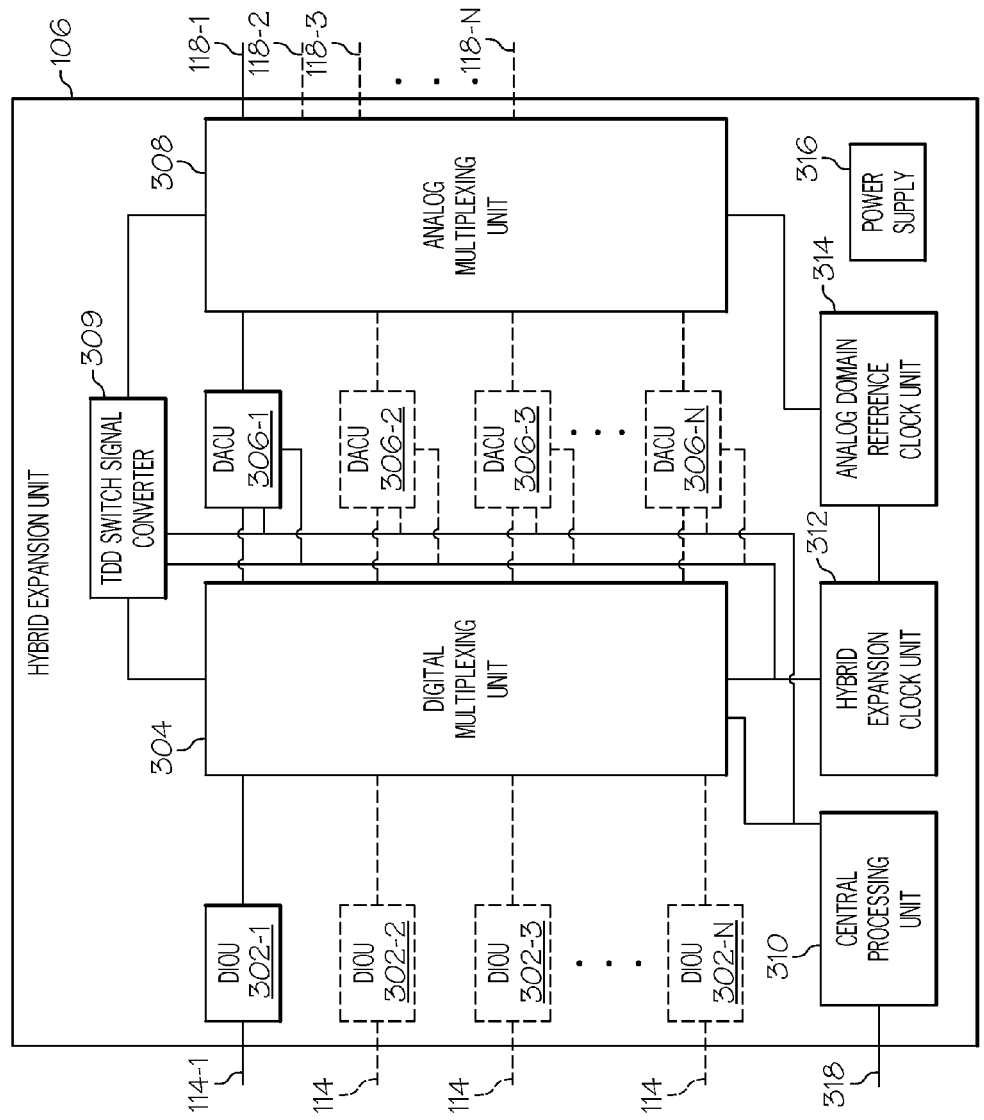
FIG. 3 is a block diagram of one embodiment of a hybrid expansion unit for the system of FIG. 1.

FIG. 3 is a block diagram of one embodiment of a hybrid expansion unit 106 of system 100. Hybrid expansion unit 106 of system 100 includes at least one digital input-output unit (DIOU) 302 (such as DIOU 302-1 and optional DIOU 302-1 through 302-N), at least one digital multiplexing unit (DMU) 304, at least one digital-analog conversion unit (DACU) 306 (such as DACU 306-1 and optional DACUs 306-2 through 306-N), at least one analog multiplexing unit (AMU) 308, at least one TDD switch signal converter 309, at least one central processing unit (CPU) 310, at least one digital expansion clock unit (DECU) 312, at least one analog domain reference clock unit (ADRCU) 314, and at least one power supply 316.

Each hybrid expansion unit 106 communicates at least one band of digitized spectrum with the master host unit 104 in the form of a multiplexed digitized signal containing N-bit words of digitized spectrum. The multiplexed digitized signal is received at the at least one DIOU 302 through at least one digital communication link 114. In the embodiment shown in FIG. 3, only one DIOU 302-1 is necessary if the hybrid expansion unit 106 is only coupled with a single upstream master host unit 104 (or single upstream digital expansion unit 110 as described in detail below). In other embodiments that require more data throughput than can be handled by a single digital data link 114, a single hybrid expansion unit 106 includes multiple DIOUs 302 (such as optional DIOU 302-2 through DIOU 302-N) that are used to couple a single master host unit 104 with the single hybrid expansion unit 106. In other embodiments, hybrid expansion unit 106 has multiple DIOUs 302 (such as optional DIOU 302-1 through DIOU 302-N) and is connected to multiple upstream master host units 104 or digital expansion units 110 through digital communication links 114. In other embodiments, hybrid expansion unit 106 is connected to other hybrid expansion units through DIOU 302. In some embodiments including multiple upstream connections, the hybrid expansion unit 106 selects one DIOU 302 to extract the clock signal from.

The at least one DIOU 302 communicates the multiplexed digitized signal containing N-bit words of digitized spectrum to the DMU 304. The DMU 304 demultiplexes N-bit words of digitized spectrum representing the first wireless spectrum and other optional wireless spectrum from the digitized signal received from the at least one DIOU 302 and sends the N-bit words of digitized spectrum representing the first wireless spectrum to the DACU 306-1 and any optional N-bit words of digitized spectrum representing the additional optional wireless spectrum to the optional DACUs 306-2 through 306-N. DACU 306-1 converts the N-bit words of digitized spectrum representing the first wireless spectrum to a third band of analog spectrum. Optional DACU 306-2 through 306-N convert the N-bit words of digitized spectrum representing other optional wireless spectrum to additional bands of analog spectrum and pass the analog spectrum to the analog multiplexing unit 308.

In some embodiments, DACU 306-1 and optional DACUs 306-2 through 306-N convert the digitized signals into intermediate frequencies for simultaneous transport across a single analog medium. Specifically, DACU 306-1 converts the first wireless spectrum from N-bit words of digitized spectrum into a third band of analog spectrum occupying a first frequency range. In addition, optional DACUs 306-2 through 306-N convert additional wireless spectrum from N-bit words of digitized spectrum into additional bands of analog spectrum occupying additional frequency ranges. The third band of analog spectrum and each optional additional band of analog spectrum are each at different intermediate frequencies (IFs), allowing both the first wireless spectrum and the additional optional wireless spectrum to be simultaneously communicated across an analog medium as described below. In some other embodiments, the at least one DACU 306 converts the digitized signal back to the original analog frequency provided by the at least one service provider interface 102. In other embodiments, other components are included in the hybrid expansion unit 106 that frequency convert at least one band of analog spectrum output by the DACU 306 into an intermediate frequency for transport.

Each DACU 306 is coupled with the AMU 308. Each DACU 306 also converts at least one band of analog spectrum received from the AMU 308 into N-bit words of digitized spectrum. In some embodiments, AMU 308 receives multiple bands of analog spectrum from multiple DACUs 306 and multiplexes the bands of analog spectrum together into at least one multiplexed analog signal including multiple bands of analog spectrum. In some embodiments, there are a plurality of multiplexed analog signals output from the AMU 308. In some embodiments, all of the bands of analog spectrum from each DACU 306 are included on each multiplexed signal output by AMU 308. In other embodiments, a subset of the bands of analog spectrum from a plurality of DACU 306 are multiplexed onto one signal output on one of the at least one analog communication link 118, while a different subset of bands of analog spectrum from a plurality of DACU 306 are multiplexed onto another signal output on another of the at least one analog communication link 118. In other embodiments, different combinations of bands of analog spectrum from various DACU 306 are multiplexed onto various analog communication links 118.

In some embodiments including multiple DACUs 306, each DACU 306 converts a band of digitized spectrum to a different analog frequency from the other DACUs 306. Each band of analog spectrum is pre-assigned to a particular analog frequency. Then, the AMU 308 multiplexes the various pre-assigned analog frequencies together, in addition to the analog domain reference clock and any communication, control, or command signals (including any TDD control signals) and outputs them using at least one analog communication link 118. Specifically, DACU 306-1 converts the first path between the first N-bit words of digitized spectrum and a first intermediate frequency (IF). Similarly, the other optional DACUs 306-2 through 306-N convert additional wireless spectrum between other N-bit words of digitized spectrum and other intermediate frequencies (IF). The AMU 308 then multiplexes the first wireless spectrum with any additional optional wireless spectrum and outputs them using the analog communication link 118-1.

In other embodiments, each DACU 306 converts a band of analog spectrum to the same analog frequency as the other DACU 306. Then, the AMU 308 shifts the received signals into distinct analog frequencies and multiplexes them together and outputs them using at least one analog communication link 118. Specifically, DACU 306-1 converts the first wireless spectrum between the first N-bit words of digitized spectrum and a first analog spectrum. Similarly, DACUs 306-2 through 306-N convert the other optional wireless spectrum between N-bit words of digitized spectrum and analog spectrum. The AMU 308 then shifts the first analog spectrum to a first intermediate frequency (IF) and shifts the second analog spectrum to a second intermediate frequency (IF). The AMU 308 multiplexes the first and second intermediate frequencies together and outputs them using the analog communication link 118-1.

In the embodiment shown in FIG. 3, the AMU 308 multiplexes the analog frequencies received from each DACU 306 onto each analog communication link 118. In other embodiments, bands of frequency spectrum from certain DACU 306 are selectively distributed to certain analog communication links 118. In one example embodiment, analog communication link 118-1 is coupled to analog remote antenna cluster 108-1 and only a first subset of bands of analog spectrum are transported using analog communication link 118-1. Further, analog communication link 118-2 is coupled to analog remote antenna cluster 108-2 (shown in FIG. 1 and described below) and only a second subset of bands of analog spectrum are transported using analog communication link 118-2. In another embodiment, a first subset of bands of analog spectrum are transported to analog remote antenna cluster 108-1 using analog communication link 118-1 and a second subset of bands of analog spectrum are transported to the same analog remote antenna cluster 108-1 using analog communication link 118-2. It is understood that these examples are not limiting and that other system topologies, hierarchies, and structures are used in other embodiments.

In the embodiment shown in FIG. 3, the TDD switch signal converter 309 takes the TDD switching control signals that are demultiplexed from the downstream signals of the digital communication links 114 by the DMU 304 and converts them into a format that can be used to signal the TDD state of each TDD communication link in the analog domain. In some example embodiments, the TDD switching control signals are transmitted using the embedded control bits 2304 of sampled data words 2302 or the control words 2308 of frames 2300 as described above.

In some example embodiments, amplitude shift keying (ASK) is applied to a carrier signal to indicate the TDD state. In some example embodiments, a separate carrier is required for each TDD communication link. These ASK modulated carriers would then be multiplexed with their associated downstream signals onto the appropriate analog communication links by the analog multiplexing unit 308. In embodiments where multiple TDD communication links have their TDD states synchronized, one carrier signal can be used to signal the common TDD state of the synchronized TDD communication links. In other example embodiments, different types of modulation formats, such as frequency shift keying (FSK) or phase shift keying (PSK) could be applied to the carrier signals to indicate the TDD states of the associated TDD communication links.

In some example embodiments, the TDD switch signal converter 309 includes a synchronization mechanism to ensure that the analog domain TDD switching control signals are sufficiently time aligned with the signals entering the analog multiplexing unit 308 from the DACU 306. In one embodiment, the synchronization mechanism could be a delay element which inserts sufficient delay to equalize the delay encountered as signals propagate from the DMU 304 through the DACU 306 and into the AMU 308. In embodiments where multiple TDD communication links do not have their TDD states synchronized, instead of using a carrier signal for each TDD communication link, a single carrier signal could be modulated with a higher order modulation scheme such as multi-phase shift keying (M-PSK) or multi-quadrature amplitude modulation (M-QAM) to indicate the TDD state for multiple TDD communication links.

Each DMU 304, DACU 306, AMU 308, and TDD switch converter 309 is synchronized with the other components of hybrid expansion unit 106 and system 100 generally. In the example embodiment shown in FIG. 3, DIOU 302-1 receives the data stream from a master host unit 104 via a digital communication link 114 in an optical format. DIOU 302-1 converts the data stream from the optical format to an electrical format and passes the data stream onto the DMU 304. The DMU 304 extracts the digital master reference clock signal from the data stream itself. Because the data stream was synchronized with the digital master reference clock signal at the master host unit 104, it can be recovered from the data stream itself. The extracted digital master reference clock signal is sent to the hybrid expansion clock unit 312. Each DIOU 302 is not required to be synchronized to the other parts of the hybrid expansion unit unless it performs some type of function that requires it to be synchronized. In one embodiment, the DIOU 302 performs the extraction of the digital master reference clock in which case it would be synchronized to the remainder of the hybrid expansion unit.

The hybrid expansion clock unit 312 receives the digital master reference clock signal extracted from the data stream received from the master host unit 104. The hybrid expansion clock unit 312 communicates the digital master reference clock signal to various components of the hybrid expansion unit 106, including the DMU 304, each DACU 306, and the TDD switch signal converter 309. Each DMU 304, DACU 306, and the TDD switch signal converter 309 uses the digital master reference clock signal to synchronize itself with the system 100. In other embodiments, the hybrid expansion clock unit 312 could receive a copy of the data stream from the DMU 304 and extract the digital master reference clock signal from the data stream itself. In some embodiments, each DIOU 302 is selectable and configurable, so that one DIOU 302 can be selected to receive the digital master reference clock signal and other DIOUs 302 can be used to send the digital master reference clock signal upstream to other system components, such as secondary master host units, digital expansion units, or other hybrid expansion units.

In addition, the hybrid expansion clock unit 312 distributes the digital master reference clock signal to the analog domain reference clock unit 314. The analog domain reference clock unit 314 in turn generates an analog domain reference clock signal based on the digital master reference clock signal. This analog domain reference clock signal is used to synchronize analog components in the hybrid expansion unit 106, such as analog frequency conversion functions in the AMU 308. In addition, the AMU multiplexes the analog domain reference clock signal onto the multiplexed signals sent on each analog communication link 118 to the at least one analog remote antenna cluster 108.

In the embodiment of hybrid expansion unit 106 shown in FIG. 3, the analog domain reference clock unit 314 generates the analog domain reference clock signal by running the digital master reference clock signal through a phase locked loop circuit. In some embodiments, the digital master reference clock signal is approximately 184.32 MHz and the analog domain reference clock signal is generated as a 30.72 MHz clock based on the 184.32 MHz digital master reference clock signal. Thus, the 30.72 MHz clock is multiplexed onto the multiplexed signals sent on each analog communication link 118 to at least one analog remote antenna cluster 108.

CPU 310 is used to control each DMU 304, each DACU 306, and the TDD switch signal converter 309. An input/output (I/O) line 318 coupled to CPU 310 is used for network monitoring and maintenance. Typically, I/O line 318 is an Ethernet port used for external communication with the system. Power supply 316 is used to power various components within hybrid expansion unit 106.

In addition to performing the analog frequency conversion functions described above, the AMU 308 couples power onto the analog communication link 118. This power is then supplied through the analog communication link 118 to the downstream analog remote antenna cluster 108, including master analog remote antenna unit 402 and slave analog remote antenna units 404-1 as described below. The power coupled onto the analog communication link 118 is supplied from the power supply 316. In the example embodiment shown, 54 volts DC is received by AMU 308 from the power supply 316 and is coupled to the analog communication link 118 by AMU 308.

The hybrid expansion unit 106 shown in FIG. 3 sends and receives digital signals from the upstream and sends and receives analog signals in the downstream. In other example hybrid expansion units, both analog and digital signals can be sent in the downstream across various media. In one example embodiment a digital downstream output line (not shown) is connected to the downstream side of the DMU 304 and goes through a DIOU before being output in the downstream. This digital downstream line does not go through a DACU 306 or the AMU 308 and can be used to connect to other cascaded devices such as other hybrid expansion units 106 or digital expansion units 110. In other example embodiments of the hybrid expansion unit 106, various other combinations of upstream and downstream digital and analog signals can be aggregated, processed, routed.

Figure 4:
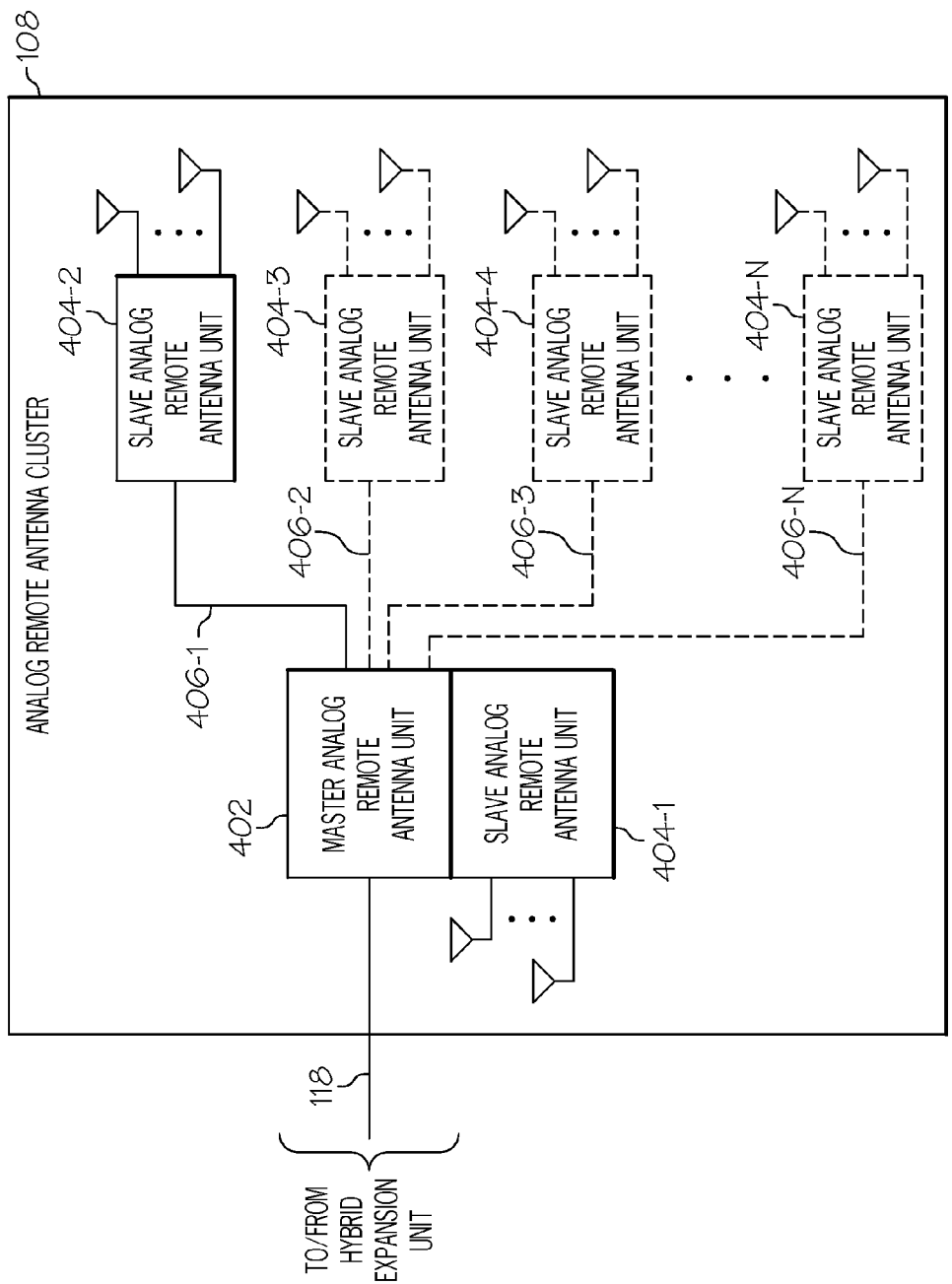
FIG. 4 is a block diagram of one embodiment of an analog remote antenna cluster for the system of FIG. 1.
Figure 5:
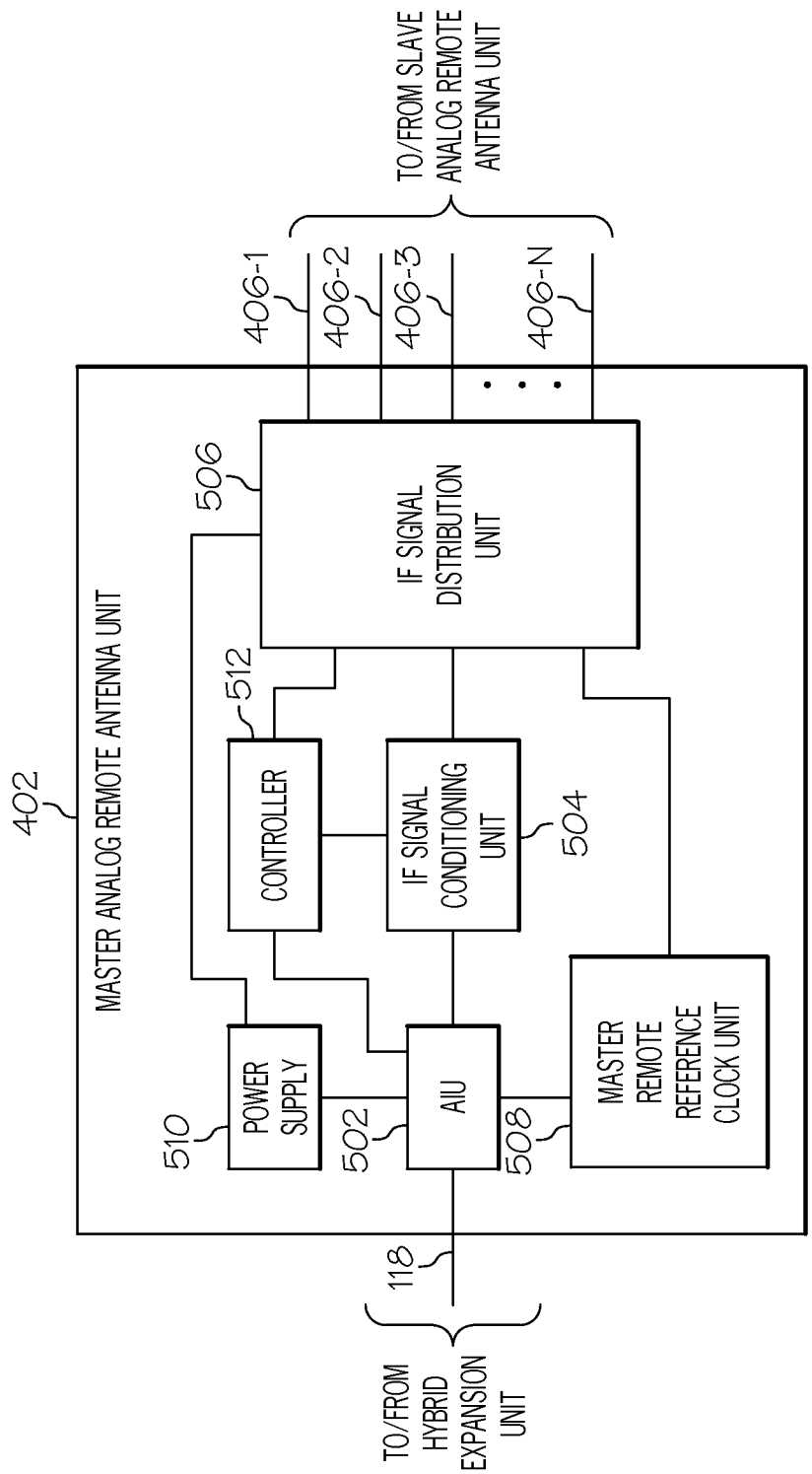
FIG. 5 is a block diagram of one embodiment of a master analog remote antenna unit for the analog remote antenna unit cluster of FIG. 4.

In the embodiments described and depicted in FIGS. 4-6, the term analog intermediate frequency (IF) spectrum is used to describe the analog signals transported in the analog domain 120 between the hybrid expansion units 106 and the analog remote antenna clusters 108. The term analog IF spectrum is used to distinguish the signals from the analog RF spectrum format that is communicated to the service provider interface and the mobile devices over the air interfaces discussed below. Example system 100 uses analog IF spectrum for transport within the analog domain 120 that is lower in frequency than the analog RF spectrum. In other example embodiments, the RF spectrum can be transmitted at its native frequency within the analog domain 120 or using an analog IF spectrum that is higher in frequency than the analog RF spectrum.

FIG. 4 is a block diagram of one embodiment of an analog remote antenna cluster 108 for system 100. Analog remote antenna cluster 108 includes a master analog remote antenna unit 402 and a plurality of slave analog remote antenna units 404-1 through 404-N. In other embodiments, other configurations are used instead of this master/slave configuration, such as just a single analog remote antenna unit connected directly to the hybrid expansion unit.

In example analog remote antenna cluster 108, the master analog remote antenna unit 402 is coupled to at least one analog communication link 118. In the embodiment shown in FIG. 4, the at least one coaxial cable includes two coaxial cables. A first coaxial cable is used to transport downstream communication from a hybrid expansion unit 106 and the analog remote antenna cluster 108, including the bands of downstream analog spectrum associated with the service providers. A second coaxial cable is used to transport upstream communication from the analog remote antenna cluster 108 to the hybrid expansion unit 106, including the bands of upstream analog spectrum associated with the service providers. The downstream analog spectrum and the upstream analog spectrum are transported on separate coaxial cables in this example embodiment due to bandwidth limitations of the coaxial cable being used as media. In other example embodiments, a single analog communication link 118 is used to transport both the downstream and upstream analog spectrum. In other example embodiments, the at least one analog communication link 118 includes greater than two coaxial cables in order to transport even more bands. In other example embodiments, different media such as twisted pair (i.e., unshielded twisted pair (UTP) or screened unshielded twisted pair (ScTP)), CATV cable, or optical fibers are used to transport the analog signals instead of coaxial cables.

In example analog remote antenna cluster 108, the master analog remote antenna unit 402 coordinates the distribution of various bands of analog RF spectrum and any associated TDD switching control signals to various slave analog remote antenna units 404 through analog communication links 406. The master analog remote antenna unit 402 is discussed in further detail below. In the example analog remote antenna cluster 108, each slave analog remote antenna unit 404-1 through 404-N receive at least one band of analog RF spectrum from the master analog remote antenna unit 402. Each slave analog remote antenna unit 404-1 through 404-N then transmits and receives the at least one band of analog RF spectrum wirelessly across an air medium using at least one antenna. The slave analog remote antenna unit 404 is discussed in further detail below. In one example embodiment, the first wireless spectrum and any other optional wireless spectrum are both communicated from the master host unit to at least one of the slave analog remote antenna units 404, such as slave analog remote antenna unit 404-1, which in turn communicates the first and any other optional wireless spectrum across air interfaces as discussed below.

FIG. 5 is a block diagram of one embodiment of a master analog remote antenna unit 402 from the analog remote antenna cluster 108. Master analog remote antenna unit 402 includes an analog interface unit (AIU) 502, an IF signal conditioning unit 504, an IF signal distribution unit 506, a master remote reference clock 508, a power supply 510, and a controller 512. Other example embodiments of master analog remote antenna unit include greater or fewer components.

The at least one analog communication link 118 is connected to the master analog remote antenna unit 402 through the AIU 502. One of the primary functions of the AIU is to handle any type of media conversion that may be necessary which in some embodiments may involve impedance transformation. Specifically, in the example embodiment shown in FIG. 5, the AIU 502 performs impedance conversion from the 75 ohms of the coaxial cables carrying the downstream and upstream bands of analog spectrum to the 50 ohms used within the master analog remote antenna unit 402. The AIU 502 also includes a coupler that is used to extract the DC power received from the hybrid expansion unit 106 across the at least one analog communication link 118.

In addition, the analog reference clock signal is extracted from the signal received from the hybrid expansion unit 106 across the at least one analog communication link 118. This analog reference clock signal is sent to the master remote reference clock unit 508. Any control signals received from the hybrid expansion unit 106 across the at least one analog communication link 118 are also extracted and sent to the controller 512.

Power supply 510 receives DC power from the AIU 502 and then generates the necessary DC power for operation of the various components onboard the master analog remote antenna unit 402. Thus, master analog remote antenna unit 402 does not need a separate power source other than the power that is received across the at least one analog communication link 118. In the example embodiment shown, a DC voltage is extracted from the signal received across the at least one analog communication link 118 by the AIU 502. A minimum of 28 volts DC is then used by the power supply 510 to generate 5 volts DC and 12 volts DC to power the various devices in the master analog remote antenna unit. In addition, the power received across the analog communication link 118 is sent by the power supply 510 to the IF signal distribution unit 506 where it is coupled onto the analog communication links 406 that connect to each slave analog remote antenna unit 404 so that each slave analog remote antenna units 404 can also derive power from the cable instead of having a separate external power source. Thus, power for both the master analog remote antenna unit 402 and each slave analog remote antenna unit 404 is provided by the hybrid expansion unit 106 through the analog communication links 118 and 406.

As noted above, the AIU 502 extracts the clock signal and supplies it to the master remote reference clock unit 508. The master remote reference clock unit 508 refines the original clock signal received from the hybrid expansion unit 106 across the at least one analog communication link 118. In example embodiments, the master remote reference clock unit 508 processes the clock signal through a phase locked loop to refine the signal. In this way, noise, distortion, and other undesirable elements are removed from the reference clock signal. In other embodiments, the clock signal is processed through a filter to remove adjacent spurious signals. The refined signal output from the master remote reference clock unit 508 is sent to the IF signal distribution unit 506, where it is coupled onto the outputs of the IF signal distribution unit 506 that are connected to the slave analog remote antenna units 404. In this way, the master reference clock signal is redistributed by the master analog remote antenna unit 402 to all the slave analog remote antenna units 404.

IF signal conditioning unit 504 is configured to remove distortion in the analog IF signals that traverse the analog communication link 118. In the example master analog remote antenna unit 402 shown in FIG. 5, IF signal conditioning unit 504 performs cable equalization for signals sent and received across the at least one analog communication link 118. The at least one analog communication link 118 is generally quite long, causing the gain to vary as a function of frequency. IF signal conditioning unit 504 adjusts for gain at various frequencies to equalize the gain profile. IF signal conditioning unit 504 also performs filtering of the analog IF signals to remove adjacent interferers or spurious signals before the signals are propagated further through the system 100.

Controller 512 receives control signals from the AIU 502 that are received from hybrid expansion unit 106 across the at least one analog communication link 118. Controller 512 performs control management, monitoring, and can configure parameters for the various components of the master analog remote antenna unit 402. In the example master analog remote antenna unit 402, the controller 512 also drives the cable equalization algorithm.

IF signal distribution unit 506 is used to distribute the signals processed by the IF signal conditioning unit 504 to various slave analog remote antenna units 404 across analog communication links 406-1 through 406-N. In the example embodiment shown in FIG. 5, at least one band is sent across each analog communication link 406. In examples where more than one band is sent across each analog communication link 406, each band is sent at different analog IF frequencies. In examples implementing TDD switching, associated TDD switching control signals are sent at different IF frequencies from associated bands. As noted above, the IF signal distribution unit 506 is also used to couple the DC power, the analog reference clock, and any other communication signals from the master analog remote antenna unit 402 onto analog communication link 406. The IF signal conditioning occurs at the IF signal conditioning unit 504 before the various analog signals are distributed at the IF signal distribution unit 506 in the embodiment shown in FIG. 5. In other embodiments, the IF signal conditioning could be done after the distribution of the analog signals.

Figure 6A:
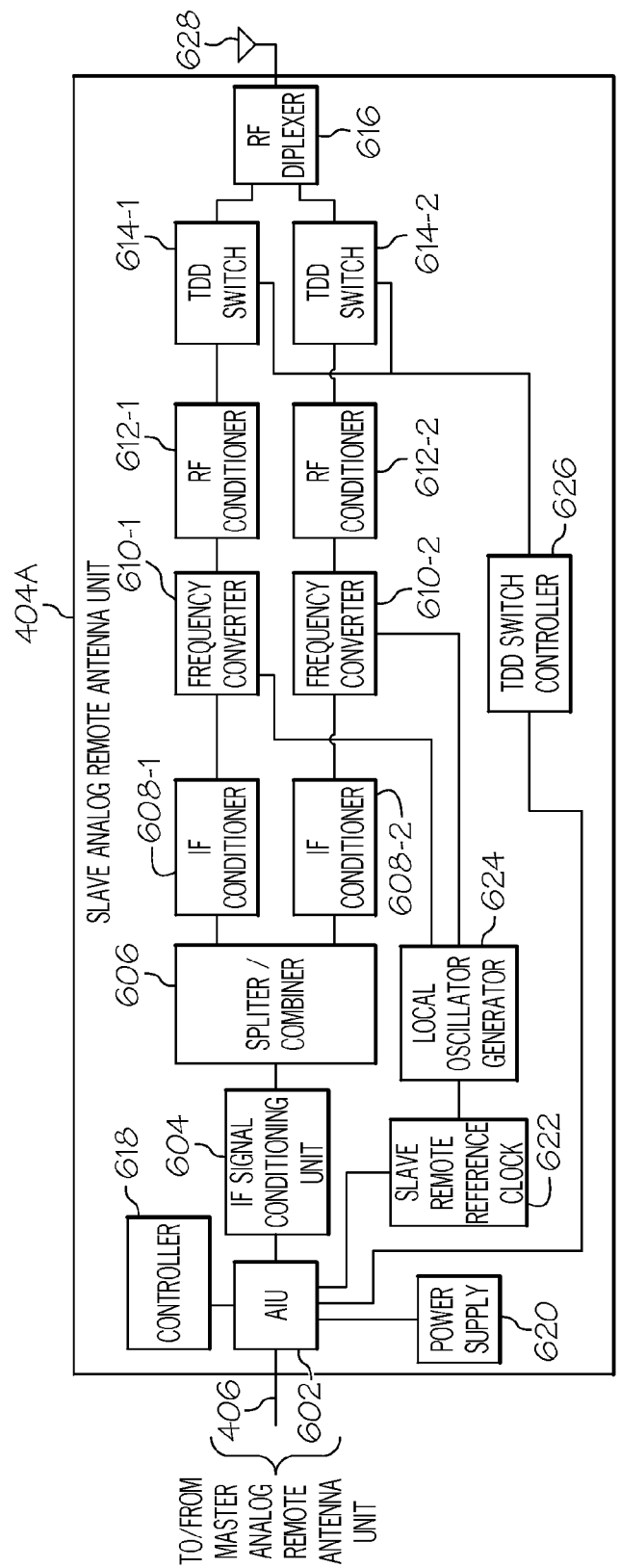
FIG. 6A is a block diagram of one embodiment of a slave analog remote antenna unit for the analog remote antenna unit cluster of FIG. 4.
Figure 6B:
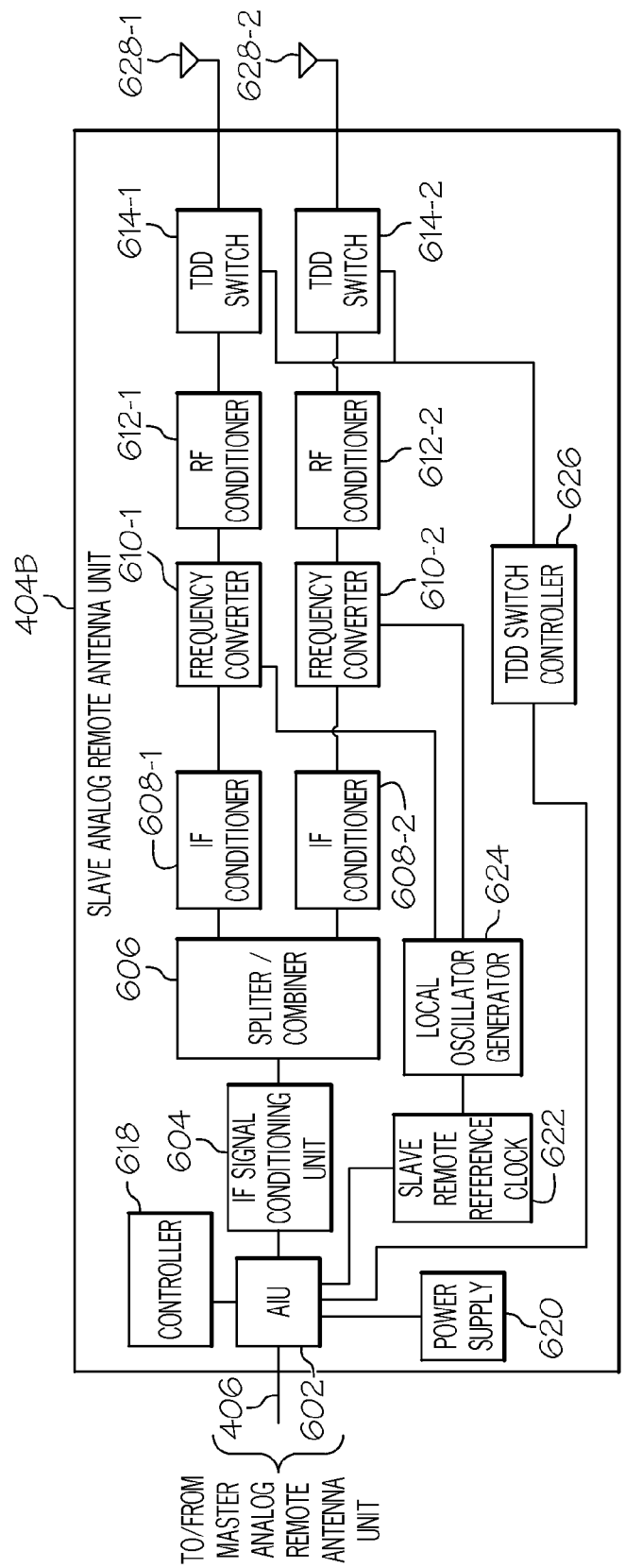
FIG. 6B is a block diagram of another embodiment of a slave analog remote antenna unit for the analog remote antenna unit cluster of FIG. 4.
Figure 6C:
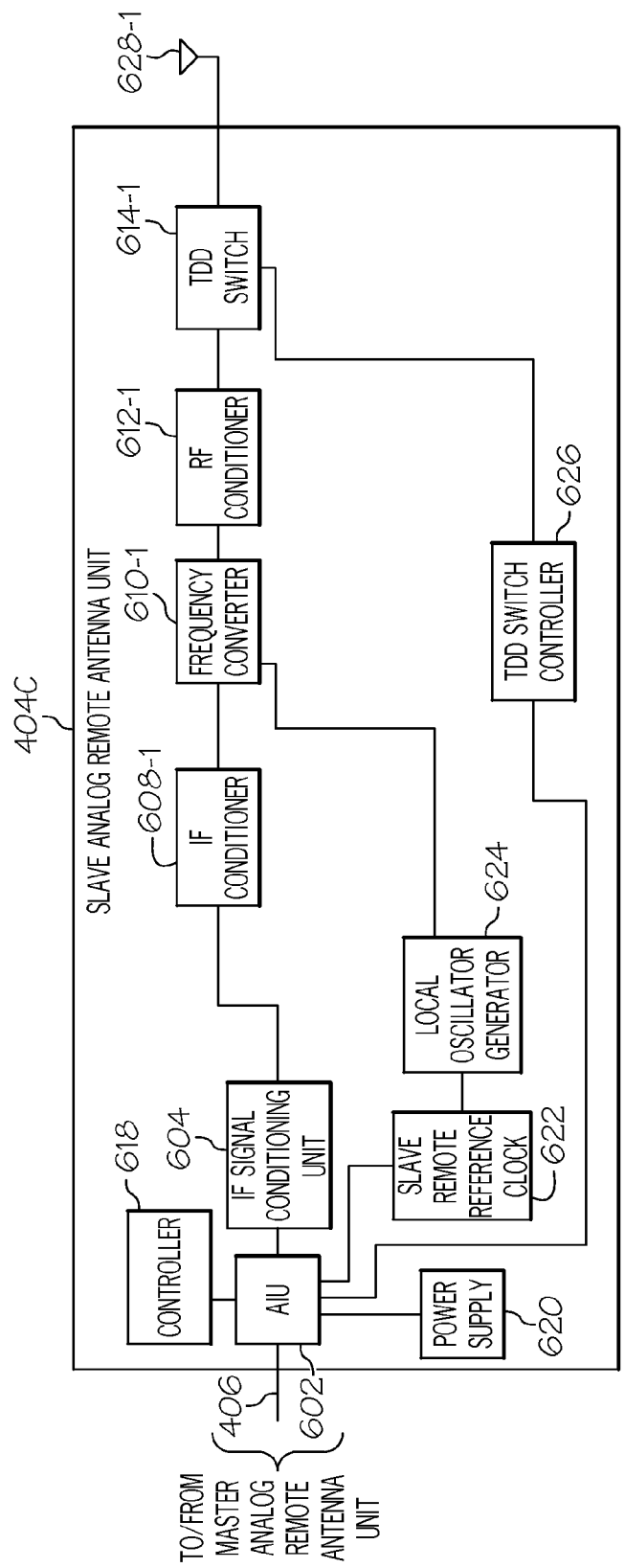
FIG. 6C is a block diagram of another embodiment of a slave analog remote antenna unit for the analog remote antenna unit cluster of FIG. 4.

FIGS. 6A-6C are functional block diagrams of embodiments of the slave analog remote antenna unit 404 for the analog remote antenna cluster 108. Each of FIGS. 6A-6C shows a different embodiment of slave analog remote antenna unit 404. The various embodiments are labeled slave analog remote antenna unit 404A through slave analog remote antenna unit 404C.

FIG. 6A shows one exemplary embodiment of the slave analog remote antenna unit 404, labeled slave analog remote antenna unit 404A. The slave analog remote antenna unit 404 includes an analog interface unit (AIU) 602, an IF signal conditioning unit 604, a splitter/combiner 606, a plurality of IF conditioners 608, a plurality of frequency converters 610, a plurality of RF conditioners 612, a plurality of TDD switches 614, a RF diplexer 616, a controller 618, a power supply 620, a slave remote reference clock 622, a local oscillator generator 624, and a TDD switch controller 626. The slave analog remote antenna unit is coupled to an antenna 628 for transmission and reception of RF signals as described below. In other embodiments, there are greater or fewer components. While the slave analog remote antenna unit 404 is described as a separate component, in some example embodiments, a slave analog remote antenna unit 404 is integrated with a master analog remote antenna unit 402.

The AIU 602 is connected to the analog communication link 406. The AIU 602 includes a coupler that is used to extract the DC power received from the master analog remote antenna unit 402 across the analog communication link 406. The AIU 602 passes the extracted DC power to the power supply 620. The power supply 620 in turn powers the various components of the slave analog remote antenna unit 404. The AIU 602 also extracts control signals received from the master analog remote antenna unit 402 across the analog communication link 406. The control signals are sent by the AIU 602 to the controller 618. The controller 618 uses the control signals to control various components of the slave analog remote antenna unit 404. In particular, the control signals are used by the controller 618 to control the gain in the IF signal conditioning unit 604. Adjustments may be made based on temperature changes and other dynamic factors. The control signals are also used for the configuration of the subsequent frequency converters 610, IF conditioners 608, and RF conditioners 612.

The AIU 602 also extracts the analog reference clock and sends it to the slave remote reference clock unit 622. In the embodiment shown in FIG. 6A, the slave remote reference clock unit 622 refines the reference clock signal using a band pass filter. In other embodiments, the reference clock signal drives a phase locked loop to generate a refined reference clock signal. The slave remote reference clock unit 622 distributes the refined reference clock signal to the local oscillator generator 624, which generates local oscillator signals for the mixers used for frequency conversion. The local oscillator signals are generated using a phase locked loop. In the example shown in FIG. 6A, the local oscillator generator 624 generates four local oscillator frequencies for each of the carrier signals of a first and second band. A first local oscillator frequency is used for downlink data in a first band and a second local oscillator frequency is used for the uplink data in the first band. A third local oscillator frequency is used for the downlink data in a second band and a fourth local oscillator frequency is used for the uplink data in the second band. In other example embodiments, greater or fewer bands are used and greater or fewer local oscillator signals are created by the local oscillator generator 624. For example, some embodiments may require diversity, so that two uplinks are needed for each downlink and three local oscillators would need to be generated for each band. In example embodiments, the AIU 602 is also used to impedance convert between the signal received on the analog communication link 406 and the signal processed by various components of the slave analog remote antenna unit 404.

Various analog spectrum including the first and any other optional wireless spectrum is received across the analog communication link 406 by the AIU 602 is passed to the IF signal conditioning unit 604. The IF signal conditioning unit 604 filters out noise, distortion, and other undesirable elements of the signal using amplification and filtering techniques. The IF signal conditioning unit 604 passes the analog spectrum to the splitter/combiner 606, where the various bands including the first and any other optional wireless spectrum are split out of the signal in the downlink and combined together in the uplink. In the downstream, a first band including the first wireless spectrum is split out and passed to the IF conditioner 608-1 and an optional second band including optional second wireless spectrum is split out and passed to the IF conditioner 608-2. In the upstream, the first band including the first wireless spectrum is received from the IF conditioner 608-1, the additional optional bands including other optional wireless spectrum is received from the IF conditioner 608-2, and the upstream bands are combined by the splitter/combiner 606.

In the downstream for the first band having the first wireless spectrum, IF conditioner 608-1 passes the IF signal having the first wireless spectrum to the frequency converter 610-1. The frequency converter 610-1 receives a downstream mixing frequency for the first band having the first wireless spectrum from local oscillator generator 624. The frequency converter 610-1 uses the downstream mixing frequency for the first band having the first wireless spectrum to convert the downstream IF signal for the first band having the first wireless spectrum to a downstream RF signal. The downstream RF signal for the first band having the first wireless spectrum is passed onto the RF conditioner 612-1, which performs RF gain adjustment and filtering on the downstream RF signal for the first band having the first wireless spectrum.

The RF conditioner 612-1 passes the downstream RF signal for the first band having the first wireless spectrum to the TDD switch 614-1. The TDD switch 614-1 is controlled by the TDD switch controller 626. The TDD switch controller 626 directs the TDD switch 614-1 to select between a transmit path and a receive path in response to the TDD switching control signal generated by the respective TDD switch signal controller 203-1. When the TDD switch 614-1 is in a transmit mode, the downstream RF signal is passed through the transmit path of the RF conditioner 612-1 to the RF diplexer 616. When the TDD switch 614-1 is in a receive mode, the upstream RF signal is received from the RF diplexer 616 through the receive path of the RF conditioner 612-1. The first band having the first wireless spectrum is transmitted and received across an air medium using the antenna 628. In other embodiments, greater amounts of antennas are used. In some embodiments, the downstream signals are transmitted from one antenna and the upstream signals are received from another antenna.

In the downstream for the second band having the optional second wireless spectrum, IF conditioner 608-2 passes the IF signal for the optional second band having the optional second wireless spectrum to the optional frequency converter 610-2. The frequency converter 610-2 receives a downstream mixing frequency for the optional second band having the optional second wireless spectrum from local oscillator generator 624. The optional frequency converter 610-2 uses the downstream mixing frequency for the optional second band having the optional second wireless spectrum to convert the downstream IF signal for the optional second band having the optional second wireless spectrum to a downstream RF signal. The downstream RF signal for the optional second band having the optional second wireless signal is passed onto the optional RF conditioner 612-2, which performs more RF adjustment and filtering on the downstream RF signal for the optional second band having the optional second wireless spectrum.

The optional RF conditioner 612-2 passes the downstream RF signal for the optional second band having the optional second wireless spectrum to the TDD switch 614-2, which selects the RF conditioner 612-2 between a transmit path and a receive path in response to the TDD switching control signal generated by the respective TDD switch signal controller 203-2. When the TDD switch 614-2 is in a transmit mode, the downstream RF signal is passed through the transmit path of the RF conditioner 612-2 to the RF diplexer 616. When the TDD switch 614-2 is in a receive mode, the upstream RF signal is received from the RF diplexer 616 through the receive path of the RF conditioner 612-2. The optional second band having the optional second wireless spectrum is transmitted and received across an air medium using the antenna 628.

In the upstream, the antenna 628 receives the RF signal for both the first band having the first wireless spectrum and the second band having the second wireless spectrum. The upstream RF signal for the first band having the first wireless spectrum and the upstream RF signal for the second band having the second wireless spectrum passes from the antenna 628 to the RF diplexer 616, where the first band having the first wireless spectrum and the second band having the second wireless spectrum are split apart. The first band having the first wireless spectrum is sent to the TDD switch 614-1 and the second band having the second wireless spectrum is sent to the TDD switch 614-2.

When the TDD switch 614-1 is in the receive mode, the first band having the first wireless spectrum passes through the receive path of the RF conditioner 612-1, which performs gain adjustment and filtering on the upstream RF signal for the first band having the first wireless spectrum. Finally, the upstream RF signal for the first band having the first wireless spectrum is passed to frequency converter 610-1, which frequency converts the upstream RF signal for the first band having the first wireless spectrum using an upstream mixing frequency generated by the local oscillator generator 624.

When the TDD switch 614-2 is in the receive mode, the second band having the second wireless spectrum passes through the receive path of the RF conditioner 612-2, which performs gain adjustment and filtering on the upstream RF signal for the first band having the first wireless spectrum. Finally, the upstream RF signal for the first band having the first wireless spectrum is passed to frequency converter 610-2, which frequency converts the upstream RF signal for the second band having the second wireless spectrum using an upstream mixing frequency generated by the local oscillator generator 624.

In embodiments where the functions of the master analog remote antenna unit 402 and the slave analog remote antenna unit 404-1 are integrated into the same physical package, as depicted in FIG. 4, some of the redundant functions in the master analog remote antenna unit 402 and the slave analog remote antenna unit 404-1 may be removed. For example, the two units may share the same controller and power supply. The slave remote reference clock 622 may not be required as the signal from the master remote reference clock unit 508 could be routed directly to the local oscillator generator 624.

FIG. 6B shows another exemplary embodiment of the slave analog remote antenna unit 404, labeled slave analog remote antenna unit 404B. The slave analog remote antenna unit 404B includes all the same components as slave analog remote antenna unit 404A, with a few exceptions. First, slave analog remote antenna unit 404B does not include the RF diplexer 616. Second, slave analog remote antenna unit includes a first antenna 628-1 and a second antenna 628-2. The slave analog remote antenna unit 404B generally operates according to the description of slave analog remote antenna unit 404A above. The only differences in the slave analog remote antenna unit 404B from the slave analog remote antenna unit 404A are downstream of the TDD switch 614-1 and the TDD switch 614-2. Instead of having an RF diplexer 616 to diplex both the first band having the first wireless spectrum and the second band having the second wireless spectrum for transmission and reception using the same antenna 628, the first band having the first wireless spectrum is transmitted and received using a first antenna 628-1 and the second band having the second wireless spectrum is transmitted and received using a second antenna 628-2.

FIG. 6C shows another exemplary embodiment of the slave analog remote antenna unit 404, labeled slave analog remote antenna unit 404C. The slave analog remote antenna unit 404C only supports a single band. Thus, the slave analog remote antenna unit 404C does not include splitter/combiner 606, IF conditioner 608-2, frequency converter 610-2, RF conditioner 612-2, TDD switch 614-2, or diplexer 616. Thus, slave analog remote antenna unit 404C is a simplified version of, and operates similarly to, slave analog remote antenna unit 404.

While TDD switches 614 are described above as being in the slave analog remote antenna unit 404, TDD switches can also be implemented at other positions along the data path for a particular TDD wireless spectrum between the respective service provider interface 102 and antennas 628. Alternative positions for the TDD switches include the master analog remote antenna unit 402, the hybrid expansion unit 106 and the master host unit 104. In some example embodiments both the TDD switch signal controller and the TDD switch are present in a master host unit 104. In some example embodiments both the TDD switch signal controller and the TDD switch are present in a hybrid expansion unit 106. In some example embodiments both the TDD switch controller and the TDD switch are present in an analog remote antenna cluster, such as both being in a master analog remote antenna unit 402 or both being in a slave analog remote antenna unit. It is understood that other embodiments could have the TDD switch controller and the TDD switch positioned in a number of different components throughout the system, such as the TDD switch signal controller being in a master host unit 104 and the TDD switch being in a hybrid expansion unit 106 or the TDD switch signal controller being in a hybrid expansion unit and the TDD switch being in an analog remote antenna cluster 108 (either in a master analog remote antenna unit 402 or a slave analog remote antenna unit 404). The recitation of potential positions of the TDD switch signal controller and the TDD switch above is not limiting and other configurations are within the scope of this disclosure.

Figure 7:
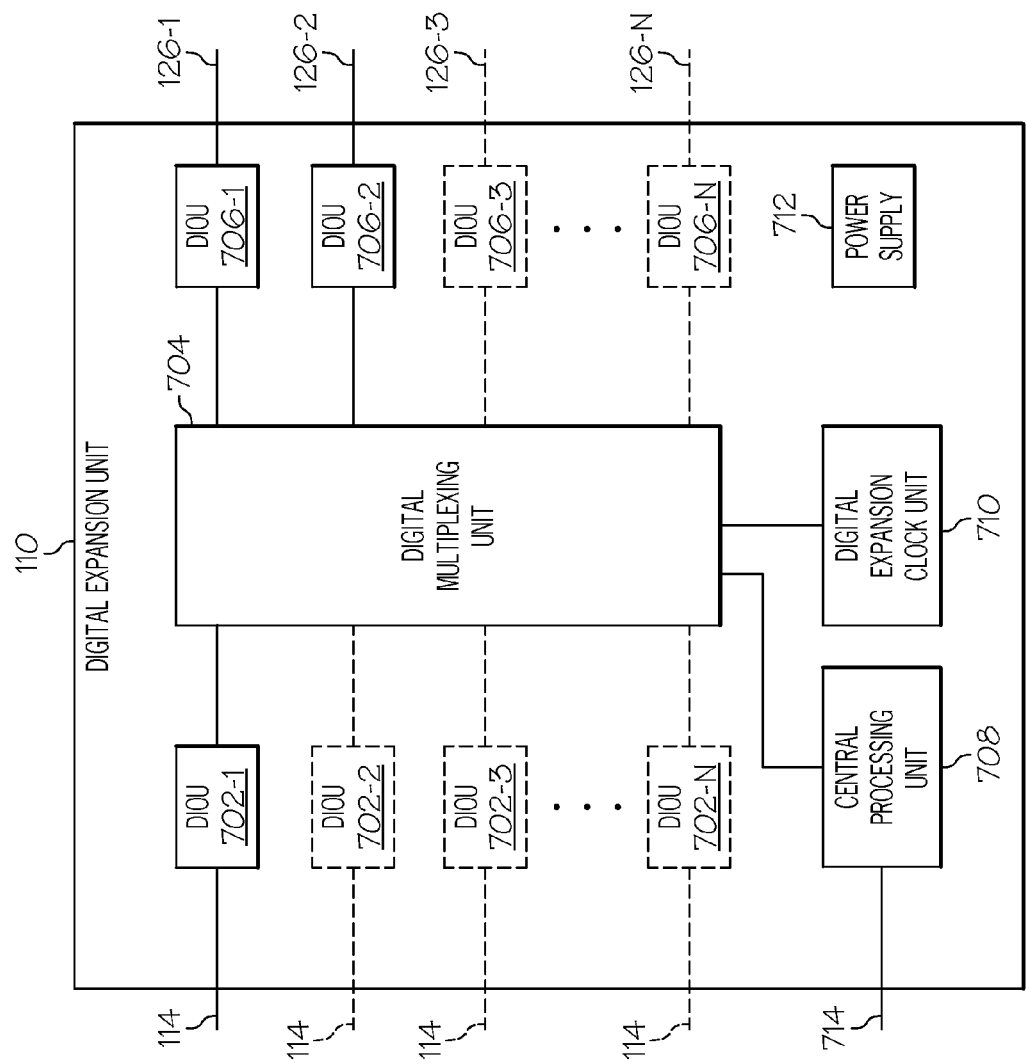
FIG. 7 is a block diagram of one embodiment of a digital expansion unit for the system of FIG. 1.

FIG. 7 is a block diagram of one embodiment of optional digital expansion unit 110 of system 700. Optional digital expansion unit 110 includes at least one digital input-output unit (DIOU) 702, at least one digital multiplexing unit (DMU) 704, at least one digital input-output unit (DIOU) 706, at least one central processing unit (CPU) 708, at least one digital expansion clock unit 710, and at least one power supply 712. It is understood that the DMU 704 performs both multiplexing and demultiplexing functionality between the various upstream and downstream connections.

The optional digital expansion unit 110 communicates N-bit words of digitized spectrum between a master host unit 104 and at least one hybrid expansion unit 106. Each DIOU 702 (DIOU 702-1 through DIOU 702-N) of the digital expansion unit 110 operates to convert between optical signals received across a digital expansion communication link 126 and electrical signals processed within the digital expansion unit 110. In the downstream, the converted signals are passed from each DIOU 702 to the DMU 704, where they are multiplexed together and output to at least one DIOU 706 which converts the electrical signals to optical signals and outputs the optical signals to at least one hybrid expansion unit or another digital expansion unit for further distribution. In the upstream, each DIOU 706 converts optical signals received from a downstream hybrid expansion unit, digital expansion unit, or digital remote unit into electrical signals, which are passed onto the DMU 704. The DMU 704 takes the upstream signals and multiplexes them together and outputs them to at least one DIOU 702, which converts the electrical signals into optical signals and sends the optical signals across a digital expansion communication link 114 toward the master host unit. In other embodiments, multiple digital expansion units are daisy chained for expansion in the digital domain.

In the example embodiment shown in FIG. 7, the CPU 708 is used to control each DMU 704. An input/output (I/O) line 714 coupled to CPU 708 is used for network monitoring and maintenance. Typically, I/O line 714 is an Ethernet port used for external communication with the system. The DMU 704 extracts the digital master reference clock signal from any one digital data stream received at any one of the DIOU 702 and DIOU 706 and sends the digital master reference clock signal to the digital expansion clock unit 710. The digital expansion clock unit 710 then provides the digital master reference clock signal to other functions in the DMU that require a clock signal. Power supply 712 is used to power various components within digital expansion unit 110.

Some embodiments of system 100 including optional digital expansion unit 110, as in FIG. 1, further include additional service provider interfaces, such as optional service provider interface 102-3 and 102-4, and additional master host units, such as optional master host unit 104-2. In one example embodiment, additional master host unit 104-2 is connected to service provider interface 102-3 through analog communication link 112-3 and connected to service provider interface 102-4 through analog communication link 112-4.

Optional digital expansion unit 110 is then connected to master host unit 104-1 through digital communication link 114-3 and also connected to the master host unit 104-2 through digital communication link 114-4. In addition, optional digital expansion unit 110 includes DIOU 702-1 and DIOU 702-2 as shown in FIG. 7. DIOU 702-1 is coupled with digital communication link 114-3 and DIOU 702-2 is coupled with digital communication link 114-4 and connected to the additional master host unit 104-2. DIOU 702-1 and DIOU 702-2 are coupled to DMU 704, which multiplexes and demultiplexes upstream and downstream signals together allowing various bands to be distributed from master host unit 104-1 and master host unit 104-2 through the analog remote antenna clusters 108 and the digital remote antenna units 122. Other example systems include greater or fewer service provider interfaces 102, master host units 104, hybrid expansion units 106, analog remote antenna clusters 108, digital remote antenna units 122, and digital expansion units 110.

Figure 8:
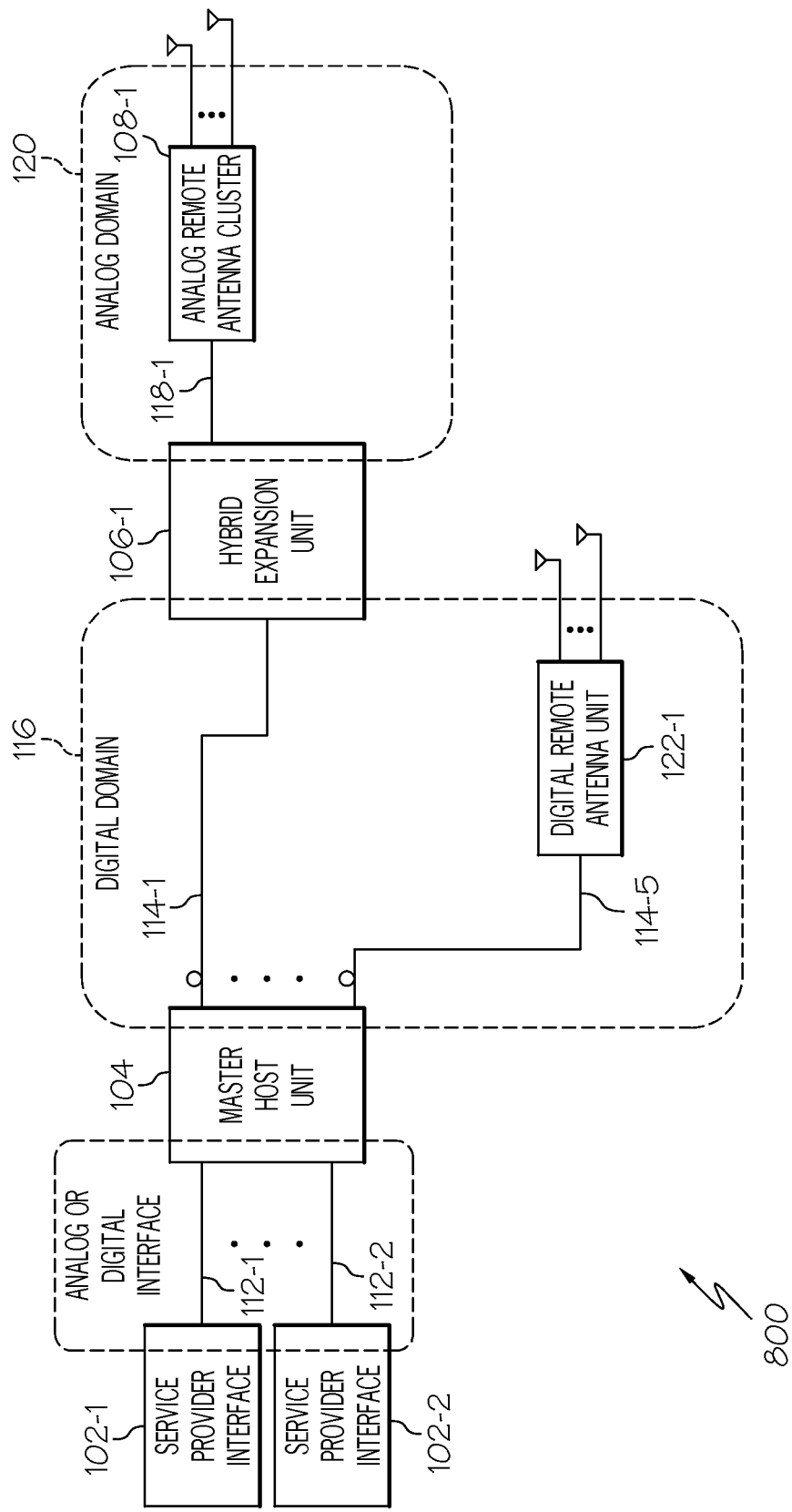
FIG. 8 is a block diagram of another embodiment of a system for providing wireless coverage into a substantially enclosed environment.

FIG. 8 is a block diagram of another embodiment of a system 800 for providing wireless coverage into a substantially enclosed environment. The system 800 includes many of the same components as system 100, including the master host unit 104-1, the hybrid expansion unit 106-1, and the analog remote antenna cluster 108-1. As with system 100, example system 800 is also connected to both service provider interface 102-1 and service provider interface 102-2. Example system 800 differs from example system 100 because it includes digital remote antenna unit 122-1 (described in detail below).

Figure 9:
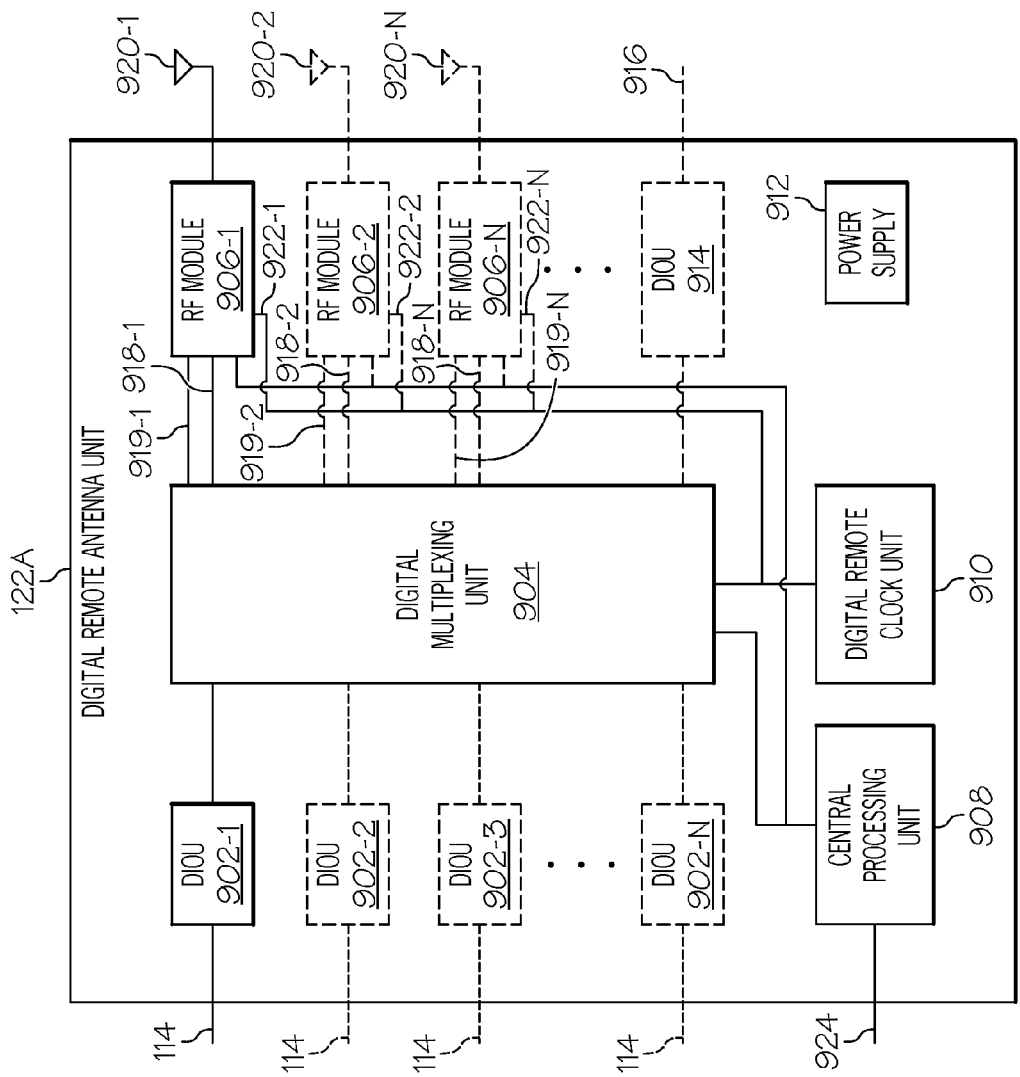
FIG. 9 is a block diagram of one embodiment of a digital remote antenna unit for the system of FIG. 8.

FIG. 9 is a block diagram of one embodiment of a digital remote antenna unit 122, labeled digital remote antenna unit 122A (such as digital remote antenna unit 122-1 of system 800). Digital remote antenna unit 122A includes at least one digital input-output unit (DIOU) 902, at least one digital multiplexing unit (DMU) 904, at least a first RF module 906-1, at least one central processing unit (CPU) 908, at least one digital remote clock unit (DRCU) 910, and at least one power supply 912. In some embodiments, at least one digital input-output unit (DIOU) 914 is used to facilitate a digital output line 916. The digital output line 916 allows daisy-chaining multiple digital remote antenna units 122A together. The digital output line 916 of one digital remote antenna unit 122A can be coupled to the input of a DIOU 902 of another digital remote antenna unit 122A. The digital output line 916 will be described in further detail below with regards to embodiments having daisy-chained digital remote antenna units 122A.

Each digital remote antenna unit 122A communicates at least a second band of analog wireless spectrum with a master host unit 104 in the form of a time-multiplexed digital data stream containing N-bit words of digitized spectrum for the second band of analog wireless spectrum. The time-multiplexed digital data stream is received at the at least one DIOU 902 through at least one digital communication link 114. In the embodiment shown in FIG. 9, only one DIOU 902-1 is necessary if the digital remote antenna unit 122A is only coupled with a single upstream master host unit 104 (or single upstream digital expansion unit 110 as described above). In some embodiments, additional DIOUs 902 are used to provide more bandwidth between upstream devices and the digital remote unit 122A. DIOU 902-1 receives the time-multiplexed digital data stream from a master host unit 104 via a digital communication link 114 in an optical format. DIOU 902-1 converts the time-multiplexed digital data stream from the optical format to an electrical format and passes the time-multiplexed digital data stream onto the DMU 904. DIOU 902-2 through DIOU 902-N are optional. For example, in other embodiments, digital remote antenna unit 122A has multiple DIOUs 902 (DIOU 902-1 through DIOU 902-N) and is connected to multiple upstream master host units 104 or digital expansion units 110 through digital communication links 114. In other embodiments, digital remote antenna unit 122A is connected to digital expansion units 110 through DIOU 902. In some embodiments including multiple upstream connections, the digital remote antenna unit 122A selects one DIOU 902 to extract the clock signal from.

As noted above, the at least one DIOU 902 communicates the time-multiplexed digital data stream containing N-bit words of digitized spectrum representing at least the second band of analog wireless spectrum to the DMU 904. In some embodiments, this time-multiplexed digital data stream contains identical N-bit words of digitized spectrum in the downstream as the time-multiplexed digital data stream transmitted to the hybrid expansion unit 106-1 discussed above. In some embodiments, the N-bit words of digitized spectrum in the upstream is combined at a master host unit in the upstream.

The DMU 904 demultiplexes N-bit words of digitized spectrum received from the at least one DIOU 902. The DMU 904 sends N-bit words of digitized spectrum representing the second bands of analog wireless spectrum across communication link 918-1 to RF module 906-1. In some embodiments, other N-bit words of digitized spectrum are extracted from other optional DIOU 902. In some embodiments, the DMU 904 sends N-bit words of digitized spectrum representing the second band of analog wireless spectrum across other optional communication links 918 to respective RF modules 906. The DMU 904 also extracts TDD switching control signals generated by each respective TDD switch signal controller 203 from the time-multiplexed digital data stream and outputs the TDD switching control signals across communication links 919 (such as communication links 919-1 through 919-N) to RF modules 906.

An exemplary RF module 906 is described in further detail with reference to FIG. 10 below. Each RF module 906 is also coupled to the digital remote clock unit 910 by a communication link 922, such as communication link 922-1 coupling RF module 906-1 with the digital remote clock unit 910 and optional communication link 922-2 coupling optional RF module 906-2 with the digital remote clock unit 910.

The DMU 904 extracts the digital master reference clock signal from the data stream itself. Because the data stream was synchronized with the digital master reference clock signal at a master host unit 104, it can be recovered from the data stream itself. The extracted digital master reference clock signal is sent to the digital remote clock unit 910. The digital remote clock unit 910 receives the digital master reference clock signal extracted from the data stream received from a master host unit 104. The digital remote clock unit 910 communicates the digital master reference clock signal to various components of the digital remote antenna unit 122A, including the DMU 904 and each RF module 906. Each DMU 904 uses the digital master reference clock signal to synchronize itself with the system 100. Each RF module 902 receives the digital master reference clock signal from the digital remote clock unit 910 across a communication link 922 (i.e., communication link 922-1, communication link 922-2, and communication link 922-N). While each communication link 918 and communications link 922 are shown as separate lines in FIG. 6B, in some embodiments a single multi-conductor cable is connected between the DMU 904 and each RF module 906. This multi-conductor cable includes both the communication link 918 and communications link 922 and carries the clock signals, data signals, control/management signals, etc.

In some embodiments, each DIOU 902 is selectable and configurable, so that one DIOU 902 can be selected to receive the digital master reference clock signal and other DIOUs 902 can be used to send the digital master reference clock signal upstream to other system components, such as secondary master host units, digital expansion units, hybrid expansion units, or other digital remote antenna units. Each DIOU 902 is not required to be synchronized to the other parts of the digital remote antenna unit 122A unless it performs some type of function that requires it to be synchronized. In one embodiment, the DIOU 902 performs the extraction of the digital master reference clock in which case it would be synchronized to the remainder of the digital remote antenna unit.

In the downstream, each RF module 906 receives N-bit words of digitized spectrum and outputs an RF signal that is transmitted across an air medium using at least one respective antenna 920. In the upstream, each RF module 906 receives RF signals received across an air medium using the at least one respective antenna 920 and outputs N-bit words of digitized spectrum to the DMU 904. In the digital remote antenna unit 122A shown in FIG. 9, RF module 906-1 converts between N-bit words of digitized spectrum and RF signals for the second wireless spectrum. Similarly, optional RF module 906-2 converts between N-bit words of digitized spectrum and RF signals for any optional wireless spectrum. In other embodiments, at least one RF module 906 converts between N-bit words of digitized spectrum and RF signals for multiple bands. A different antenna element is used for each signal path in some example embodiments having multiple bands, such as embodiments having diversity channels or multiple signal branches used for smart antennas where signals overlap spectrally. In the digital remote antenna unit 122A shown in FIG. 9, each RF module 906 is connected to a separate respective antenna 920.

As noted above, some embodiments of digital remote antenna unit 122A include at least one DIOU 914 and at least one digital output line 916 that allow daisy-chaining multiple digital remote antenna units 122A together. In example embodiments, DIOU 914 is coupled to digital multiplexing unit 904. In the downstream, DIOU 914 converts the data stream coming from the DMU 904 from an electrical format to an optical format and outputs the data stream across digital output line 916. In the upstream, DIOU 914 converts the data stream coming across digital output line 916 from an optical format to an electrical format and passes the data stream onto the DMU 904. Thus, as described below, a plurality of digital remote antenna units 122A can be daisy-chained together using the digital output line 916 on at least one digital remote antenna unit 122A.

CPU 908 is used to control each DMU 904 and each RF module 906. While the links between the CPU 908 and the DMU 904 and each RF module 906 are shown as separate links from the communication links 918 and the communications links 920, it can be part of a multi-conductor cable as described above. An input/output (I/O) line 924 coupled to CPU 908 is used for network monitoring and maintenance. Typically, I/O line 924 is an Ethernet port used for external communication with the system. Power supply 912 is used to power various components within digital remote antenna unit 122A.

Figure 10:
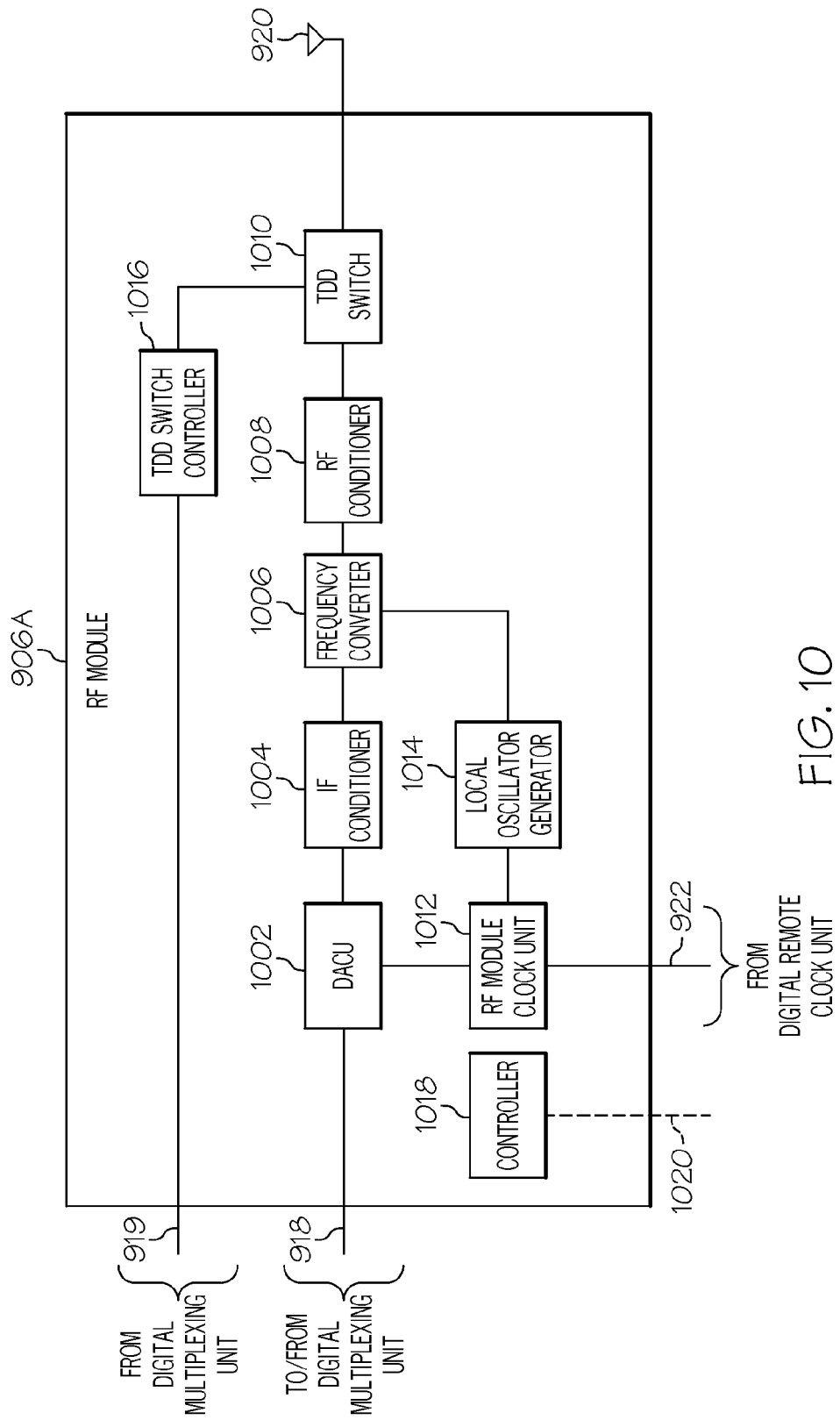
FIG. 10 is a block diagram of one embodiment of a RF module for the digital remote antenna unit of FIG. 9.

FIG. 10 is a block diagram of one embodiment of a RF module 906 for digital remote antenna unit 122A, labeled RF module 906A. The RF module 906A includes a digital-analog conversion unit (DACU) 1002, an IF conditioner 1004, a frequency converter 1006, a RF conditioner 1008, a TDD switch 1010, a RF module clock unit 1012, a local oscillator generator 1014, a TDD switch controller 1016, and a controller 1018. While the RF module 906A is described as a separate component, in some example embodiments, some or all of the components included in RF module 906A are integrated directly in digital remote antenna unit 122A. In other embodiments, other components are used to perform the same or similar functions to the components of RF module 906A described below.

The DACU 1002 is connected to a communication link 918, where it communicates N-bit words of digitized spectrum with the DMU 904. The DACU 1002 is also connected to the RF module clock unit 1012, where it receives a digital master reference clock signal from the digital remote clock unit 910 of the digital remote antenna unit 122A across a communication link 922. In other embodiments, DACU 1002 can also communicate to or from other components of the digital remote antenna unit 122A. The DACU 1002 converts between the N-bit words of digitized spectrum and an analog intermediate frequency (IF) spectrum using the digital master reference clock signal. In the downstream, the analog intermediate frequency (IF) is passed through the IF conditioner 1004 that filters, amplifies, and attenuates the IF spectrum prior to frequency up-conversion. In the upstream, the analog intermediate frequency (IF) is passed through the IF conditioner 1004 that filters, amplifies, and attenuates the IF spectrum prior to analog to digital conversion by the DACU 1002.

The RF module clock unit 1012 receives the digital master reference clock signal across the communication link 922 and distributes the signal to the DACU 1002. The RF module clock unit 1012 also generates an analog domain reference clock signal based on the digital master reference clock signal. This analog domain reference clock signal is used to synchronize analog components in the RF module 906A. In the embodiment of RF module 906A shown in FIG. 10, the RF module clock unit 1012 generates the analog domain reference clock signal by running the digital master reference clock signal through a phase locked loop circuit. The generated analog domain reference clock signal is then passed onto the local oscillator generator 1014. In some embodiments, the digital master reference clock signal is approximately 184.32 MHz and the analog domain reference clock signal is generated as a 30.72 MHz clock based on the 184.32 MHz digital master reference clock signal. Thus, the 30.72 MHz clock is sent to the local oscillator generator 1014.

The frequency converter 1006 converts between IF spectrum and RF spectrum. The frequency converter 1006 is connected to the local oscillator generator 1014. The local oscillator generator 1014 receives the analog domain reference clock from the RF module clock unit 1012. In example embodiments, the analog domain reference clock signal is first refined using a band pass filter or other appropriate filter. In other embodiments, the analog domain reference clock signal drives a phase locked loop to generate a refined reference clock signal. In the example shown in FIG. 10, the local oscillator generator 1024 generates two local oscillator frequencies for each of the carrier signals of the band serviced by the RF module 906A. A first local oscillator frequency is used for downlink data and a second local oscillator frequency is used for the uplink data. While the RF module 906A is described as only servicing a single band, other embodiments include greater numbers of bands where greater numbers of oscillator signals are created by the local oscillator generator 1014. For example, some embodiments may require diversity, so that two uplinks are needed for each downlink and three local oscillators would need to be generated for each band.

The frequency converter 1006 uses the downstream mixing frequency to convert the downstream IF signal to a downstream RF signal. The downstream RF signal is passed onto the RF conditioner 1008, which performs RF gain adjustment, filtering, and amplification on the downstream RF signal. The RF conditioner 1008 passes the downstream RF signal to the TDD switch 1010. The TDD switch 1010 is controlled by the TDD switch controller 1016. The TDD switch controller 1016 directs the TDD switch 1010 to select between a transmit path and a receive path in response to the TDD switching control signal generated by the respective upstream TDD switch signal controller 203. When the TDD switch 1010 is in transmit mode, the downstream RF signal is passed through the transmit path of the RF conditioner 1008 and the TDD switch to the respective antenna 920, where it is transmitted across an air medium. When the TDD switch 1010 is in a receive mode, the upstream RF signal is received across the air medium at the antenna 920 and is passed through the TDD switch and the receive path of the RF conditioner 1008, which performs gain adjustment and filtering on the upstream RF signal as noted above. The upstream RF signal is then passed to frequency converter 1006, which frequency converts the upstream RF signal into an upstream IF signal using the upstream mixing frequency generated by the local oscillator generator 1014.

In some embodiments of example RF module 906A, the RF signals are transmitted and received across an air medium using a single antenna 920 as described above. In other embodiments of example RF module 906A, the downstream RF signals are transmitted from one antenna and the upstream RF signals are received from another antenna. In other embodiments, RF diplexers are implemented downstream of multiple RF modules 906A, thereby allowing multiple RF bands to use a single antenna. In other embodiments, multiple antennas are used for each RF module 906A. In embodiments with these type of alternative antenna configurations, the requirements and design of the TDD switches and any necessary RF diplexers will vary to meet the requirements of the antenna configuration.

While the frequency conversion described above is a two step process between digital and an IF analog signal and then between the IF analog signal and an RF analog signal, in other embodiments, a direct conversion occurs between the digital signals received on communication link 918 and the RF signals output across antenna 920. In such embodiments, the functionality of the DACU 1002, the IF conditioner 1004, and frequency converter 1006 may be combined or replaced with other appropriate components.

The controller 1018 uses control and management signals received over a communication link 1020 to control and manage various components of the RF module 906A. In particular, the control and management signals are used by the controller 1018 to control and manage the gain in the IF conditioner 1004. Adjustments may be made based on temperature changes and other dynamic factors. While communication link 1020 is shown as a separate communication link, in some embodiments the communication link 1020 is combined with the communication link 918 using a multi-conductor cable as described above with reference to FIG. 9. In such embodiments, the multi-conductor cable couples the digital multiplexing unit 904 with each RF module 906A and the control and management messages are communicated over a pair of conductors in this cable. In other example embodiments, the multi-conductor cable is a generic communication link that combines the communication link 918, the communication link 1020, and the communication link 922 into a single cable that interfaces each RF module 906A with the digital multiplexing unit 904. The control signals are also used for the configuration of the subsequent frequency converter 1006 and RF conditioner 1008. In example RF module 906A, all of the components of RF module 906A are powered by the power supply 912 of the digital remote antenna unit 122A. In other embodiments, a separate power supply is included in each RF module 906A and is used to power the various components of RF module 906A. In other embodiments, signal line power extraction is used to supply power to the RF module 906A.

As discussed above with reference to the digital remote antenna unit 122A shown in FIG. 9, a first RF module 906-1 is used for the first wireless spectrum and additional optional RF modules 906-2 through 906-N are used for additional wireless spectrum. In other embodiments, there are more paths and/or additional bands and thusly additional RF modules.

Figure 11:
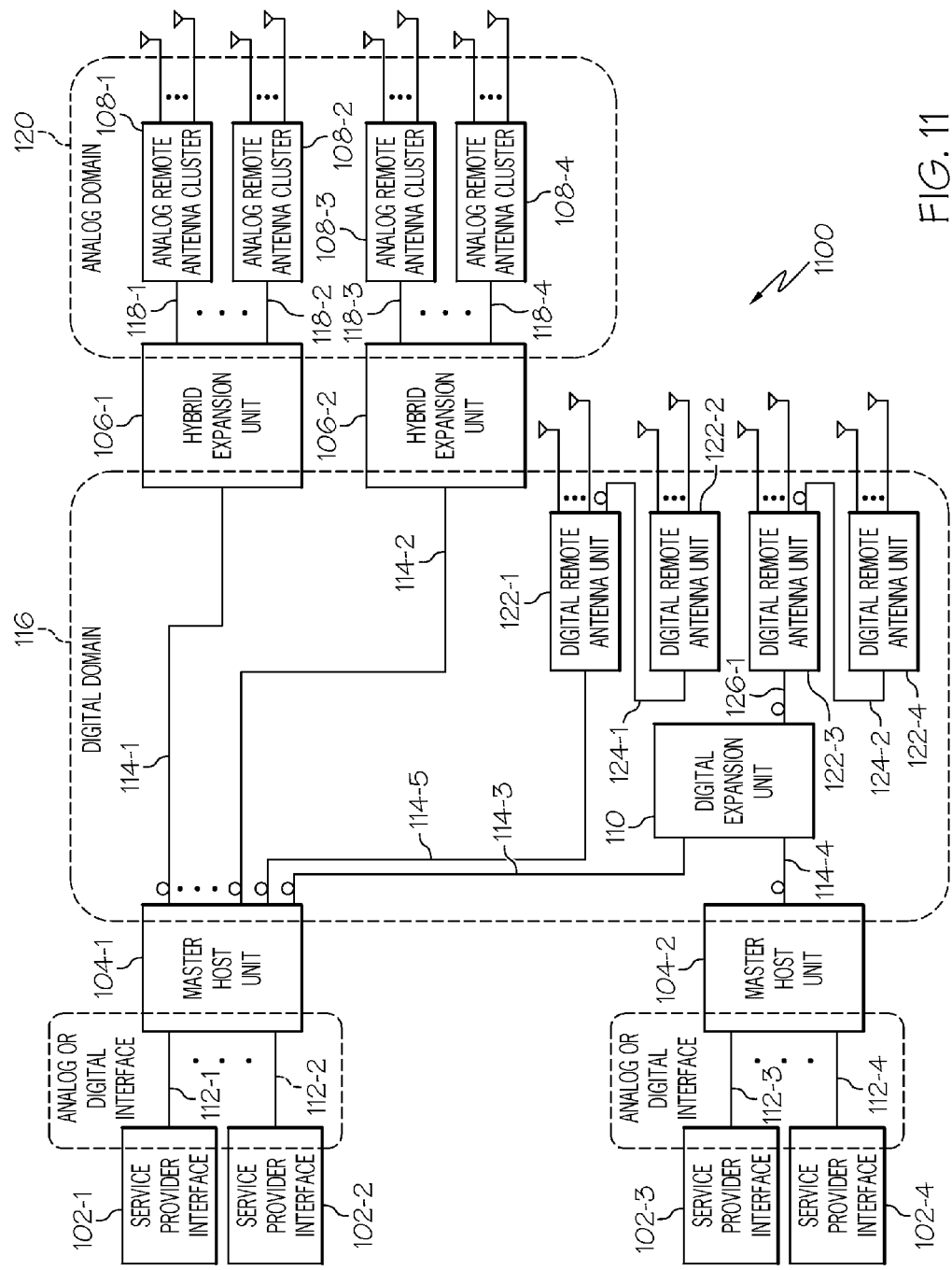
FIG. 11 is a block diagram of another embodiment of a system for providing wireless coverage into a substantially enclosed environment.

FIG. 11 is a block diagram of another embodiment of a system 1100 for providing wireless coverage into a substantially enclosed environment. System 1100 shows a more complicated topology where the systems and methods described herein are applied. The system 1100 includes some of the same components as system 800, including a master host unit 104-1, a hybrid expansion unit 106-1, an analog remote antenna cluster 108-1, and a digital remote antenna unit 122-1. The system 1100 also communicates a first wireless spectrum with a first service provider interface 102-1 and any amount of optional additional wireless spectrum with additional service provider interfaces 102. The differences between system 800 and system 1100 are that system 1100 includes additional analog remote antenna clusters 108-2, 108-3, and 108-4, hybrid expansion unit 106-2, digital expansion unit 110, digital remote antenna units 122-2, 122-3, and 122-4, service provider interfaces 102-3 and 102-4, and master host unit 104-2. In other embodiments, other topologies and combinations of hardware are used.

Analog remote antenna cluster 108-1 is connected to hybrid expansion unit 106-1 through analog communication link 118-1 and analog remote antenna cluster 108-2 is connected to hybrid expansion unit 106-1 through analog communication link 118-2. Hybrid expansion unit 106-2 is connected to master host unit 104-1 through digital communication link 114-2. Analog remote antenna cluster 108-3 is connected to hybrid expansion unit 106-2 through analog communication link 118-3 and analog remote antenna cluster 108-4 is connected to hybrid expansion unit 106-2 through analog communication link 118-4.

As in system 800, digital remote antenna unit 122-1 is connected to master host unit 104-1 through digital communication link 114-5. Digital remote antenna unit 122-2 is daisy-chain connected to digital remote antenna unit 122-1 through digital remote antenna unit connection link 124-1.

Digital expansion unit 110 is connected to master host unit 104-1 through digital communication link 114-3. Digital expansion unit 110 is also connected to master host unit 104-2 through digital communication link 114-4. Master host unit 104-2 is connected to service provider interface 102-3 through analog communication interface 112-3 and is connected to service provider interface 102-4 through analog communication interface 112-4. Digital remote antenna unit 122-3 is connected to digital expansion unit 110 through digital expansion communication link 126-1. Digital remote antenna unit 122-4 is daisy-chain connected to digital remote antenna unit 122-3 by digital remote antenna unit connection link 124-2.

In the embodiments of the systems described above, the various components, including master host unit(s) 104, hybrid expansion unit(s) 106, analog remote antenna cluster(s) 108, digital remote unit(s) 122, and digital expansion unit(s) 110, are shown as separate components. In some other example embodiments, some of these components can be combined into the same physical housing or structure and/or functionality can be ported from one component to another.

Figure 12:
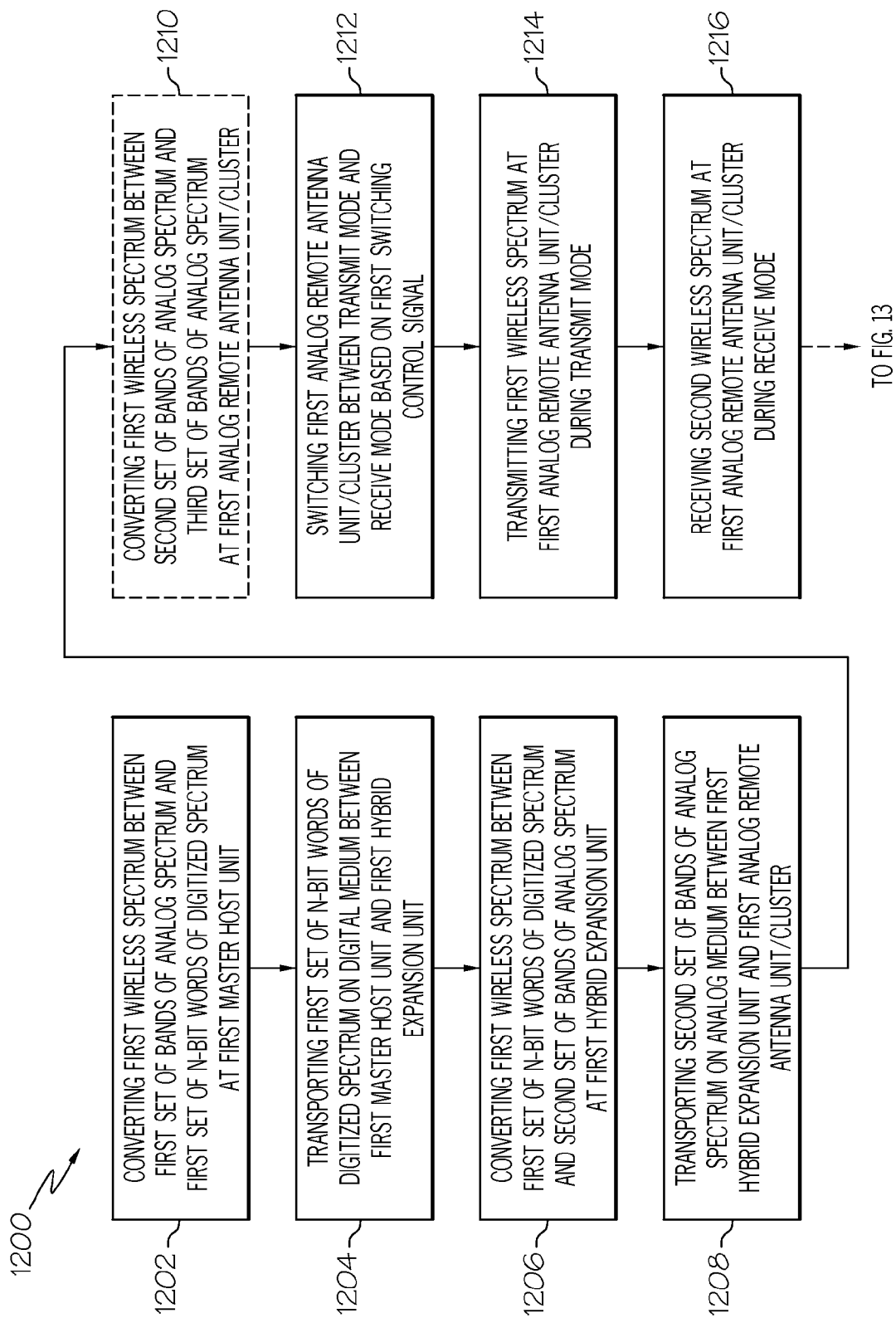
FIG. 12 is a flow diagram of an embodiment of a method of communicating signals through a distributed antenna system using time division duplexing (TDD).

FIG. 12 shows an exemplary embodiment of a method flow diagram for a method of communicating signals through a hybrid distributed antenna system using time division duplexing (TDD), labeled method 1200. The method 1200 begins at block 1202, where first wireless spectrum is converted between first bands of analog spectrum and a first set of N-bit words of digitized spectrum at a first master host unit, such as master host unit 104 described above. In some example embodiments supporting additional wireless spectrum, any additional wireless spectrum is converted between first additional bands of analog spectrum and first additional sets of N-bit words of digitized spectrum at the first master host unit. At block 1204, the first set of N-bit words of digitized spectrum is transported on a digital medium between the first master host unit and a first hybrid expansion unit, such as hybrid expansion unit 106-1. In some example embodiments supporting the additional wireless spectrum, the first additional sets of N-bit words of digitized spectrum are transported on the digital medium between the first master host unit and the first hybrid expansion unit.

At block 1206, the first wireless spectrum is converted between a first set of N-bit words of digitized spectrum and a second set of bands of analog spectrum at the first hybrid expansion unit. In some example embodiments supporting the additional wireless spectrum, the additional wireless spectrum is converted between the first additional sets of N-bit words of digitized spectrum and second additional sets of bands of analog spectrum at the first hybrid expansion unit.

At block 1208, the second set of bands of analog spectrum is transported on an analog medium between the first hybrid expansion unit and a first analog remote antenna unit/cluster, such as analog remote antenna unit 404-1 or analog remote antenna cluster 108-1 described in detail above with reference to FIG. 4. In some example embodiments supporting the additional wireless spectrum, the second additional sets of bands of analog spectrum are transported on analog media between the first hybrid expansion unit and an analog remote antenna unit/cluster. In some example embodiments, at least one of the second additional sets of bands of analog spectrum is transported on the same analog medium as the second set of bands of analog spectrum to the same first analog remote antenna unit/cluster. In some example embodiments, at least one of the second additional sets of bands of analog spectrum is transported on a different analog medium to a different analog remote antenna unit/cluster. In some example embodiments where multiple analog media connect the first hybrid expansion unit and the first analog remote antenna unit/cluster, at least one of the second additional sets of bands of analog spectrum is transported on a different analog medium to the same first analog remote antenna unit/cluster.

At optional block 1210, the first wireless spectrum is converted between the second set of bands of analog spectrum and a third set of bands of analog spectrum at the first analog remote antenna unit/cluster. In some example embodiments supporting the additional wireless spectrum, the additional wireless spectrum is converted between the second additional sets of bands of analog spectrum and third additional sets of bands of analog spectrum at the first analog remote antenna unit/cluster or any other respective remote antenna unit/cluster.

At block 1212, the first analog remote antenna unit/cluster is switched between a transmit mode and a receive mode based on a first TDD switching control signal. In some example embodiments supporting additional wireless spectrum, portions of the first analog remote antenna unit/cluster or other additional analog remote antenna unit/clusters are switched between transmit mode and receive mode based on additional TDD switching control signals associated with respective additional wireless spectrum.

At block 1214, the first wireless spectrum is transmitted over a first air interface at the first analog remote antenna unit/cluster during a transmit mode. In some example embodiments supporting additional wireless spectrum, the additional wireless spectrum is transmitted over additional air interfaces at portions of the first analog remote antenna unit/cluster or at other additional analog remote antenna unit/clusters during a transmit mode associated with each respective additional wireless spectrum. Thus, any wireless spectrum supporting a TDD mode can be transmitted at appropriate timing intervals using respective switches and TDD switching control signals.

At block 1216, second wireless spectrum is received at the first analog remote antenna unit/cluster during a receive mode. In some example embodiments, the second wireless spectrum received at the first analog remote antenna unit/cluster during the receive mode includes the same spectrum as the first wireless spectrum transmitted at the first analog remote antenna unit/cluster during the transmit mode. In these examples, the first wireless spectrum is the downstream component and the second wireless spectrum is the upstream component. In some example embodiments supporting additional wireless spectrum, the additional wireless spectrum is received over additional air interfaces at portions of the first analog remote antenna unit/cluster or at other additional analog remote antenna unit/clusters during a receive mode associated with respective additional wireless spectrum. Thus, any wireless spectrum supporting a TDD mode can be received at appropriate timing intervals using respective switches and TDD switching control signals.

Figure 13:
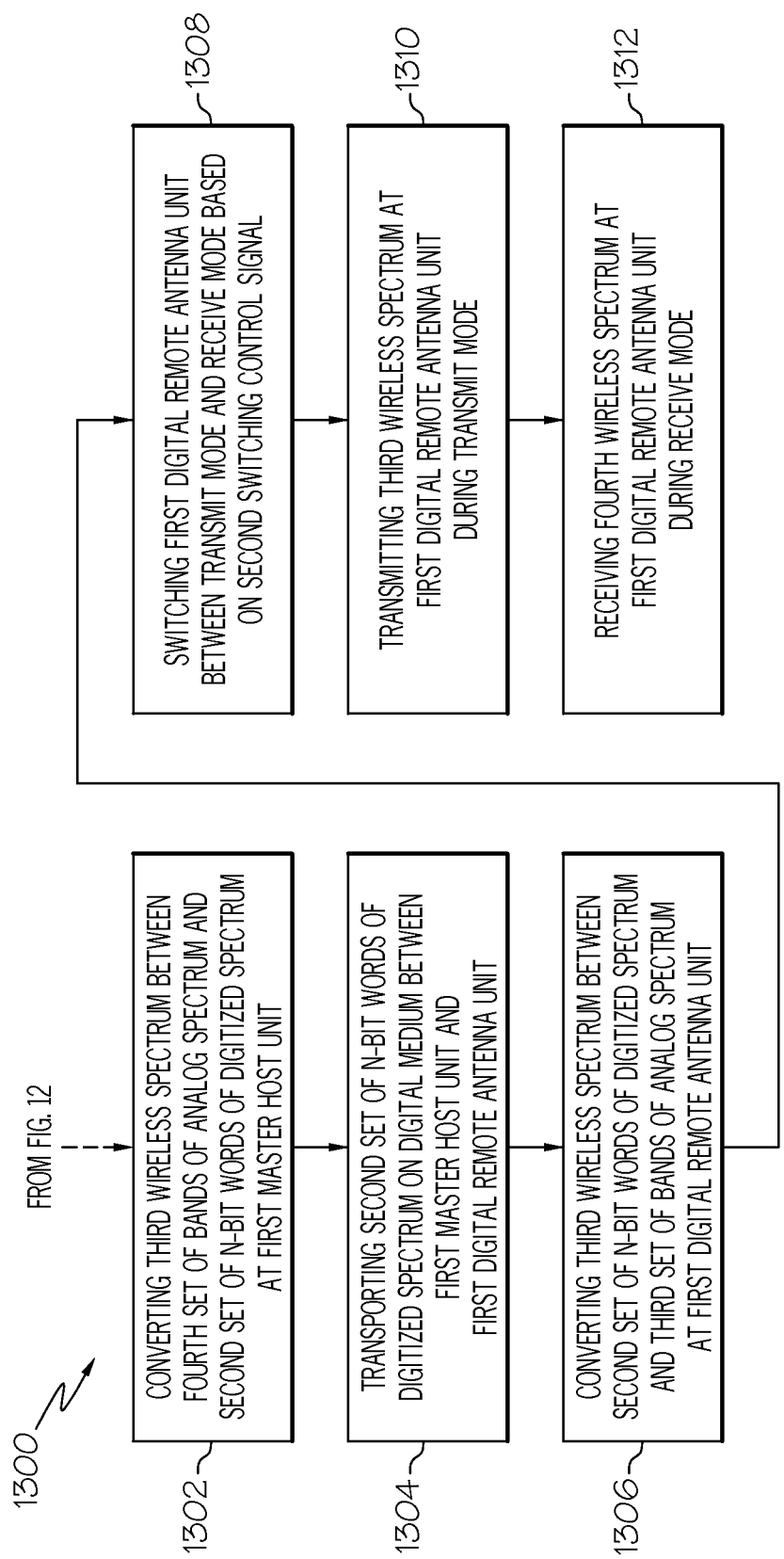
FIG. 13 is a flow diagram of another embodiment of a method of communicating signals through a distributed antenna system using time division duplexing (TDD).

FIG. 13 shows another exemplary embodiment of a method flow diagram for a method of communicating signals through a hybrid distributed antenna system using time division duplexing (TDD), labeled method 1300. The method 1300 is described in context of method 1200, with different wireless spectrum at the first master host unit for method 1200 and method 1300. The method 1300 begins at block 1302, where third wireless spectrum is converted between a fourth set of bands of analog spectrum and a second set of N-bit words of digitized spectrum at a first master host unit, such as master host unit 104 described above. In some example embodiments, the third wireless spectrum and the first wireless spectrum are in the same spectrum and the downstream component of the first wireless spectrum and the third wireless spectrum is identical. In some of these embodiments, the upstream components of the first wireless spectrum and the third wireless spectrum are combined at the master host unit and the combined signal is supplied to the service provider interface. In some example embodiments supporting additional wireless spectrum, any additional wireless spectrum is converted between fourth additional sets of bands of analog spectrum and second additional sets of N-bit words of digitized spectrum at the first master host unit.

At block 1304, the second set of N-bit words of digitized spectrum is transported on a second digital medium between the first master host unit and a first digital remote antenna unit, such as digital remote antenna unit 122-1. In some example embodiments supporting the additional wireless spectrum, the second additional sets of N-bit words of digitized spectrum are transported on the digital medium between the first master host unit and the first digital remote antenna unit. In other example embodiments supporting the additional wireless spectrum, the second additional sets of N-bit words of digitized spectrum are transported on a digital medium between the first master host unit and a second digital remote antenna unit. It is understood that there can be greater amounts of digital remote antenna units connected directly to the master host unit, daisy chained off of another digital remote antenna unit, connected through a digital expansion unit, or connected in other topologies.

At optional block 1306, the third wireless spectrum is converted between a second set of N-bit words of digitized spectrum and a fifth set of bands of analog spectrum at the first digital remote antenna unit. In some example embodiments supporting the additional wireless spectrum, the additional wireless spectrum is converted between the second additional sets of N-bit words of digitized spectrum and fifth additional sets of bands of analog spectrum at the first digital remote antenna unit. In other example embodiments having multiple digital remote antenna units, at least some of the second additional sets of N-bit words of digitized spectrum are converted to fifth additional sets of bands of analog spectrum at the second digital remote antenna unit (or any other digital remote antenna unit where the signals the N-bit words of digitized spectrum is present).

At block 1308, at least a portion of the first digital remote antenna unit (such as a first RF module) is switched between a transmit mode and a receive mode based on a second TDD switching control signal. In some example embodiments supporting additional wireless spectrum, portions of the first digital remote antenna unit (such as RF modules) are switched between a transmit mode and a receive mode based on second additional TDD switching control signals, where each portion of additional wireless spectrum supporting TDD has a respective TDD switching control signal associated with it.

At block 1310, the third wireless spectrum is transmitted over a third air interface at the first digital remote antenna unit during a transmit mode. In some example embodiments supporting additional wireless spectrum, the additional wireless spectrum is transmitted over additional air interfaces at portions of the first digital remote antenna unit or at other additional digital remote antenna units during a transmit mode associated with each respective additional wireless spectrum. Thus, any wireless spectrum supporting a TDD mode can be transmitted at appropriate timing intervals using respective switches and TDD switching control signals.

At block 1312, fourth wireless spectrum is received at the first digital remote antenna unit during a receive mode. In some example embodiments, the fourth wireless spectrum received at the first digital remote antenna unit during the receive mode includes the same spectrum as the third wireless spectrum transmitted at the first digital remote antenna unit during the transmit mode. In these examples, the third wireless spectrum is the downstream component and the fourth wireless spectrum is the upstream component. In some example embodiments supporting additional wireless spectrum, the additional wireless spectrum is received over additional air interfaces at portions of the first digital remote antenna unit (such as RF modules) or at other additional digital remote antenna units during a receive mode associated with respective additional wireless spectrum. Thus, any wireless spectrum supporting a TDD mode can be received at appropriate timing intervals using respective switches and TDD switching control signals.

In some embodiments, method 1200 and method 1300 are combined into one method of communicating wireless spectrum through a hybrid distributed antenna system, having both digital and analog remote units. In some of these embodiments, the first set of N-bit words is the same as the second set of N-bit words in the downstream. In addition, in some of these embodiments, the first set of N-bit words and the second set of N-bit words are combined in the upstream at the master host unit before being sent to the first service provider interface. Likewise, in some embodiments implementing simulcast, additional sets of N-bit words are the same in the downstream and combined in the upstream at the master host unit before being sent to respective service provider interfaces.

Figure 14:
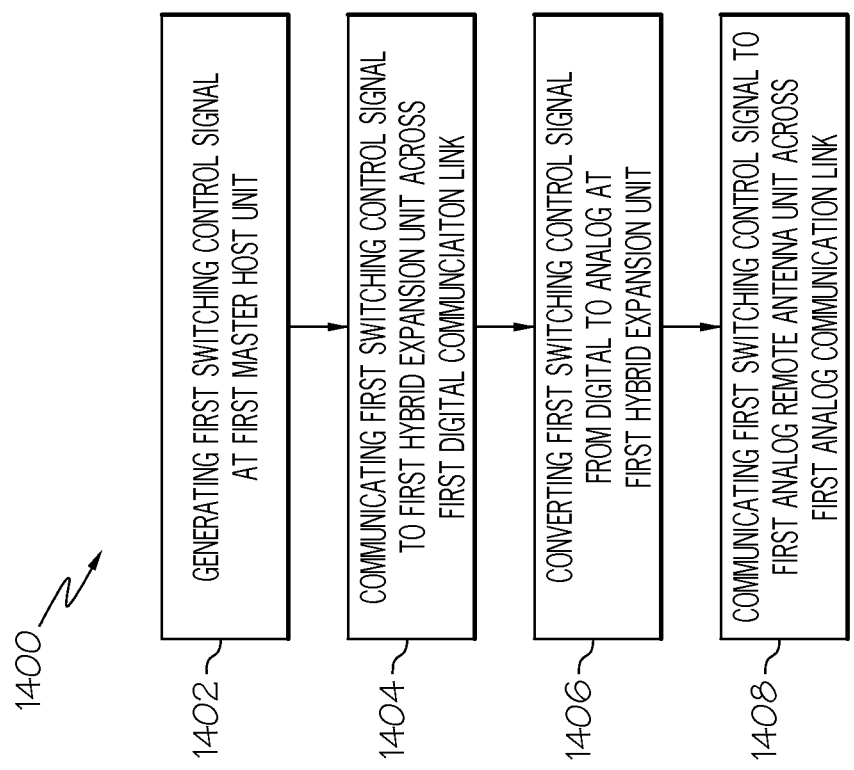
FIG. 14 is a flow diagram of an embodiment of a method of generating a time division duplexing (TDD) switching control signal at a first master host unit.

FIG. 14 shows an exemplary embodiment of a method flow diagram for a method of generating a TDD switching control signal at a first master host unit, labeled method 1400. The method 1400 begins at block 1402, where a first switching control signal is generated at a first master host unit, such as master host unit 104 described above. In some example embodiments, the first switching control signal is generated by comparing a threshold power level with a power level of a downlink communication path of the TDD encoded signal in the first wireless spectrum as described above. In exemplary embodiments, the TDD switching control signal is generated by correlating the detected signal power in the downlink against a reference to determine the downlink transmission start time and duration. In other example embodiments, the first switching control signal is generated by comparing a threshold power level with a power level of an uplink communication path of the TDD encoded signal in the first wireless spectrum as described above. In exemplary embodiments, the TDD switching control signal is generated by correlating the detected signal power in the uplink against a reference to determine the uplink transmission start time and duration. In other example embodiments, the first switching control signal is generated by demodulating a TDD encoded signal in the first wireless spectrum and determining when the first switching control signal should indicate transmitting or receiving based on the demodulated signal. In other example embodiments, the first switching control signal is received from the first service provider interface at the first master host unit.

At block 1404, the first TDD switching control signal is communicated to the first hybrid expansion unit across the first digital communication link. In some example embodiments, the first TDD switching control signal is communicated in the embedded control bits 2304 of a sampled data word 2302 or in a control word 2308 as described above. At block 1406, the first switching control signal is converted from digital to analog at the first hybrid expansion unit, such as hybrid expansion unit 106 described above. This can be accomplished as described above. At block 1408, the first switching control signal is communicated to the first analog remote antenna unit across a first analog communication link. This can be accomplished as described above, for example through ASK, FSK, or PSK to indicate the TDD states of the associated TDD communication links.

Figure 15:
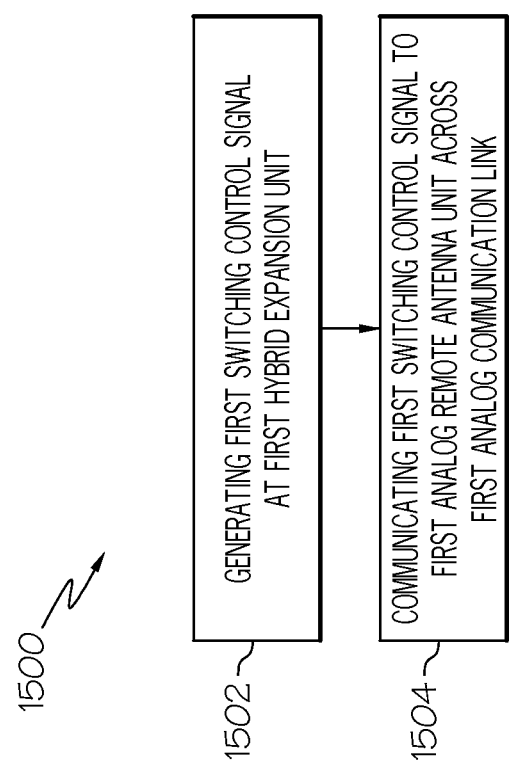
FIG. 15 is a flow diagram of an embodiment of a method of generating a time division duplexing (TDD) switching control signal at a first hybrid expansion unit.

FIG. 15 shows an exemplary embodiment of a method flow diagram for a method of generating a TDD switching control signal at a first hybrid expansion unit, labeled method 1500. The method 1500 begins at block 1502, where a first switching control signal is generated at a first hybrid expansion unit, such as hybrid expansion unit 106 described above. In some example embodiments, the first switching control signal is generated by comparing a threshold power level with a power level of a downlink communication path of the TDD encoded signal in the first wireless spectrum as described above. In exemplary embodiments, the TDD switching control signal is generated by correlating the detected signal power against a reference to determine the downlink transmission start time and duration. In other example embodiments, the first switching control signal is generated by comparing a threshold power level with a power level of an uplink communication path of the TDD encoded signal in the first wireless spectrum as described above. In exemplary embodiments, the TDD switching control signal is generated by correlating the detected signal power against a reference to determine the downlink transmission start time and duration. In some example embodiments, the first switching control signal is generated by comparing a threshold power level with a power level of a downlink communication path of the TDD encoded signal in the first wireless spectrum as described above. In other example embodiments, the first switching control signal is generated by comparing a threshold power level in the TDD encoded signal with a power level of an uplink communication path in the first wireless spectrum as described above. In other example embodiments, the first TDD switching control signal is generated by demodulating a TDD encoded signal in the first wireless spectrum and determining when the first switching control signal should indicate transmitting or receiving based on the demodulated signal. In other example embodiments, the first switching control signal is received from the first service provider interface at the first master host unit.

At block 1504, the first TDD switching control signal is communicated to the first analog remote antenna unit across a first analog communication link. This can be accomplished as described above, for example through FSK or PSK to indicate the TDD states of the associated TDD communication links.

While methods 1400 and 1500 described generation of the first TDD switching control signal at the master host unit 104 and hybrid expansion unit 106, it is understood that in other embodiments, the TDD switching control signal is generated at other places within the system, such as at analog remote antenna units, digital remote antenna units, or digital expansion units. Similar techniques for generation and distribution could be used for generation of the first TDD switching control signal as described above.

Figure 16:
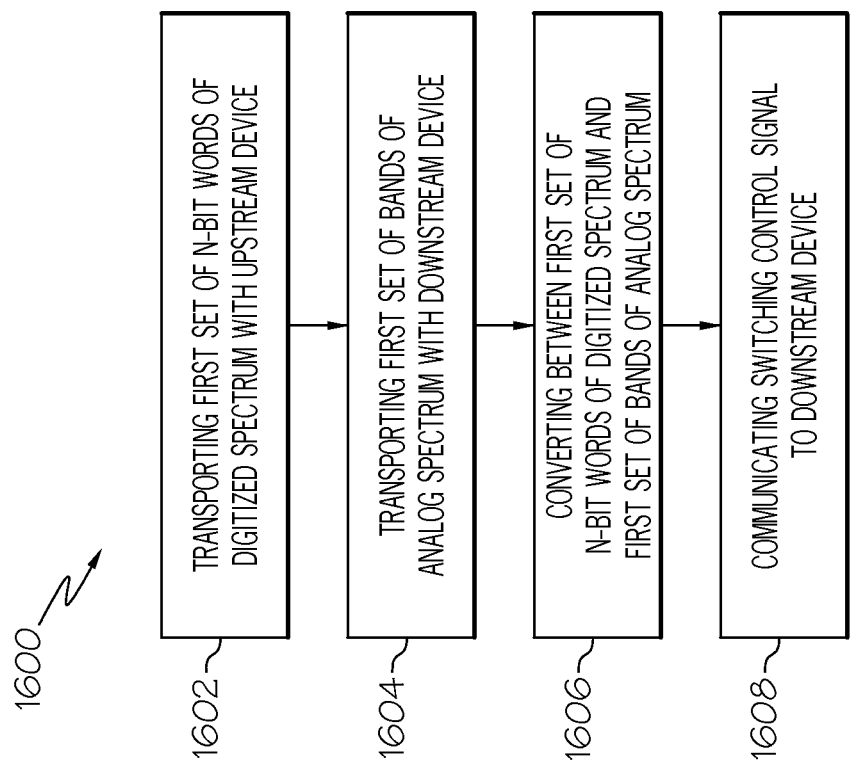
FIG. 16 is a flow diagram of an embodiment of a method of converting and transporting signals at a hybrid expansion unit in a distributed antenna system using time division duplexing (TDD).

FIG. 16 shows an exemplary embodiment of a method flow diagram for a method of converting and transporting wireless spectrum at a hybrid expansion unit in a distributed antenna system, labeled method 1600. The method 1600 begins at block 1602, where a first set of N-bit words of digitized spectrum is transported with an upstream device. At block 1604, a first set of bands of analog spectrum is transported with a downstream device. At block 1606, the first set of N-bit words of digitized spectrum is converted to and from the first set of bands of analog spectrum. At block 1608, a TDD switching control signal associated with the first set of bands of analog spectrum is communicated to the downstream device.

FIGS. 17-20 are functional block diagrams of alternate embodiments of various components of the systems described above. In these embodiments, the TDD switch signal controller and the TDD switch are placed in various components of the system to show that the TDD switch signal controller and the TDD switch can be positioned in various positions through the system. Each TDD switching control signal and switch lie in the same data path of the DAS between the service provider interface and the antenna so that the wireless spectrum can be analyzed at some point in the data path to generate a TDD switching control signal that can be used to switch the system between a transmit and a receive mode at some other point in the data path.

Figure 17:
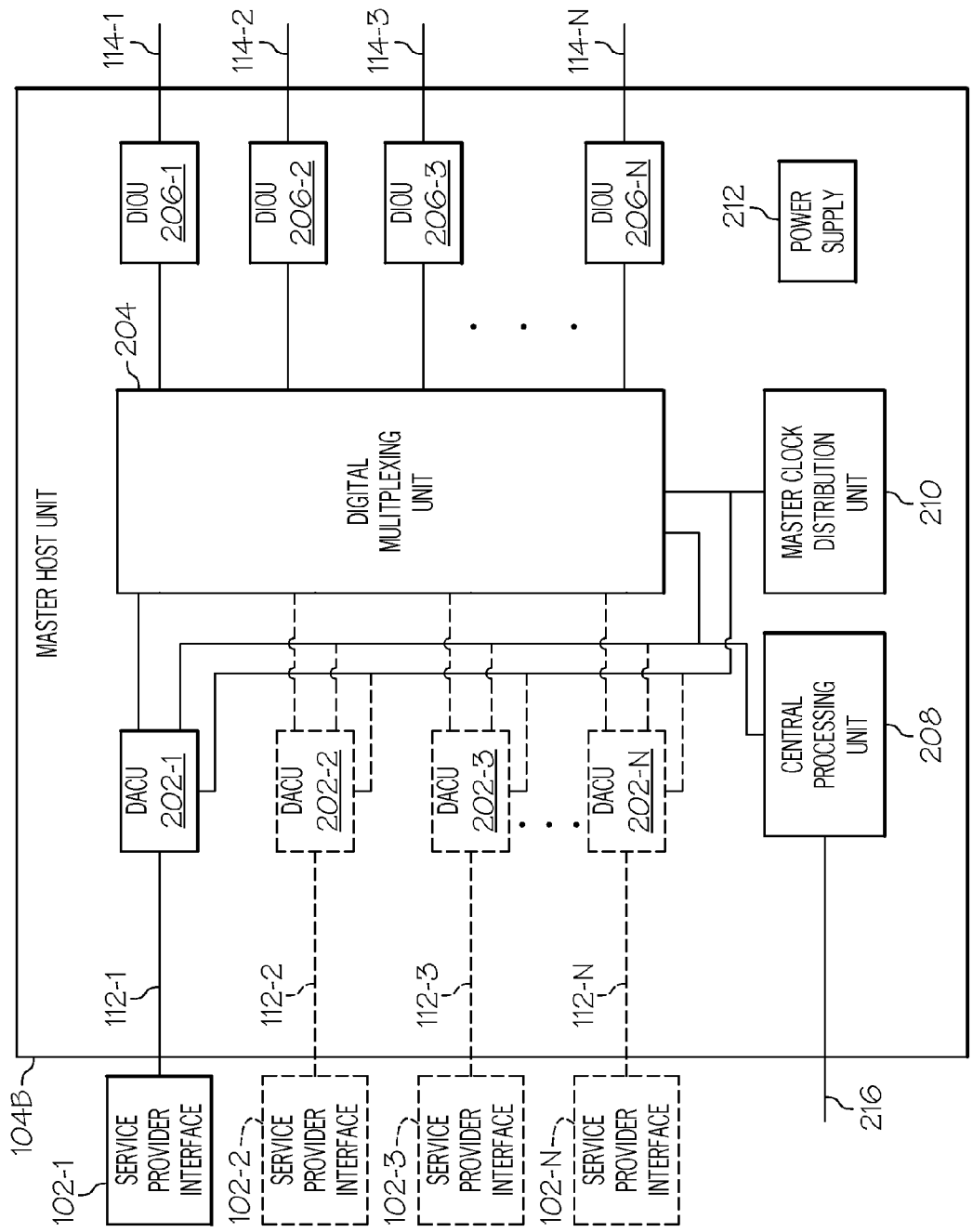
FIG. 17 is a block diagram of another embodiment of a master host unit for the system of FIG. 1.

FIG. 17 is a block diagram of another embodiment of the master host unit 104 of system 100, labeled master host unit 104B. The master host unit 104B includes all the same components as master host unit 104 shown in FIG. 2, with one exception. The master host unit 104B does not include any TDD switch signal controllers 203 because it does not generate the TDD switching control signal. Other than that, the master host unit 104B generally operates according to the description of master host unit 104 above. The master host unit 104B replaces master host unit 104 in systems implementing any of the components described in FIGS. 16-20.

Figure 18:
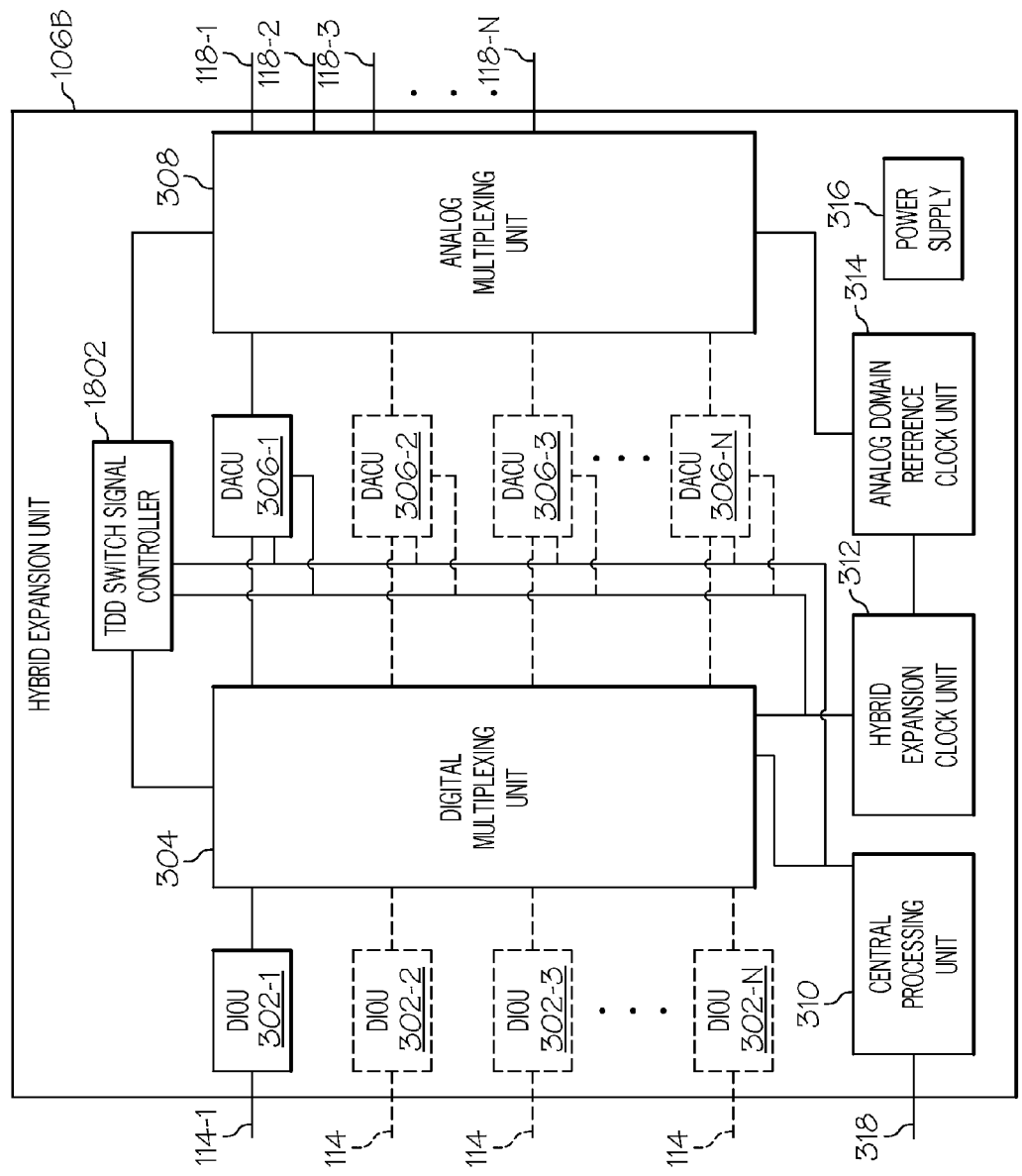
FIG. 18 is a block diagram of one embodiment of a hybrid expansion unit for the system of FIG. 1.

FIG. 18 is a block diagram of another embodiment of the hybrid expansion unit 106 of system 100, labeled hybrid expansion unit 106B. The hybrid expansion unit 106B includes all the same components as hybrid expansion unit 106 shown in FIG. 3, with one exception. The hybrid expansion unit 106B does not include the TDD switch signal converter 309 because there is not a TDD switching control signal from upstream components that needs to be converted from digital to analog. The hybrid expansion unit 106B instead includes a TDD switch signal controller 1802 to generate the TDD switching control signals.

The hybrid expansion unit 106B generally operates according to the description of hybrid expansion unit 106 above. TDD switch signal controller 1802 generates at least one TDD switching control signal for the respective wireless spectrum demultiplexed at the DMU 304. In some example embodiments, the TDD switch signal controller 1802 generates one TDD switching control signal for each wireless spectrum received from a respective service provider interface 102. Each TDD switching control signal can be generated in a number of ways, including through external processing, internal processing, and by receiving an external signal as described above with reference to TDD switch signal controllers 203. Because the TDD switch signal controller 1802 is in the hybrid expansion unit 106B and not the master host unit 104, it may not be practical to receive an external signal from service provider interfaces 102. Thus, example embodiments of TDD switch signal controller 1802 generate the TDD switching control signal through either external processing or internal processing as described above. The TDD switching control signal is then distributed to the analog remote antenna clusters 108. In some example embodiments, the TDD switching control signal for each wireless spectrum is multiplexed as an IF frequency with the analog representation of each respective wireless spectrum at analog multiplexing unit 308 and output using at least one analog communication link 118.

In some embodiments, the hybrid expansion clock unit 312 show in FIG. 18 communicates the digital master reference clock signal to various components of the hybrid expansion unit 106, including the DMU 304, each DACU 306, and the TDD switch signal controller 1802. In some embodiments, the TDD switch signal controller 1802 receives control signals from the central processing unit 310.

Figure 19:
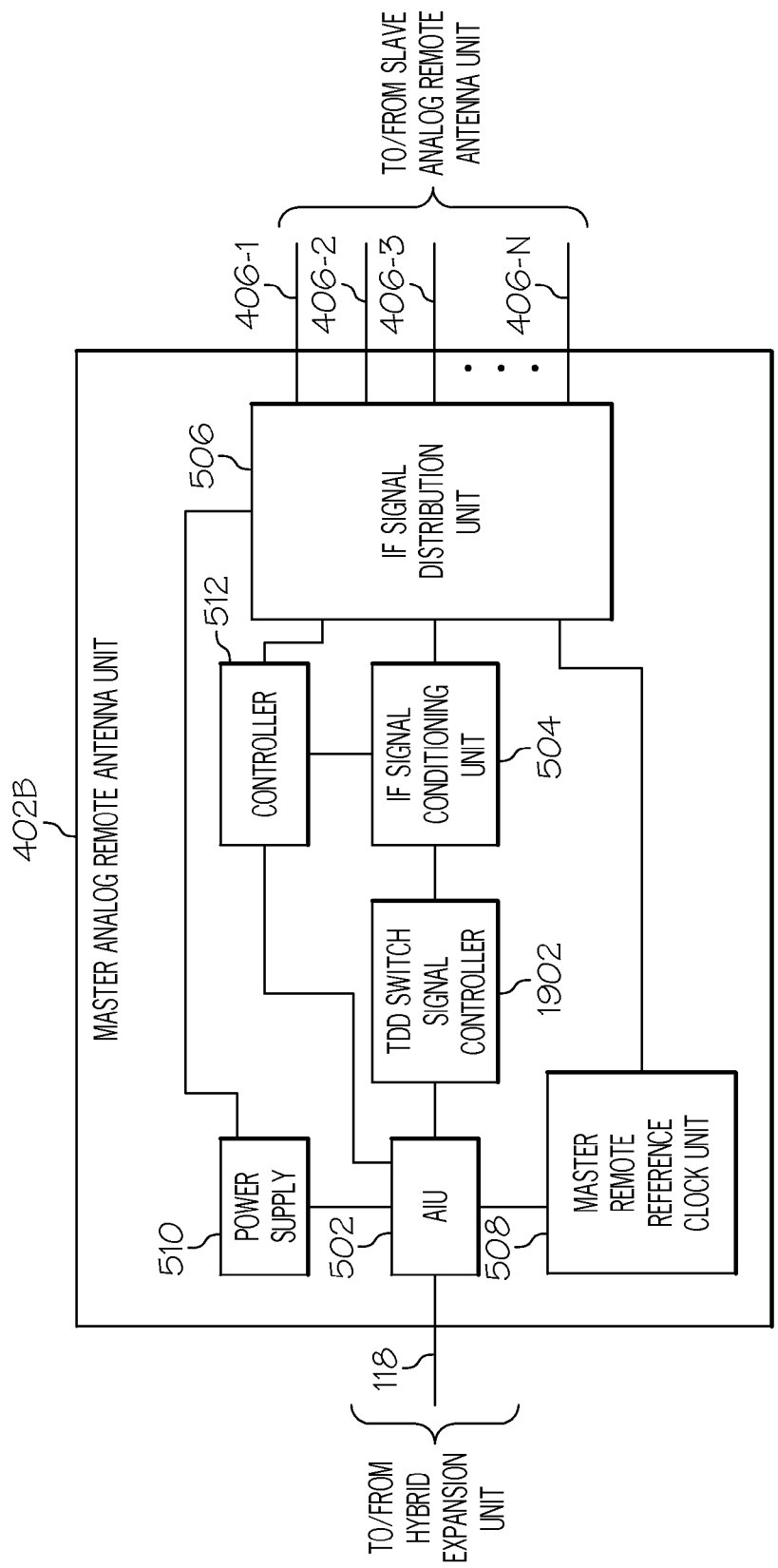
FIG. 19 is a block diagram of another embodiment of a master analog remote antenna unit for the analog remote antenna unit cluster of FIG. 4.

FIG. 19 is a block diagram of another embodiment of the master analog remote antenna unit 402 of analog remote antenna cluster 108, labeled master analog remote antenna unit 402B. The master analog remote antenna unit 402B includes all the same components as master analog remote antenna unit 402 shown in FIG. 5. The master analog remote antenna unit 402B generally operates according to the description of master analog remote antenna unit 402 above. In addition, master analog remote antenna unit 402B includes a TDD switch signal controller 1902. TDD switch signal controller 1902 generates at least one TDD switching control signal for the respective wireless spectrum received at master analog remote antenna unit 402B via AIU 502. In some example embodiments, the TDD switch signal controller 1902 generates one TDD switching control signal for each wireless spectrum received from a respective service provider interface 102. Each TDD switching control signal can be generated in a number of ways, including through external processing, internal processing, and by receiving an external signal as described above with reference to TDD switch signal controllers 203. Because the TDD switch signal controller 1902 is in the master analog remote antenna unit 402B and not in the master host unit 104B, it may not be practical to receive an external signal from service provider interfaces 102. Thus, example embodiments of TDD switch signal controller 1902 generate the TDD switching control signal through either external processing or internal processing as described above. The TDD switching control signal for each wireless spectrum is converted into a separate IF signal and propagated to the slave analog remote antenna units using IF signal distribution unit 506.

Figure 20A:
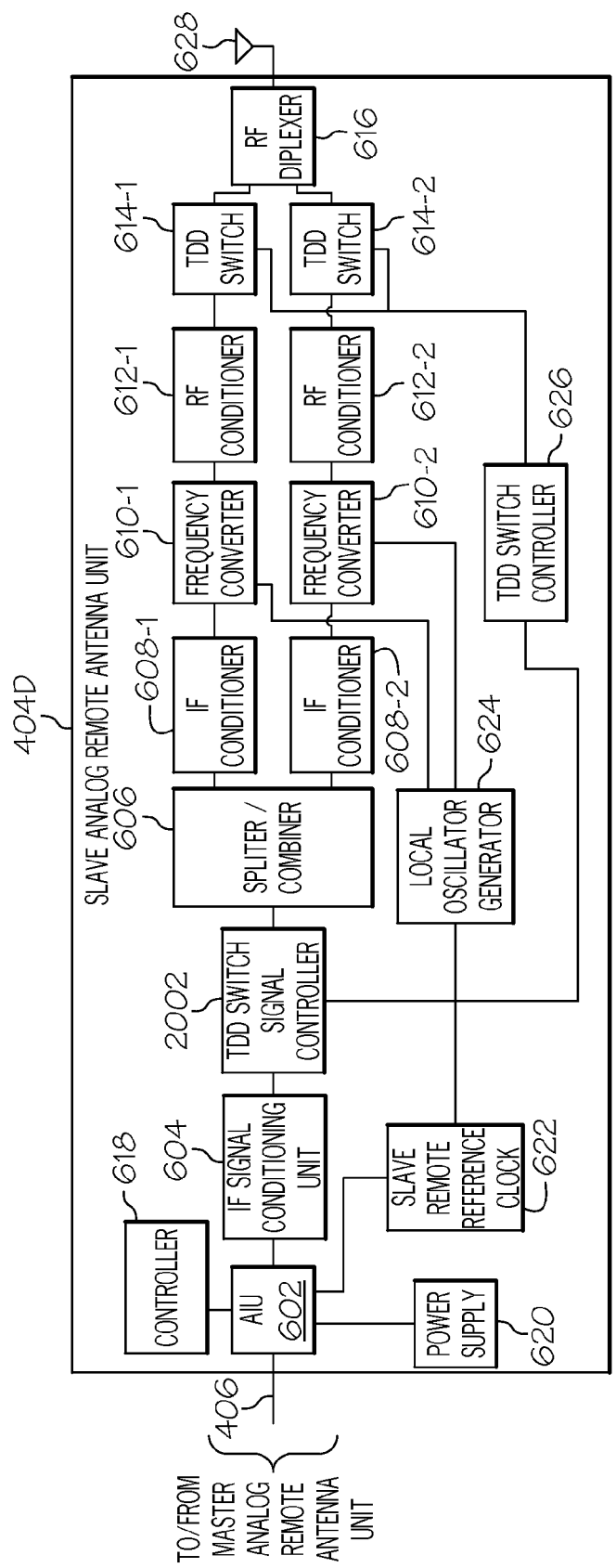
FIG. 20A is a block diagram of another embodiment of a slave analog remote antenna unit for the analog remote antenna unit cluster of FIG. 4.
Figure 20B:
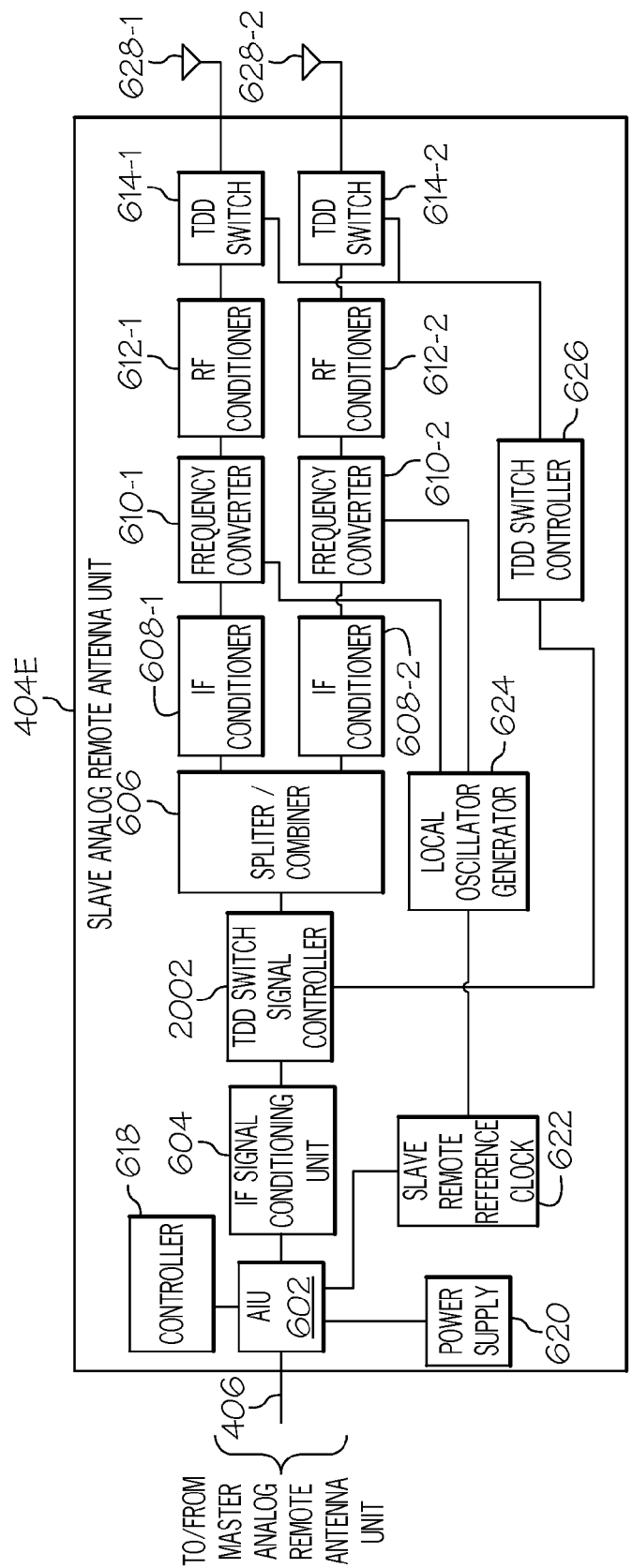
FIG. 20B is a block diagram of another embodiment of a slave analog remote antenna unit for the analog remote antenna unit cluster of FIG. 4.
Figure 20C:
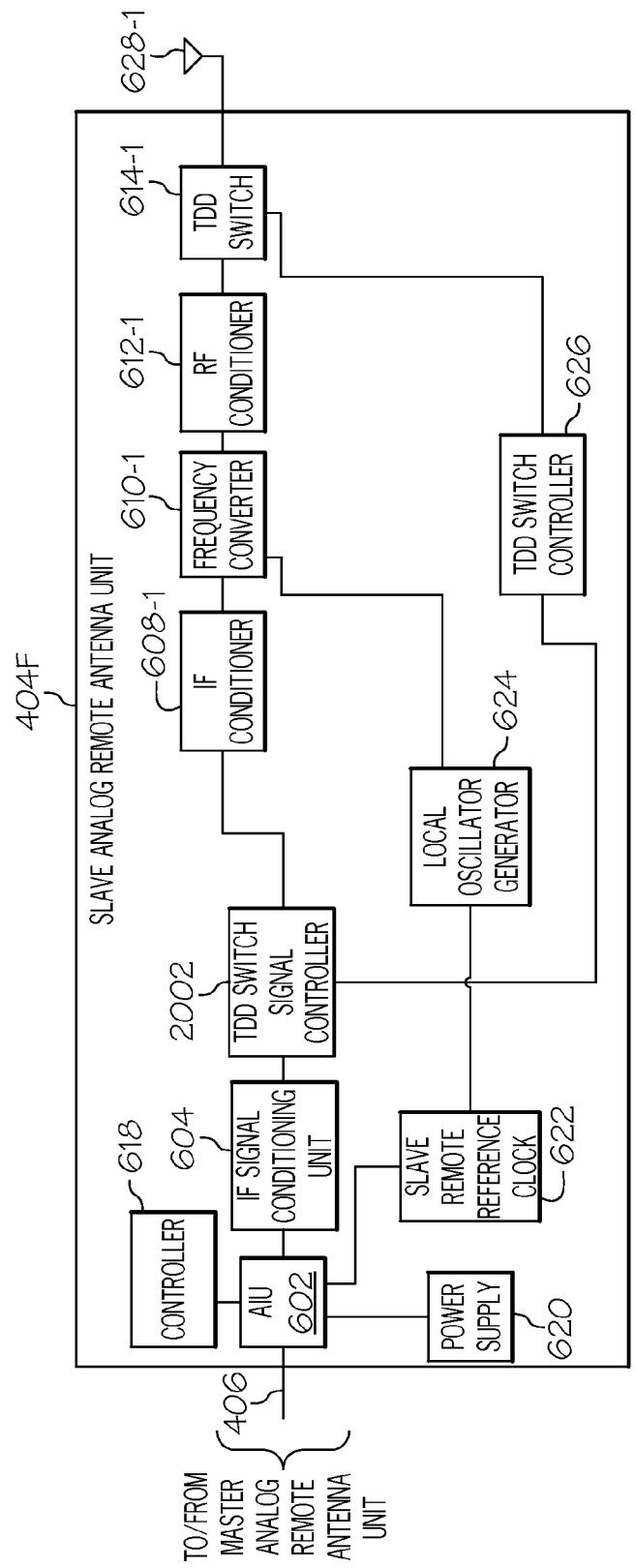
FIG. 20C is a block diagram of another embodiment of a slave analog remote antenna unit for the analog remote antenna unit cluster of FIG. 4.

FIGS. 20A-20C are functional block diagrams of additional embodiments of the slave analog remote antenna unit 404 for the analog remote antenna cluster 108. Each of FIGS. 18A-18C shows a different embodiment of slave analog remote antenna unit 404. The various embodiments are labeled slave analog remote antenna unit 404D through slave analog remote antenna unit 404F.

FIG. 20A is a block diagram of another embodiment of the slave analog remote antenna unit 404 of analog remote antenna cluster 108, labeled slave analog remote antenna unit 404D. The slave analog remote antenna unit 404D includes all the same components as slave analog remote antenna unit 404A shown in FIG. 6A. The slave analog remote antenna unit 404D generally operates according to the description of slave analog remote antenna unit 404A above. In addition, slave analog remote antenna unit 404D includes a TDD switch signal controller 2002. TDD switch signal controller 2002 generates at least one TDD switching control signal for the respective wireless spectrum received at slave analog remote antenna unit 404D via analog communication link 406. In some example embodiments, the TDD switch signal controller 2002 generates one TDD switching control signal for each wireless spectrum received from a respective service provider interface 102. Each TDD switching control signal can be generated in a number of ways, including through external processing, internal processing, and by receiving an external signal as described above with reference to TDD switch signal controllers 203. Because the TDD switch signal controller 2002 is in the slave analog remote antenna unit 404D and not in the master host unit 104B, it may not be practical to receive an external signal from service provider interfaces 102. Thus, example embodiments of TDD switch signal controller 2002 generate the TDD switching control signal through either external processing or internal processing as described above. The TDD switching control signal for each wireless spectrum is then passed to the TDD switch controller 626 to control at least one of the TDD switches 614.

FIG. 20B is a block diagram of another embodiment of the slave analog remote antenna unit 404 of analog remote antenna cluster 108, labeled slave analog remote antenna unit 404E. The slave analog remote antenna unit 404E includes all the same components as slave analog remote antenna unit 404B shown in FIG. 6B. The slave analog remote antenna unit 404E generally operates according to the description of slave analog remote antenna unit 404B above. In addition, slave analog remote antenna unit 404E includes a TDD switch signal controller 2002. TDD switch signal controller 2002 generates at least one TDD switching control signal for the respective wireless spectrum received at slave analog remote antenna unit 404E via analog communication link 406. In some example embodiments, the TDD switch signal controller 2002 generates one TDD switching control signal for each wireless spectrum received from a respective service provider interface 102. Each TDD switching control signal can be generated in a number of ways, including through external processing, internal processing, and by receiving an external signal as described above with reference to TDD switch signal controllers 203. Because the TDD switch signal controller 2002 is in the slave analog remote antenna unit 404E and not in the master host unit 104B, it may not be practical to receive an external signal from service provider interfaces 102. Thus, example embodiments of TDD switch signal controller 2002 generate the TDD switching control signal through either external processing or internal processing as described above. The TDD switching control signal for each wireless spectrum is then passed to the TDD switch controller 626 to control at least one of the TDD switches 614.

FIG. 20C is a block diagram of another embodiment of the slave analog remote antenna unit 404 of analog remote antenna cluster 108, labeled slave analog remote antenna unit 404F. The slave analog remote antenna unit 404F includes all the same components as slave analog remote antenna unit 404C shown in FIG. 6C. The slave analog remote antenna unit 404F generally operates according to the description of slave analog remote antenna unit 404C above. In addition, slave analog remote antenna unit 404F includes a TDD switch signal controller 2002. TDD switch signal controller 2002 generates at least one TDD switching control signal for the respective wireless spectrum received at slave analog remote antenna unit 404F via analog communication link 406. In some example embodiments, the TDD switch signal controller 2002 generates one TDD switching control signal for each wireless spectrum received from a respective service provider interface 102. Each TDD switching control signal can be generated in a number of ways, including through external processing, internal processing, and by receiving an external signal as described above with reference to TDD switch signal controllers 203. Because the TDD switch signal controller 2002 is in the slave analog remote antenna unit 404F and not in the master host unit 104B, it may not be practical to receive an external signal from service provider interfaces 102. Thus, example embodiments of TDD switch signal controller 2002 generate the TDD switching control signal through either external processing or internal processing as described above. The TDD switching control signal for each wireless spectrum is then passed to the TDD switch controller 626 to control the TDD switch 614-1.

Figure 21:
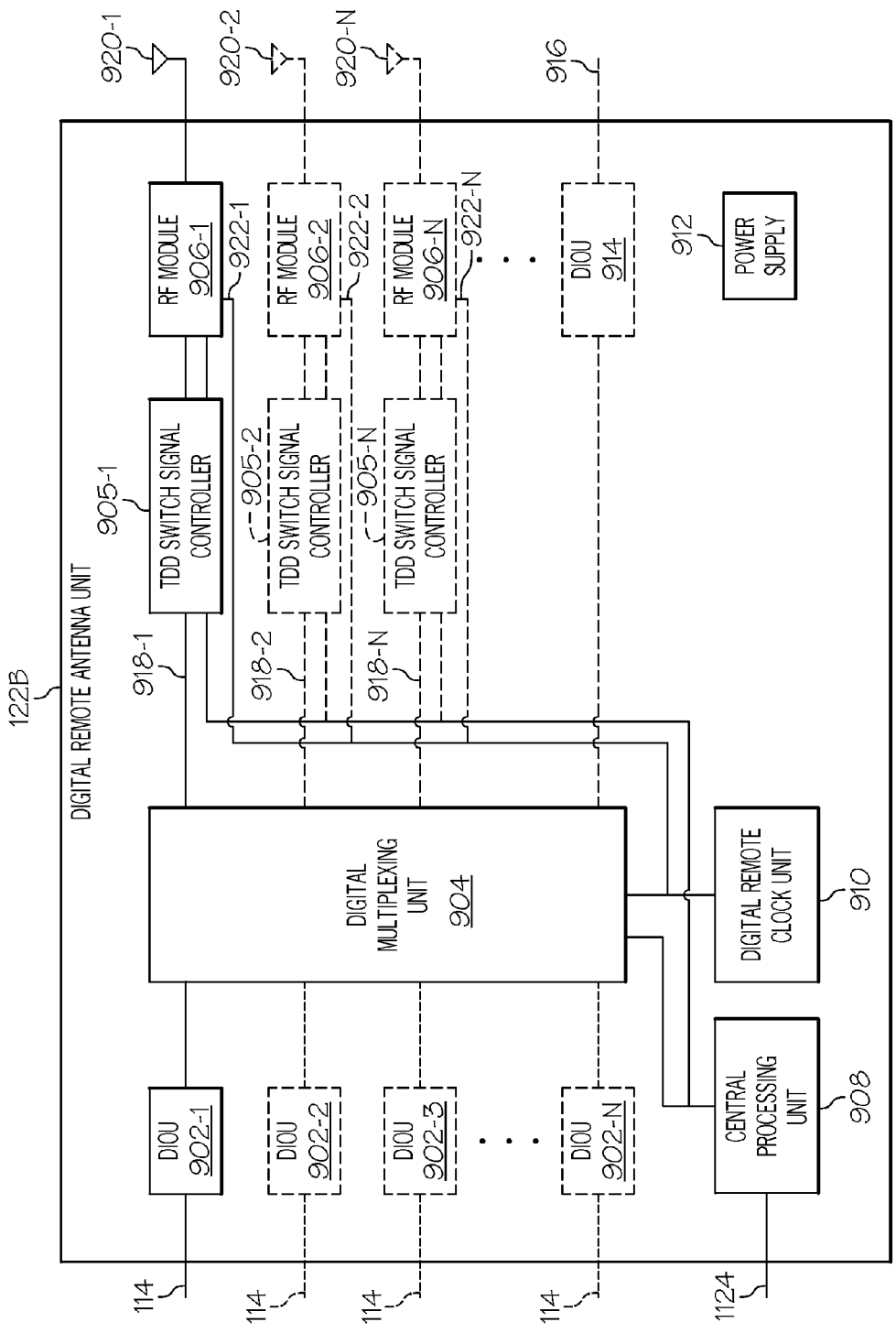
FIG. 21 is a block diagram of another embodiment of a digital remote antenna unit for the system of FIG. 8.

FIG. 21 is a block diagram of another embodiment of the digital remote antenna unit 122 of system 800, labeled digital remote antenna unit 122B. The digital remote antenna unit 122B includes all the same components as digital remote antenna unit 122A shown in FIG. 9. The digital remote antenna unit 122B generally operates according to the description of digital remote antenna unit 122A above. In addition, digital remote antenna unit 122B includes at least one TDD switch signal controller 905 (such as TDD switch signal controller 905-1 and optional TDD switch signal controllers 905-2 through 203-N). TDD switch signal controllers 905 generates at least one TDD switching control signal for the respective wireless spectrum operating in a TDD mode received at digital remote antenna unit 122B. In some example embodiments, the TDD switch signal controllers 905 generate TDD switching control signals for each wireless spectrum operating in TDD mode received from a respective service provider interface 102. Each TDD switching control signal can be generated in a number of ways, including through external processing, internal processing, and by receiving an external signal as described above with reference to TDD switch signal controllers 203. Because the TDD switch signal controller 905 is in the digital remote antenna unit 122B instead of the master host unit 104B, it may not be practical to receive an external signal from service provider interfaces 102. Thus, example embodiments of TDD switch signal controller 905 generate the TDD switching control signal through either external processing or internal processing as described above. The TDD switching control signal for each wireless spectrum implementing TDD is then output to the respective RF module handling the wireless spectrum.

Figure 22:
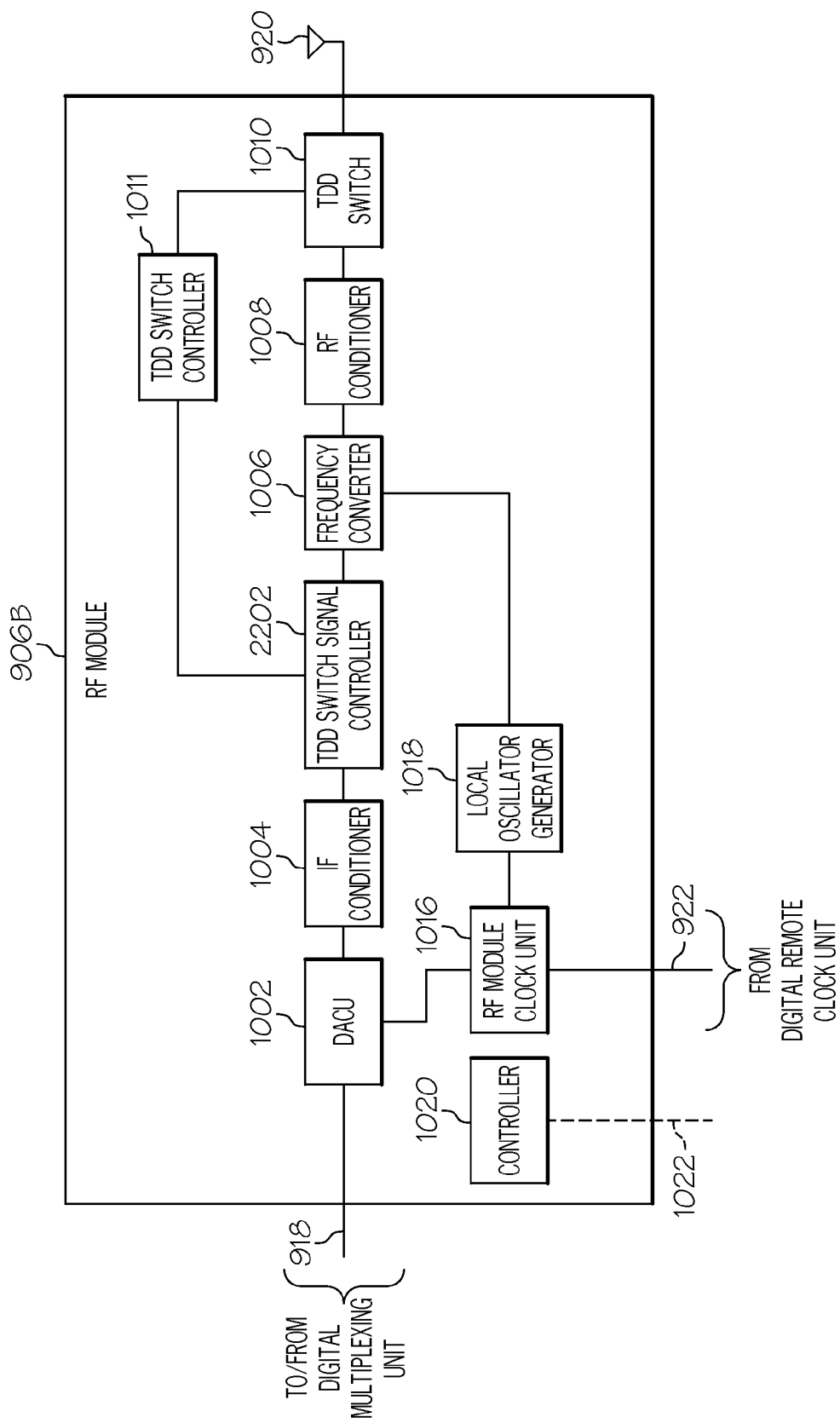
FIG. 22 is a block diagram of another embodiment of a RF module for the digital remote antenna unit of FIG. 9.

FIG. 22 is a block diagram of another embodiment of the RF module 906 of the digital remote antenna unit 122B, labeled RF module 906B. The RF module 906B includes all the same components as RF module 906A shown in FIG. 10. The RF module 906B generally operates according to the description of RF module 906A above. In addition, RF module 906B includes a TDD switch signal controller 2002. TDD switch signal controller 2002 generates at least one TDD switching control signal for the respective wireless spectrum operating in a TDD mode received at RF module 906B. In some example embodiments, the TDD switch signal controller 2002 generates TDD switching control signals for each wireless spectrum operating in TDD mode received from a respective service provider interface 102. Each TDD switching control signal can be generated in a number of ways, including through external processing, internal processing, and by receiving an external signal as described above with reference to TDD switch signal controllers 203. Because the TDD switch signal controller 2002 is in the RF module 906B instead of the master host unit 104B, it may not be practical to receive an external signal from service provider interfaces 102. Thus, example embodiments of TDD switch signal controller 905 generate the TDD switching control signal through either external processing or internal processing as described above. The TDD switching control signal for each wireless spectrum is then passed to the TDD switch controller 1011 to control the TDD switch 1010.

What is claimed is:

1. A communication system, comprising:
   a first master host unit configured to communicate first wireless spectrum with a first service provider interface using a first set of bands of analog spectrum;
   a plurality of digital communication links coupled to the first master host unit, wherein the first master host unit is further configured to communicate a first digitized spectrum in first N-bit words over a first digital communication link of the plurality of digital communication links;
   wherein the first master host unit is further configured to convert between the first set of bands of analog spectrum and the first N-bit words of digitized spectrum;
   a first hybrid expansion unit communicatively coupled to the first master host unit by the first digital communication link of the plurality of digital communication links and configured to communicate the first N-bit words of digitized spectrum with the first master host unit across the first digital communication link, the first hybrid expansion unit further configured to convert between the first N-bit words of digitized spectrum and a second set of bands of analog spectrum;
   a first analog communication link coupled to the first hybrid expansion unit, wherein the first hybrid expansion unit is further configured to communicate the second set of bands of analog spectrum across the first analog communication link;
   a first analog remote antenna unit communicatively coupled to the first hybrid expansion unit by the first analog communication link and configured to communicate the second set of bands of analog spectrum across the first analog communication link, the first analog remote antenna unit further configured to communicate first wireless signals over a first air interface using a first antenna;
   a first switch positioned in a first data path between the first service provider interface and the first antenna, wherein the first switch is selected between a transmit path and a receive path in response to a first switching control signal; and
   wherein at least one of:
   at least one of the first master host unit, the first hybrid expansion unit, and the first analog remote antenna unit is further configured to receive the switching control signal from an external source external to the communication system; and
   at least one of the first master host unit, the first hybrid expansion unit, and the first analog remote antenna unit further includes a first switch signal controller that generates the first switching control signal.

2. The system of claim 1, wherein the first switch is included in at least one of the first master host unit, the first hybrid expansion unit, and the first analog remote antenna unit.

3. The system of claim 1, wherein the first analog remote antenna unit transmits the first wireless signals over the first air interface using the first antenna when the first switch is selected to the first transmit path.

4. The system of claim 1, wherein the first analog remote antenna unit receives the first wireless signals over the first air interface using the first antenna when the first switch is selected to the first receive path.

5. The system of claim 1, wherein the first switching control signal is a one bit binary value.

6. The system of claim 1, wherein at least one of the first master host unit, the first hybrid expansion unit, and the first analog remote antenna unit further include a first switch signal controller that receives the first switching control signal from the first service provider interface.

7. The system of claim 1, wherein at least one of the first master host unit, the first hybrid expansion unit, and the first analog remote antenna unit further include a first switch signal controller that derives the first switching control signal from a frame clock signal received from the first service provider interface.

8. The system of claim 1, wherein at least one of the first master host unit, the first hybrid expansion unit, and the first analog remote antenna unit further include a first switch signal controller that generates the first switching control signal.

9. The system of claim 8, wherein the first switch signal controller generates the first switching control signal by comparing a threshold power level with a downlink power level of downlink signals in the first data path.

10. The system of claim 8, wherein the first switch signal controller generates the first switching control signal by correlating detected downlink power of downlink signals in the first data path with a downlink power reference.

11. The system of claim 8, wherein the first switch signal controller generates the first switching control signal by comparing a threshold power level with an uplink power level of uplink signals in the first data path.

12. The system of claim 8, wherein the first switch signal controller generates the first switching control signal by correlating detected uplink power of uplink signals in the first data path with an uplink power reference.

13. The system of claim 8, wherein the first switch signal controller further:
demodulates a first signal in the first wireless spectrum; and
determines from the demodulated first signal when the first switching control signal should indicate transmitting or receiving.

14. The system of claim 1, wherein the master host unit includes a first switch signal controller that generates the first switching control signal;
wherein the first master host unit is further configured to communicate the first switching control signal to the first hybrid expansion unit across the first digital communication link; and
wherein the first hybrid expansion unit is further configured to communicate the first switching control signal to the first analog remote antenna unit across the first analog communication link.

15. The system of claim 14, wherein the first switching control signal is communicated across the first digital communication link in a control word of a frame of data communicated across the first digital communication link.

16. The system of claim 14, wherein the first switching control signal is communicated across the first digital communication link in a sampled data word of a frame of data communicated across the first digital communication link.

17. The system of claim 16, wherein the first switching control signal is communicated across the first digital communication link using at least one embedded control bit in the sampled data word.

18. The system of claim 14, wherein the first switching control signal is communicated across the first digital communication link using at least one of an error detection code and a correction code.

19. The system of claim 14, wherein the first switching control signal is communicated across the first digital communication link using an odd number of bits greater than two; and
wherein the first hybrid expansion unit is further configured to utilize a majority rule scheme to validate the first switching control signal.

20. The system of claim 1, wherein the first hybrid expansion unit includes a first switch signal controller that generates the first switching control signal; and
wherein the first hybrid expansion unit is further configured to communicate the first switching control signal to the first analog remote antenna unit across the first analog communication link.

21. The system of claim 1, wherein the first analog remote antenna unit includes a first switch signal controller that generates the first switching control signal.

22. The system of claim 21, wherein the master analog remote antenna unit is the first analog remote antenna unit.

23. The system of claim 1, wherein the first wireless signals are the first set of bands of analog spectrum.

24. The system of claim 1, wherein the first analog remote antenna unit is part of a first analog remote antenna cluster that includes:
a master analog remote antenna unit configured to communicate the second set of bands of analog spectrum with the first hybrid expansion unit across the first analog communication link; and
wherein the master analog remote antenna unit distributes the second set of bands of analog spectrum to the first analog remote antenna unit.

25. The system of claim 1, further comprising:
a first digital remote antenna unit communicatively coupled to the first master host unit by a second digital communication link of the plurality of digital communication links and configured to communicate second N-bit words of digitized spectrum with the first master host unit across the second digital communication link, the first digital remote antenna unit is further configured to communicate second wireless signals over a second air interface using a second antenna;
wherein the first digital remote antenna unit includes a second switch that is selected between a transmitter and a receiver in response to a second switching control signal; and
wherein the first master host unit is further configured to convert between the first set of bands of analog spectrum and the second N-bit words of digitized spectrum.

26. The system of claim 25, wherein a first downlink portion of the first wireless signals is a second downlink portion of the second wireless signals.

27. The system of claim 25, wherein the first digital remote antenna unit transmits the second wireless signals over the second air interface using the second antenna when the second switch is selected to the transmitter.

28. The system of claim 25, wherein the first digital remote antenna unit receives the second wireless signals over the second air interface using the second antenna when the second switch is selected to the receiver.

29. The system of claim 25, wherein the second switching control signal is the first switching control signal.

30. The system of claim 25, wherein the master host unit includes a second switch signal controller that generates the second switching control signal;
   wherein the first master host unit is further configured to communicate the second switching control signal to the first digital remote antenna unit across the second digital communication link.

31. The system of claim 30, wherein the second switching control signal is the first switching control signal.

32. The system of claim 25, wherein the first digital remote antenna unit includes a second switch signal controller that generates the second switching control signal.

33. The system of claim 25, wherein first N-bit words of digitized spectrum is the second N-bit words of digitized spectrum in the downstream.

34. The system of claim 25, wherein the second wireless signals are derived from the first set of bands of analog spectrum.

35. The system of claim 1, wherein the first master host unit is further configured to communicate third wireless spectrum with a second service provider interface using a third set of bands of analog spectrum;
   wherein the first master host unit is further configured to communicate a second digitized spectrum in second N-bit words over a second digital communication link of the plurality of digital communication links;
   wherein the first master host unit is further configured to convert between the third set of bands of analog spectrum and the second N-bit words of digitized spectrum;
   a second hybrid expansion unit communicatively coupled to the first master host unit by the second digital communication link of the plurality of digital communication links and configured to communicate the second N-bit words of digitized spectrum with the first master host unit across the second digital communication link, the second hybrid expansion unit further configured to convert between the second N-bit words of digitized spectrum and a fourth set of bands of analog spectrum;
   a second analog communication link coupled to the second hybrid expansion unit, wherein the second hybrid expansion unit is further configured to communicate the fourth set of bands of analog spectrum across the second analog communication link;
   a second analog remote antenna unit communicatively coupled to the second hybrid expansion unit by the second analog communication link and configured to communicate the fourth set of bands of analog spectrum across the second analog communication link, the second analog remote antenna unit further configured to communicate second wireless signals over a second air interface using a second antenna; and
   wherein the second analog remote antenna unit includes a second switch that is selected between a transmitter and a receiver in response to a second switching control signal.

36. The system of claim 35, wherein the first digital communication link is the second digital communication link.

37. The system of claim 35, wherein the first hybrid expansion unit is the second hybrid expansion unit;
   wherein the first analog remote antenna unit and the second analog remote antenna unit are each part of a first analog remote antenna cluster that includes:
   a master analog remote antenna unit configured to communicate the second set of bands of analog spectrum with the first hybrid expansion unit across the first analog communication link and the fourth set of bands of analog spectrum with the first hybrid expansion link across the second analog communication link;
   wherein the master analog remote antenna unit distributes the second set of bands of analog spectrum to the first analog remote antenna unit; and
   wherein the master analog remote antenna unit distributes the fourth set of bands of analog spectrum to the second analog remote antenna unit.

38. The system of claim 37, wherein the first analog communication link is the second analog communication link.

39. The system of claim 37, wherein the master analog remote antenna unit is the first analog remote antenna unit.

40. A method comprising:
   converting first wireless spectrum between a first set of bands of analog spectrum and first N-bit words of digitized spectrum using a first master host unit;
   transporting the first N-bit words of digitized spectrum on a first digital medium between the first master host unit and a first hybrid expansion unit;
   converting first wireless spectrum between the first N-bit words of digitized spectrum and a second set of bands of analog spectrum at the first hybrid expansion unit;
   transporting the second set of bands of analog spectrum on a first analog medium between the first hybrid expansion unit and a first analog remote antenna unit;
   switching the first analog remote antenna unit between a transmit mode and a receive mode based on a first switching control signal;
   when the first analog remote unit is in the transmit mode, transmitting first wireless spectrum at the first analog remote antenna unit using a first antenna;
   when the first analog remote antenna unit is in the receive mode, receiving a second wireless spectrum at the first analog remote antenna unit using a second antenna; and
   at least one of:
   receiving the first switching control signal from an external source using at least one of the first master host unit, the first hybrid expansion unit, and the first analog remote antenna unit; and
   generating the first switching control signal using at least one of the first master host unit, the first hybrid expansion unit, and the first analog remote antenna unit.

41. The method of claim 40, wherein the first wireless spectrum is the second wireless spectrum.

42. The method of claim 40, wherein the first antenna is the second antenna.

43. The method of claim 40, wherein the first switching control signal is a one bit binary value.

44. The method of claim 40, further comprising generating the first switching control signal by at least one of:
   comparing a first threshold power level with a power level of a downlink communication path in the first wireless spectrum; and
   comparing a second threshold power level with a power level of an uplink communication path in the second wireless spectrum.

45. The method of claim 40, further comprising generating the first switching control signal by at least one of:
   correlating a downlink power reference with a detected downlink power of a downlink communication path in the first wireless spectrum; and
   correlating an uplink power level with a power level of an uplink communication path in the second wireless spectrum.

46. The method of claim 40, further comprising:
demodulating a signal in the first wireless spectrum;
determining when the first switching control signal should indicate transmitting or receiving based on the demodulated signal; and
generating the first switching control signal according to the determination of when the first switching control signal should indicate transmitting or receiving.

47. The method of claim 40, further comprising:
receiving the first switching control signal from a first service provider interface using the first master host unit.

48. The method of claim 40, further comprising:
generating the first switching control signal using the first master host unit;
communicating the first switching control signal to the first hybrid expansion unit across the first digital communication link;
converting the first switching control signal from digital to analog using the first hybrid expansion unit; and
communicating the first switching control signal to the first analog remote antenna unit across the first analog communication link.

49. The method of claim 48, wherein communicating the first switching control signal to the first hybrid expansion unit across the first digital communication link comprises communicating the first switching control signal in a control word of a frame of data communicated across the first digital communication link.

50. The method of claim 48, wherein communicating the first switching control signal to the first hybrid expansion unit across the first digital communication link comprises communicating the first switching control signal in a sampled data word of a frame of data communicated across the first digital communication link.

51. The method of claim 50, wherein the first switching control signal is communicated across the first digital communication link using at least one embedded control bit in the sampled data word.

52. The method of claim 48, wherein communicating the first switching control signal to the first hybrid expansion unit across the first digital communication link comprises communicating the first switching control signal across the first digital communication link using a code.

53. The method of claim 48, wherein communicating the first switching control signal to the first hybrid expansion unit across the first digital communication link comprises communicating the first switching control signal using an odd number of bits greater than two; and
validating the first switching control signal received at the hybrid expansion unit using a majority rule scheme on the odd number of bits greater than two.

54. The method of claim 40, further comprising:
generating the first switching control signal at the first hybrid expansion unit; and
communicating the first switching control signal to the first analog remote antenna unit across the first analog communication link.

55. The method of claim 40, further comprising:
generating the first switching control signal at the first analog remote antenna unit.

56. The method of claim 40, wherein the first wireless signals are derived from the first set of bands of analog spectrum.

57. The method of claim 40, wherein the second set of bands of analog spectrum comprise intermediate frequencies.

58. The method of claim 40, wherein the first wireless spectrum is communicated as a third band of analog spectrum.

59. The method of claim 58, wherein the third band of analog spectrum is the first band of analog spectrum.

60. The method of claim 40, further comprising:
converting third wireless spectrum between fourth set of bands of analog spectrum and second N-bit words of digitized spectrum at the first master host unit;
transporting the second N-bit words of digitized spectrum on a second digital medium between the first master host unit and a first digital remote antenna unit;
switching the first digital remote antenna unit between the transmit mode and the receive mode based on a second switching control signal;
when the first digital remote antenna unit is in the transmit mode, transmitting third wireless spectrum at the first digital remote antenna unit using a third antenna; and
when the first digital remote antenna unit is in the receive mode, receiving fourth wireless spectrum at the first digital remote antenna unit using a fourth antenna.

61. The method of claim 60, wherein the first wireless spectrum is the third wireless spectrum.

62. A hybrid expansion unit comprising:
at least one digital communication interface configured to communicate first and second sets of N-bit words of digitized spectrum with an upstream device;
at least one analog communication interface configured to communicate first and second sets of bands of analog spectrum with a downstream device;
wherein the hybrid expansion unit is configured to convert between the first set of N-bit words of digitized spectrum and the first set of bands of analog spectrum;
wherein the hybrid expansion unit is further configured to communicate a switching control signal to the downstream device using the at least one analog communication interface, wherein the switching control signal indicates when a switch positioned in a first data path between the hybrid expansion unit and at least one downstream antenna should be selected between a transmitter and a receiver; and
wherein the hybrid expansion unit is further configured to at least one of:
generate the switching control signal using a switch signal controller within the hybrid expansion unit; and
receive a digital switching control signal from another device and convert the digital switching control signal to the switching control signal using a switch signal converter within the hybrid expansion unit.

63. The hybrid expansion unit of claim 62, further comprising:
wherein the hybrid expansion unit is further configured to receive the switching control signal from the upstream device through the at least one digital communication interface.

64. The hybrid expansion unit of claim 62, wherein the hybrid expansion unit is configured to receive the switching control signal from the upstream device in a control word of a frame of data communicated from the upstream device through the at least one digital communication interface.

65. The hybrid expansion unit of claim 62, wherein the hybrid expansion unit is configured to receive the switching control signal from the upstream device through the at least one digital communication interface in a sampled data word of a frame of data communicated across the first digital communication link.

66. The hybrid expansion unit of claim 62, wherein the hybrid expansion unit is configured to receive the switching control signal from the upstream device through the at least one digital communication interface using at least one embedded control bit in the sampled data word.

67. The hybrid expansion unit of claim 62, wherein the hybrid expansion unit is configured to receive the switching control signal from the upstream device through the at least one digital communication interface using a multi-bit code.

68. The hybrid expansion unit of claim 62, wherein the hybrid expansion unit is configured to receive the switching control signal from the upstream device through the at least one digital communication interface using an odd number of bits greater than two; and
   wherein the hybrid expansion unit is further configured to utilize a majority rule scheme to validate the first switching control signal.

69. The hybrid expansion unit of claim 62, further comprising a switch signal controller configured to generate the switching control signal based on a comparison between a threshold power level and at least one of:
   a first power level of a downlink communication path in the digitized spectrum; and
   a second power level of an uplink communication path in the digitized spectrum.

70. A method comprising:
   communicating a first set of N-bit words of digitized spectrum between a hybrid expansion unit and an upstream device;
   communicating a first set of bands of analog spectrum between the hybrid expansion unit and a downstream device;
   converting between the first set of N-bit words of digitized spectrum and the first set of bands of analog spectrum at the hybrid expansion unit;
   communicating a switching control signal to the downstream device from the hybrid expansion unit, wherein the switching control signal indicates when a switch positioned in a first data path between the hybrid expansion unit and at least one downstream antenna should be selected between a transmit path and a receive path; and
   at least one of:
      receiving the switching control signal from another device; and
      generating the switching control signal at the hybrid expansion unit.

71. The method of claim 70, further comprising:
   receiving the switching control signal from the upstream device.

72. The method of claim 70, further comprising generating the switching control signal based on a comparison between a threshold power level and at least one of:
   a first power level of a downlink communication path in the digitized spectrum; and
   a second power level of an uplink communication path in the digitized spectrum.

* * * * *